(12) United States Patent
Keefe et al.

(10) Patent No.: US 6,188,417 B1
(45) Date of Patent: *Feb. 13, 2001

(54) FLUIDIC ADAPTER FOR USE WITH AN INKJET PRINT CARTRIDGE HAVING AN INTERNAL PRESSURE REGULATOR

(75) Inventors: Brian J. Keefe, La Jolla, CA (US); Norman E. Pawlowski, Jr., Corvallis, OR (US); Michael E. Peterschmidt; Carrie E. Harris, both of Albany, OR (US); Winthrop D. Childers, San Diego, CA (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/741,845

(22) Filed: Oct. 31, 1996

Related U.S. Application Data

(63) Continuation-in-part of application No. 08/706,121, filed on Aug. 30, 1996, now Pat. No. 5,966,155, which is a continuation-in-part of application No. 08/550,902, filed on Oct. 31, 1995, now Pat. No. 5,872,584, which is a continuation-in-part of application No. 08/518,847, filed on Aug. 24, 1995, now Pat. No. 5,736,992, which is a continuation-in-part of application No. 08/331,453, filed on Oct. 31, 1994, now Pat. No. 5,583,545.

(51) Int. Cl.[7] .................................................. B41J 2/175
(52) U.S. Cl. ............................................................ 347/86
(58) Field of Search .................................. 347/85, 86, 87, 347/84

(56) References Cited

U.S. PATENT DOCUMENTS

| | | |
|---|---|---|
| 4,403,227 | 9/1983 | Bertschy et al. ....................... 347/89 |
| 4,460,905 | 7/1984 | Thomas . |
| 4,496,959 * | 1/1985 | Frerichs ................................. 347/86 |

(List continued on next page.)

FOREIGN PATENT DOCUMENTS

| | | |
|---|---|---|
| 0339770 | 2/1989 | (EP) . |
| 0604940 A1 | 7/1994 | (EP) . |

(List continued on next page.)

OTHER PUBLICATIONS

EP Search Report for EP 97 30 8689 filed Feb. 25, 1998.

*Primary Examiner*—N. Le
*Assistant Examiner*—Michael Nghiem
(74) *Attorney, Agent, or Firm*—Dennis G. Stenstrom

(57) ABSTRACT

Described is an ink delivery system for an inkjet printing system including a housing; a printhead fixed to the housing for ejecting droplets of ink on media; a regulator located within the housing; a source of ink for replenishing the printhead; and an ink passageway for connecting the source of ink and the valve inlet. The regulator including a valve having an inlet and outlet, with the outlet in fluid communication with the printhead; a flexible member within the print cartridge, the flexible member has a reference surface and an ink surface, the reference surface is in communication with an outside atmosphere, the ink surface is in fluid communication with the printhead, the difference in pressure between the outside atmosphere and the printhead causes the flexible member to bias toward the ink surface; and an actuator that is receives a force from the ink surface of the flexible member, the actuator actuates the valve based upon the differential pressure between the reference surface and the outside atmosphere. Also described is a fluidic coupling that releasably and fluidically connects to the inlet port of a print cartridge. The fluidic coupling acts as a seal for the print cartridge and a means of lubricating and protecting the inlet port from drying, leaking ink, and air ingestion while the print cartridge is in transit and in storage. The fluidic coupling also provides an auxiliary ink reservoir for the print cartridge. The fluidic coupling further provides an ink conduit to the printhead from an external ink supply.

15 Claims, 44 Drawing Sheets

U.S. PATENT DOCUMENTS

| | | | |
|---|---|---|---|
| 4,509,062 | 4/1985 | Low et al. | 347/87 |
| 4,604,633 | 8/1986 | Kimura et al. | 347/7 |
| 4,677,447 | 6/1987 | Nielsen | 347/87 |
| 4,804,944 | 2/1989 | Golladay et al. | 340/624 |
| 4,914,453 | 4/1990 | Kanayama et al. | 347/86 |
| 4,940,997 | 7/1990 | Hamlin et al. | 347/87 |
| 4,959,667 | 9/1990 | Kaplinsky | 347/87 |
| 4,992,802 | 2/1991 | Dion et al. | 347/87 |
| 5,079,570 | 1/1992 | Mohr et al. | 347/7 |
| 5,293,913 * | 3/1994 | Preszler | 141/367 |
| 5,315,317 | 5/1994 | Terasawa et al. | 347/7 |
| 5,325,119 | 6/1994 | Fong | 347/86 |
| 5,367,328 | 11/1994 | Erickson | 347/7 |
| 5,369,429 | 11/1994 | Erickson | 347/7 |
| 5,506,611 | 4/1996 | Ujita et al. | 347/86 |
| 5,583,545 | 12/1996 | Pawlowski, Jr. et al. | 347/7 |
| 5,650,811 | 7/1997 | Seccombe et al. | 347/85 |
| 5,736,992 | 4/1998 | Pawlowski, Jr. et al. | 347/7 |

FOREIGN PATENT DOCUMENTS

| | | |
|---|---|---|
| 0666178 A2 | 8/1995 | (EP) . |
| 0756937 A2 | 2/1997 | (EP) . |
| 0799702 A1 | 10/1997 | (EP) . |
| 2298616 | 9/1996 | (GB) . |
| 59-052662 | 3/1984 | (JP) . |
| 62-271750 | 11/1987 | (JP) . |

* cited by examiner

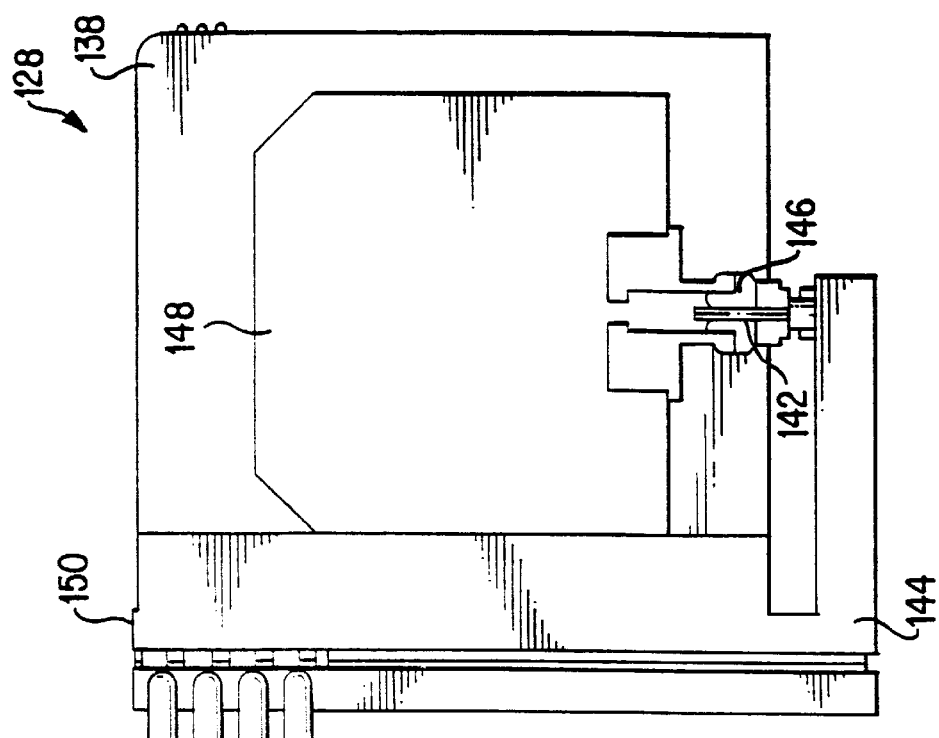
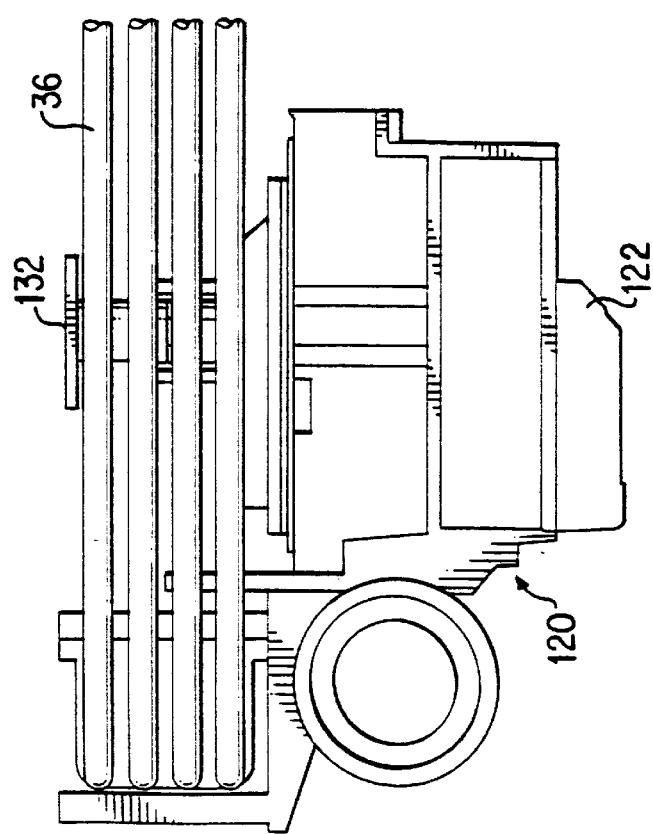
FIG. 12B
FIG. 12A

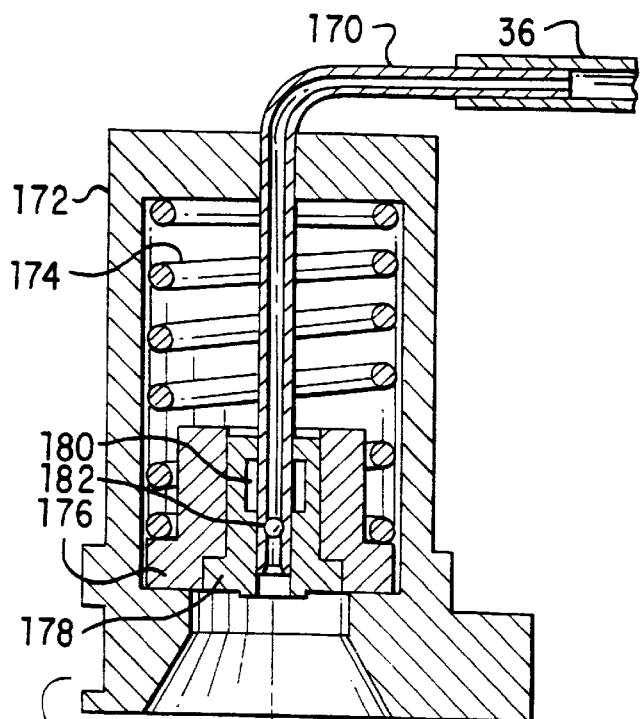
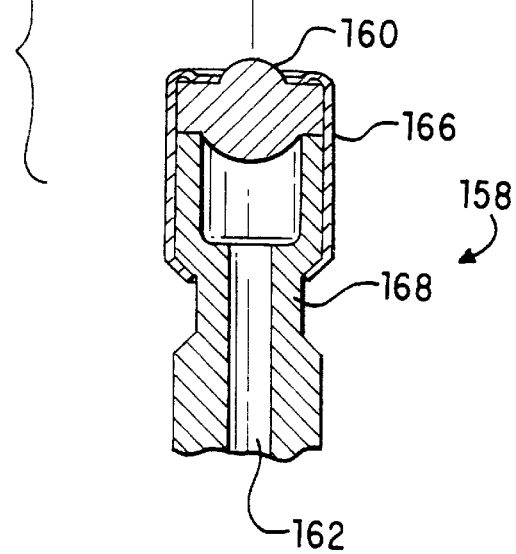
FIG. 16
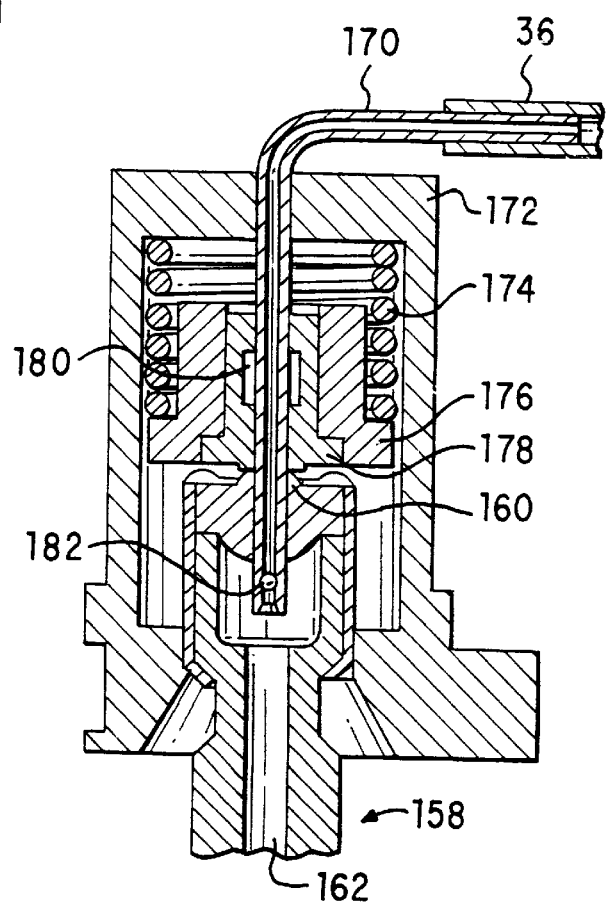
FIG. 17

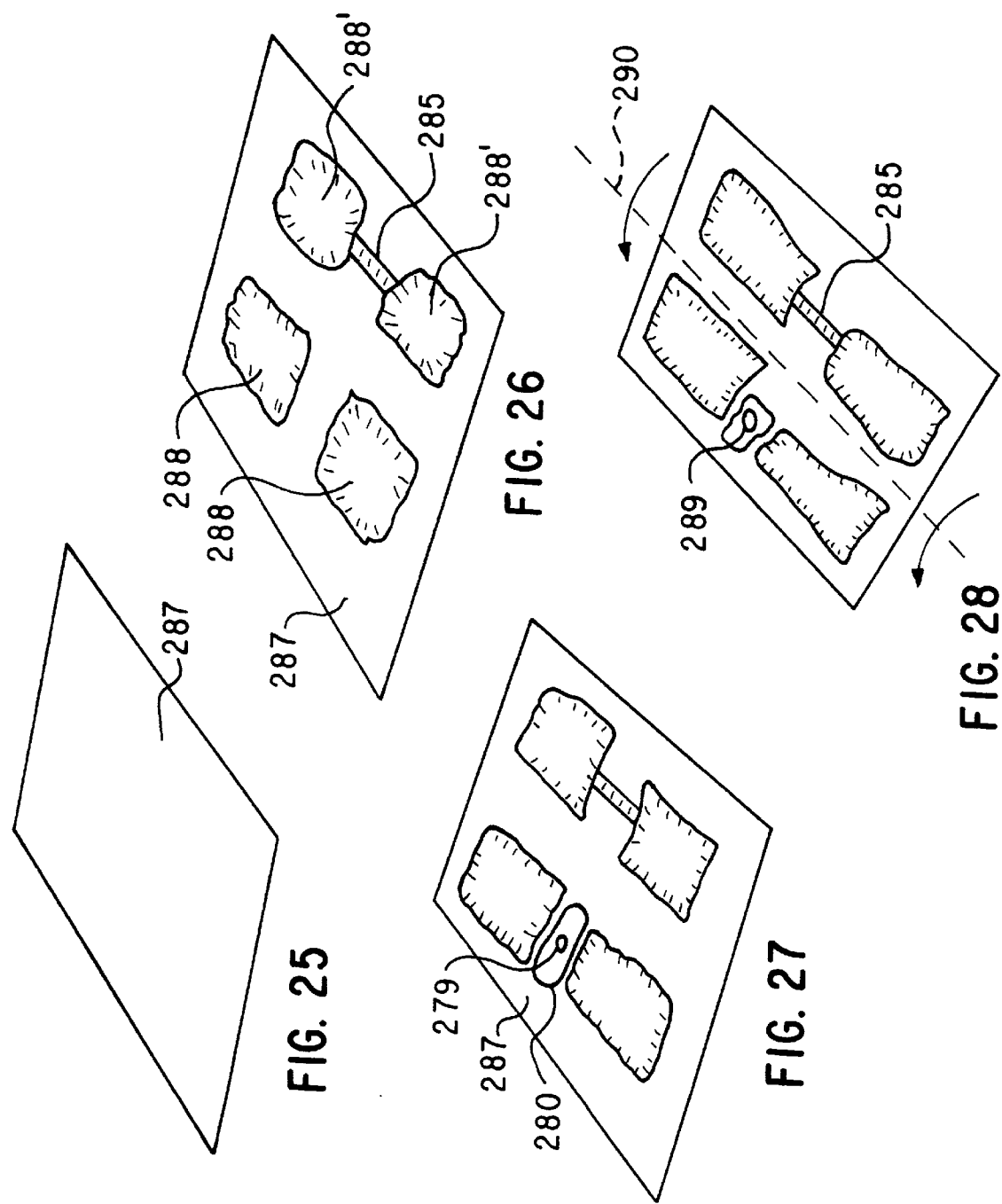

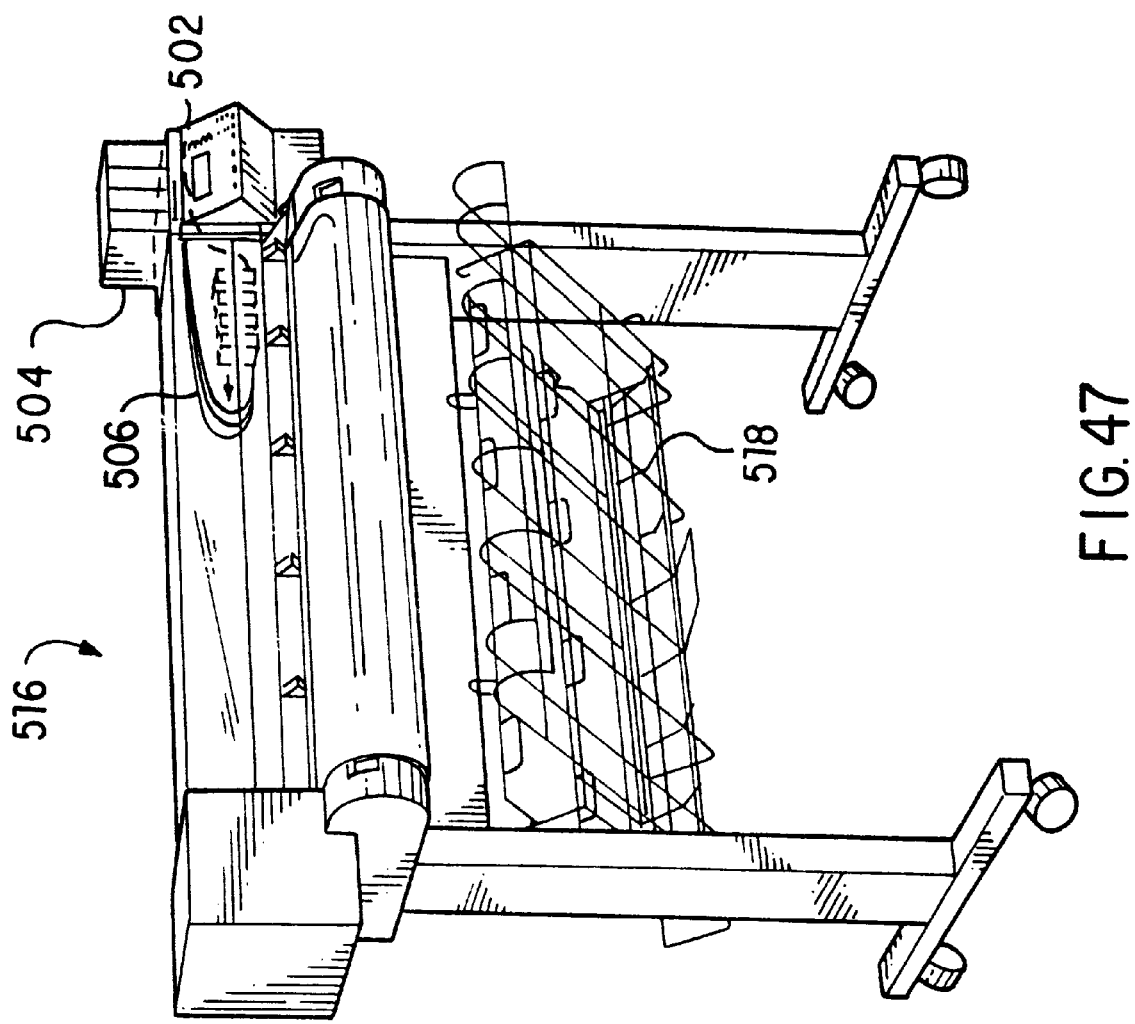

FLUIDIC ADAPTER FOR USE WITH AN INKJET PRINT CARTRIDGE HAVING AN INTERNAL PRESSURE REGULATOR

CROSS-REFERENCE TO RELATED APPLICATIONS

This application is a continuation-in-part of U.S. patent application Ser. No. 08/706,121, filed Aug. 30, 1996, now U.S. Pat. No. 5,966,155, entitled "Inkjet Printing System with Off-Axis Ink Supply Having Ink Path Which Does Not Extend above Print Cartridge" by Norman Pawlowski, Jr., which is a continuation-in-part of U.S. patent application Ser. No. 08/550,902, filed Oct. 31, 1995, now U.S. Pat. No. 5,872,584, entitled "Apparatus for Providing Ink to an Ink-Jet Print Head and for Compensating for Entrapped Air" by Norman Pawlowski, Jr. et al., which is a continuation-in-part of U.S. patent application Ser. No. 08/518,847, filed Aug. 24, 1995, now U.S. Pat. No. 5,736,992, entitled "Pressure Regulated Free Ink-Jet Pen," by Norman Pawlowski, Jr. et al., which is a continuation-in-part of U.S. patent application Ser. No. 08/331,453, filed Oct. 31, 1994, now U.S. Pat. No. 5,583,545, by Norman Pawlowski, Jr. et al. The foregoing patents and patent applications are herein incorporated by reference.

FIELD OF THE INVENTION

This invention relates to inkjet printers and, more particularly, to an inkjet printer having a scanning printhead with a stationary ink supply.

BACKGROUND OF THE INVENTION

Thermal inkjet hardcopy devices such as printers, graphics plotters, facsimile machines and copiers have gained wide acceptance. These hardcopy devices are described by W. J. Lloyd and H. T. Taub in "Ink Jet Devices," Chapter 13 of *Output Hardcopy Devices* (Ed. R. C. Durbeck and S. Sherr, San Diego: Academic Press, 1988) and U.S. Pat. Nos. 4,490,728 and 4,313,684. The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994)], incorporated herein by reference. Inkjet hardcopy devices produce high quality print, are compact and portable, and print quickly and quietly because only ink strikes the paper.

An inkjet printer forms a printed image by printing a pattern of individual dots at particular locations of an array defined for the printing medium. The locations are conveniently visualized as being small dots in a rectilinear array. The locations are sometimes "dot locations", "dot positions", or pixels". Thus, the printing operation can be viewed as the filling of a pattern of dot locations with dots of ink.

Inkjet hardcopy devices print dots by ejecting very small drops of ink onto the print medium and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

The typical inkjet printhead (i.e., the silicon substrate, structures built on the substrate, and connections to the substrate) uses liquid ink (i.e., dissolved colorants or pigments dispersed in a solvent). It has an array of precisely formed orifices or nozzles attached to a printhead substrate that incorporates an array of ink ejection chambers which receive liquid ink from the ink reservoir. Each chamber is located opposite the nozzle so ink can collect between it and the nozzle. The ejection of ink droplets is typically under the control of a microprocessor, the signals of which are conveyed by electrical traces to the resistor elements. When electric printing pulses heat the inkjet firing chamber resistor, a small portion of the ink next to it vaporizes and ejects a drop of ink from the printhead. Properly arranged nozzles form a dot matrix pattern. Properly sequencing the operation of each nozzle causes characters or images to be printed upon the paper as the printhead moves past the paper.

The ink cartridge containing the nozzles is moved repeatedly across the width of the medium to be printed upon. At each of a designated number of increments of this movement across the medium, each of the nozzles is caused either to eject ink or to refrain from ejecting ink according to the program output of the controlling microprocessor. Each completed movement across the medium can print a swath approximately as wide as the number of nozzles arranged in a column of the ink cartridge multiplied times the distance between nozzle centers. After each such completed movement or swath the medium is moved forward the width of the swath, and the ink cartridge begins the next swath. By proper selection and timing of the signals, the desired print is obtained on the medium.

Color inkjet hardcopy devices commonly employ a plurality of print cartridges, usually either two or four, mounted in the printer carriage to produce a full spectrum of colors. In a printer with four cartridges, each print cartridge contains a different color ink, with the commonly used base colors being cyan, magenta, yellow, and black. In a printer with two cartridges, one cartridge usually contains black ink with the other cartridge being a tri-compartment cartridge containing the base color cyan, magenta and yellow inks. The base colors are produced on the media by depositing a drop of the required color onto a dot location, while secondary or shaded colors are formed by depositing multiple drops of different base color inks onto the same dot location, with the overprinting of two or more base colors producing the secondary colors according to well established optical principles.

For many applications, such as personal computer printers and fax machines, the ink reservoir has been incorporated into the pen body such that when the pen runs out of ink, the entire pen, including the printhead, is replaced.

However, for other hardcopy applications, such as large format plotting of engineering drawings, color posters and the like, there is a requirement for the use of much larger volumes of ink than can be contained within the replaceable pens. Therefore, various off-board ink reservoir systems have been developed recently which provide an external stationary ink supply connected to the scanning cartridge via a tube. The external ink supply is typically known as an "off-axis," "off-board," or "off-carriage" ink supply. While providing increased ink capacity, these off-carriage systems also present a number of problems. The space requirements for the off-carriage reservoirs and tubing impact the size of the printer, with consequent cost increase.

These various problems include undesirable fluctuations in ink pressure in the print cartridge, an unreliable and complex fluid seal between the print cartridge and the external ink supply, increased printer size due to the external ink supply's connection to the print cartridge, blockage in the ink delivery system, air accumulation in the tubes leading to the print cartridge, leakage of ink, high cost, and complexity.

More importantly, the new off-axis design print cartridges have very little internal ink capacity in their reservoirs. Each time a new cartridge is manufactured, it needs to be run through an automated print quality tester (APQT). This allows the manufacturer to screen out cartridges failing to meet minimum quality standards. This testing requires the use of ink. Additional production line processes that use ink may include a nozzle down flush, wetfiring, and reprinting. With the new off-axis cartridge designs, the amount of ink available internally may not be enough to make it through the APQT test and other uses of ink.

Prior to printer installation, the cartridge is in transit and in storage. Therefore, there is also a need to provide a means of lubricating and protecting the inlet port. In particular, the port should be protected from drying, leaking ink, and air ingestion.

What is needed is an fluidic coupling that releasably and fluidically connects to the inlet port of a print cartridge for ink replenishment so as to provide a print cartridge seal from the outside atmosphere, compliance, and an auxiliary ink source for the print cartridge.

SUMMARY

The present invention provides fluidic coupling that releasably and fluidically connects to the inlet port of a print cartridge. The fluidic coupling acts as a seal for the print cartridge and a means of lubricating and protecting the inlet port from drying, leaking ink, and air ingestion while the print cartridge is in transit and in storage. The fluidic coupling also provides an auxiliary ink reservoir for the print cartridge. The fluidic coupling further provides an ink conduit to the printhead from an external ink supply. The fluidic adapter of the present invention is advantageously utilized in an inkjet printer which includes a replaceable print cartridge which is inserted into a scanning carriage. A fluid interconnect on the print cartridge connects to a fluid interconnect on the carriage when the print cartridge is inserted into the carriage to complete the fluid connection between the external ink supply and the print cartridge. The fluid interconnection is made between the print cartridge and the ink tube simply by placing the print cartridge into a stall in the scanning carriage. A pressure regulator, which may be internal or external to the print cartridge, regulates the flow of ink from the external ink supply to the print cartridge. The external ink supply may be pressurized or non-pressurized.

The present invention is an ink delivery system for an inkjet printing system including a housing; a printhead fixed to the housing for ejecting droplets of ink on media; a regulator located within the housing; a source of ink for replenishing the printhead; and an ink passageway for connecting the source of ink and the valve inlet. The regulator including a valve having an inlet and outlet, with the outlet in fluid communication with the printhead; a flexible member within the print cartridge, the flexible member has a reference surface and an ink surface, the reference surface is in communication with an outside atmosphere, the ink surface is in fluid communication with the printhead, the difference in pressure between the outside atmosphere and the printhead causes the flexible member to bias toward the ink surface; and an actuator that is receives a force from the ink surface of the flexible member, the actuator actuates the valve based upon the differential pressure between the reference surface and the outside atmosphere.

BRIEF DESCRIPTION OF THE DRAWINGS

FIG. 12A is a side view of the carriage of FIG. 9A.

FIG. 12B is a side view in partial cross-section of the ink supply station in FIG. 9B.

FIGS. 16 and 17 illustrate the interconnection between the fluid interconnect on the print cartridge of FIG. 15 and the fluid interconnect on the scanning carriage.

FIGS. 25 through 30 are diagrammatic views of the process for making the flexible bag of FIG. 24.

FIG. 47 is a perspective view of a large-format inkjet printer illustrating one embodiment of the ink delivery system.

DETAILED DESCRIPTION OF THE PREFERRED EMBODIMENTS

Figure 1A:
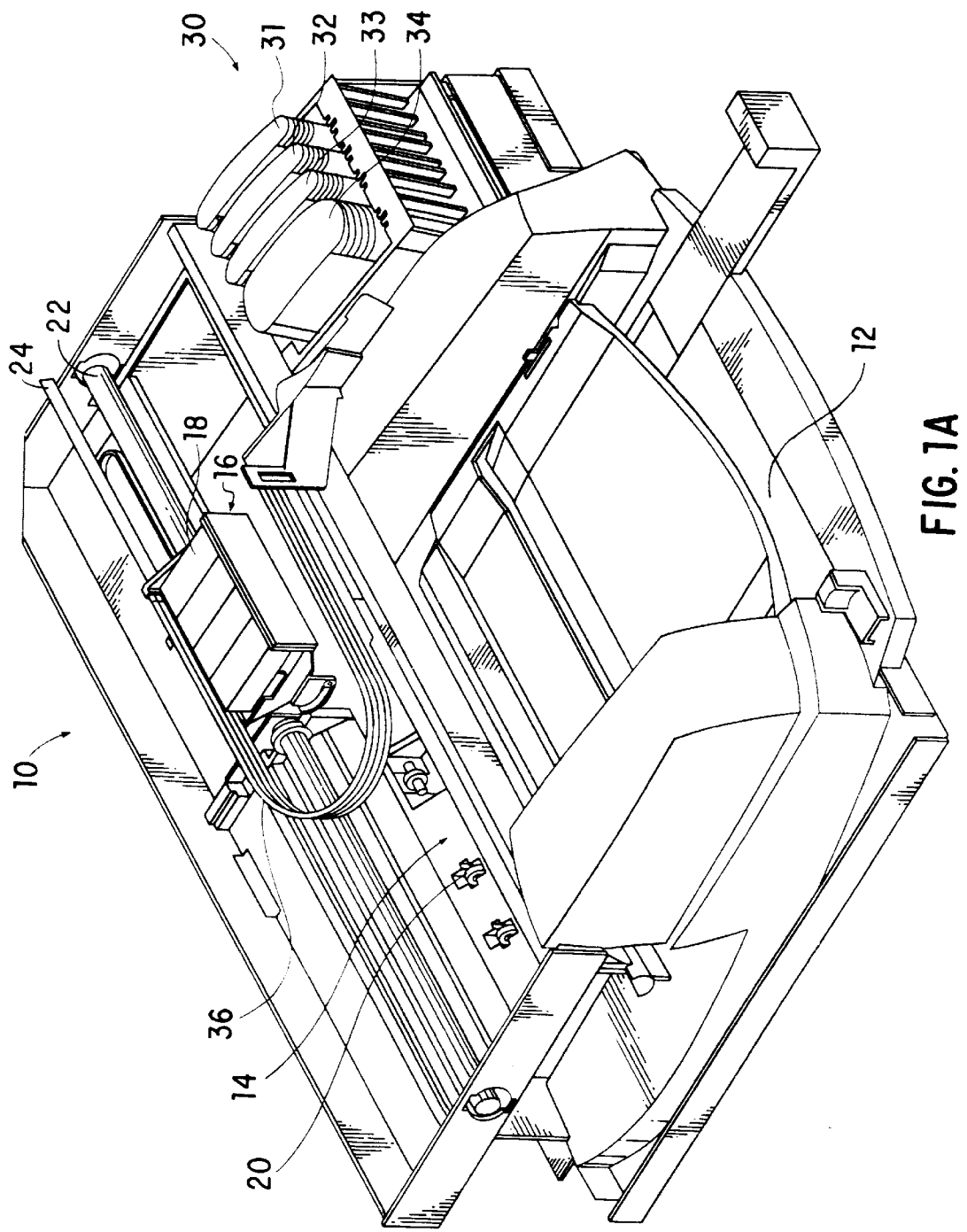
FIG. 1A is a perspective view of one embodiment of an inkjet printer incorporating the present invention.

FIG. 1A is a perspective view of one embodiment of an inkjet printer 10, with its cover removed, incorporating various inventive features. Generally, printer 10 includes a tray 12 for holding virgin paper. When a printing operation is initiated, a sheet of paper from tray 12 is fed into printer 10 using a sheet feeder, then brought around in a U direction to now travel in the opposite direction toward tray 12. The sheet is stopped in a print zone 14, and a scanning carriage 16, containing one or more print cartridges 18, is then scanned across the sheet for printing a swath of ink thereon.

After a single scan or multiple scans, the sheet is then incrementally shifted using a conventional stepper motor and feed rollers 20 to a next position within print zone 14, and carriage 16 again scans across the sheet for printing a next swath of ink. When the printing on the sheet is complete, the sheet is forwarded to a position above tray 12, held in that position to ensure the ink is dry, and then released.

Alternative embodiment printers include those with an output tray located at the back of printer 10, where the sheet of paper is fed through the print zone 14 without being fed back in a U direction.

The carriage 16 scanning mechanism may be conventional and generally includes a slide rod 22, along which carriage 16 slides, and a coded strip 24 which is optically detected by a photodetector in carriage 16 for precisely positioning carriage 16. A stepper motor (not shown), connected to carriage 16 using a conventional drive belt and pulley arrangement, is used for transporting carriage 16 across print zone 14.

The novel features of inkjet printer 10 and the other inkjet printers described in this specification relate to the ink delivery system for providing ink to the print cartridges 18 and ultimately to the ink ejection chambers in the printheads. This ink delivery system includes an off-axis ink supply station 30 containing replaceable ink supply cartridges 31, 32, 33, and 34, which may be pressurized or at atmospheric pressure. For color printers, there will typically be a separate ink supply cartridge for black ink, yellow ink, magenta ink, and cyan ink.

Four tubes 36 carry ink from the four replaceable ink supply cartridges 31–34 to the four print cartridges 18.

Various embodiments of the off-axis ink supply, scanning carriage, and print cartridges will be described herein.

Figure 1B:
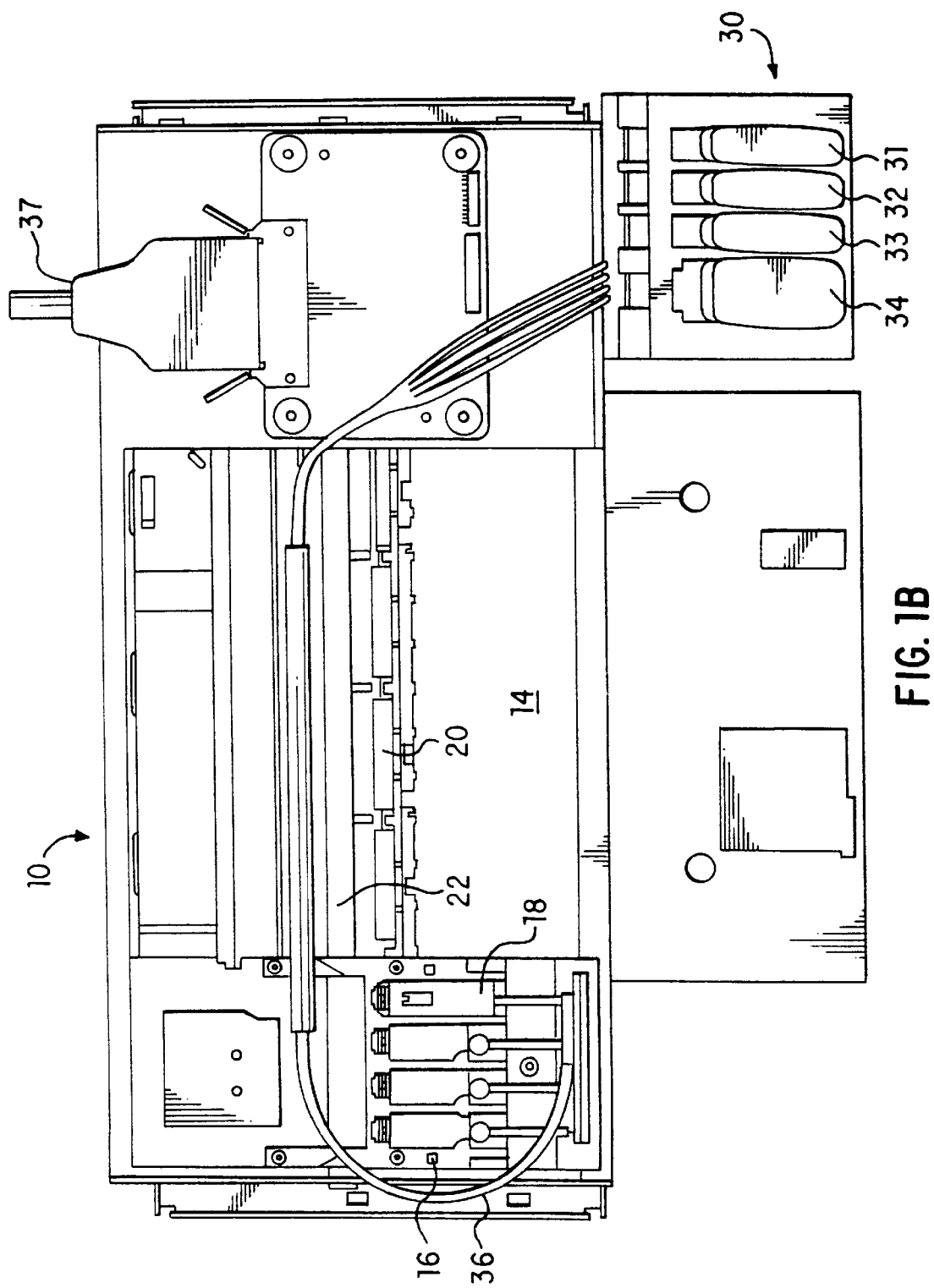
FIG. 1B is a top down view of another inkjet printer incorporating the present invention.

FIG. 1B is a top down view of another printer 10 very similar to that shown in FIG. 1A, but with the paper tray removed. An electrical connector 37 is shown connected between printer 10 and a personal computer. Elements throughout the various figures identified with the same numerals may be identical.

Figure 2:
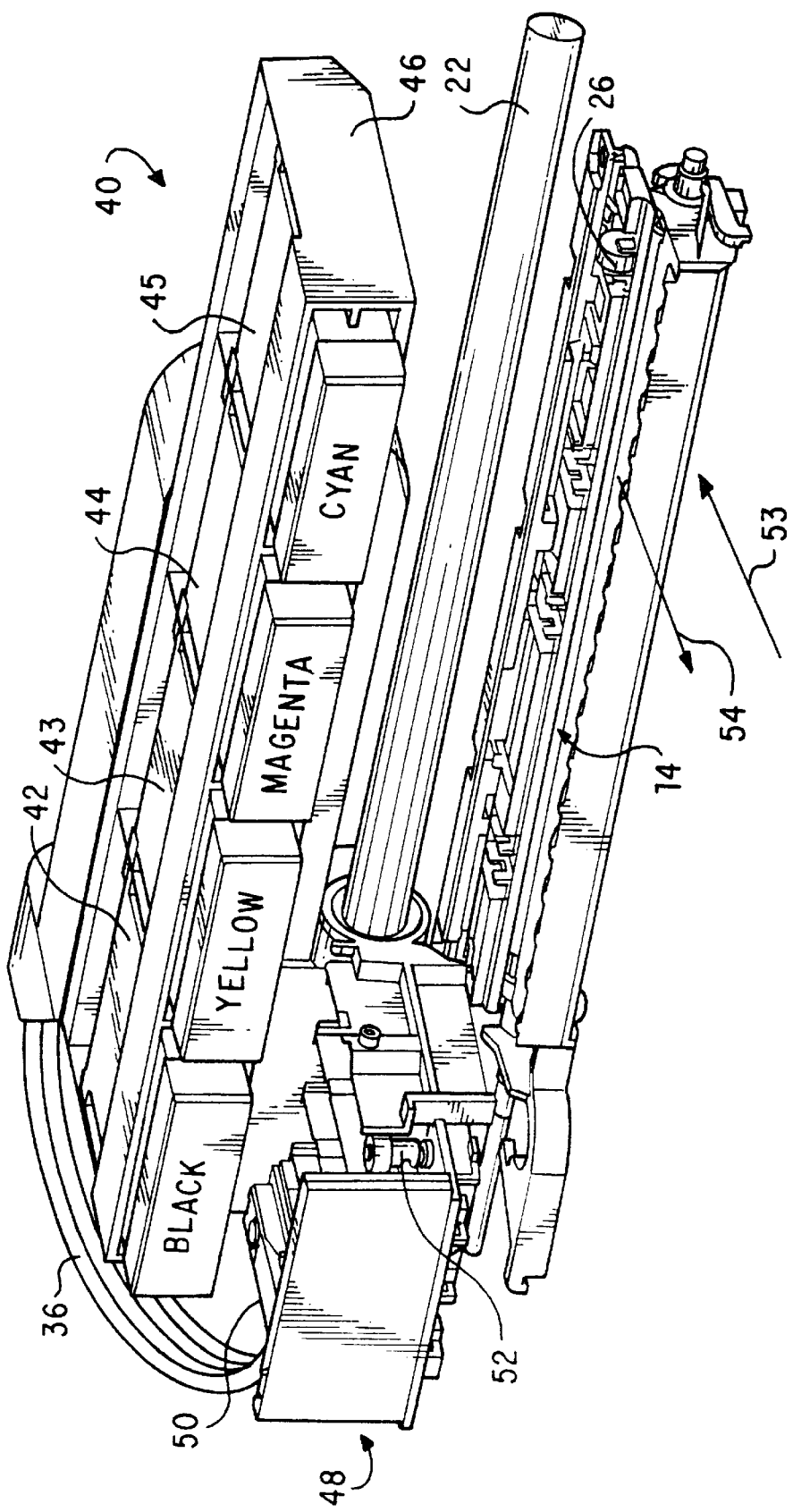
FIG. 2 is a perspective view of the ink delivery system and carriage of another embodiment inkjet printer incorporating the present invention.

FIG. 2 illustrates the ink delivery system of an alternative embodiment printer 40. In this embodiment, four replaceable ink supply cartridges 42–45 are shown installed in a fixed station 46 above a scanning carriage 48. This particular location of station 46 and the horizontal arrangement of ink supply cartridges 42–45 results in an efficient utilization of available space within printer 40. In another embodiment, station 46 may be located virtually anywhere within printer 40.

A single print cartridge 50 is shown installed in carriage 48. Four tubes 36, each connected to an ink supply cartridge 42–45, are in fluid connection with a rubber septum 52 for each of the four stalls in carriage 48. A hollow needle 60 (FIG. 3A) formed as part of each print cartridge 50 is inserted through the rubber septum 52 upon pushing the print cartridge 50 into its associated stall within carriage 48 so that a fluid communication path exists between a particular ink supply cartridge 42–45 and a particular print cartridge 50 for providing a supply of ink to the print cartridge 50.

A sheet of paper enters through the bottom portion of printer 40 in the direction of arrow 53, then guided back in a U direction, and transported through the print zone 14 in the direction of arrow 54. Carriage 48 then scans across print zone 14 for printing on the sheet. In another embodiment, a sheet of paper enters the print zone 14 in the direction of arrow 53.

Figure 3A:
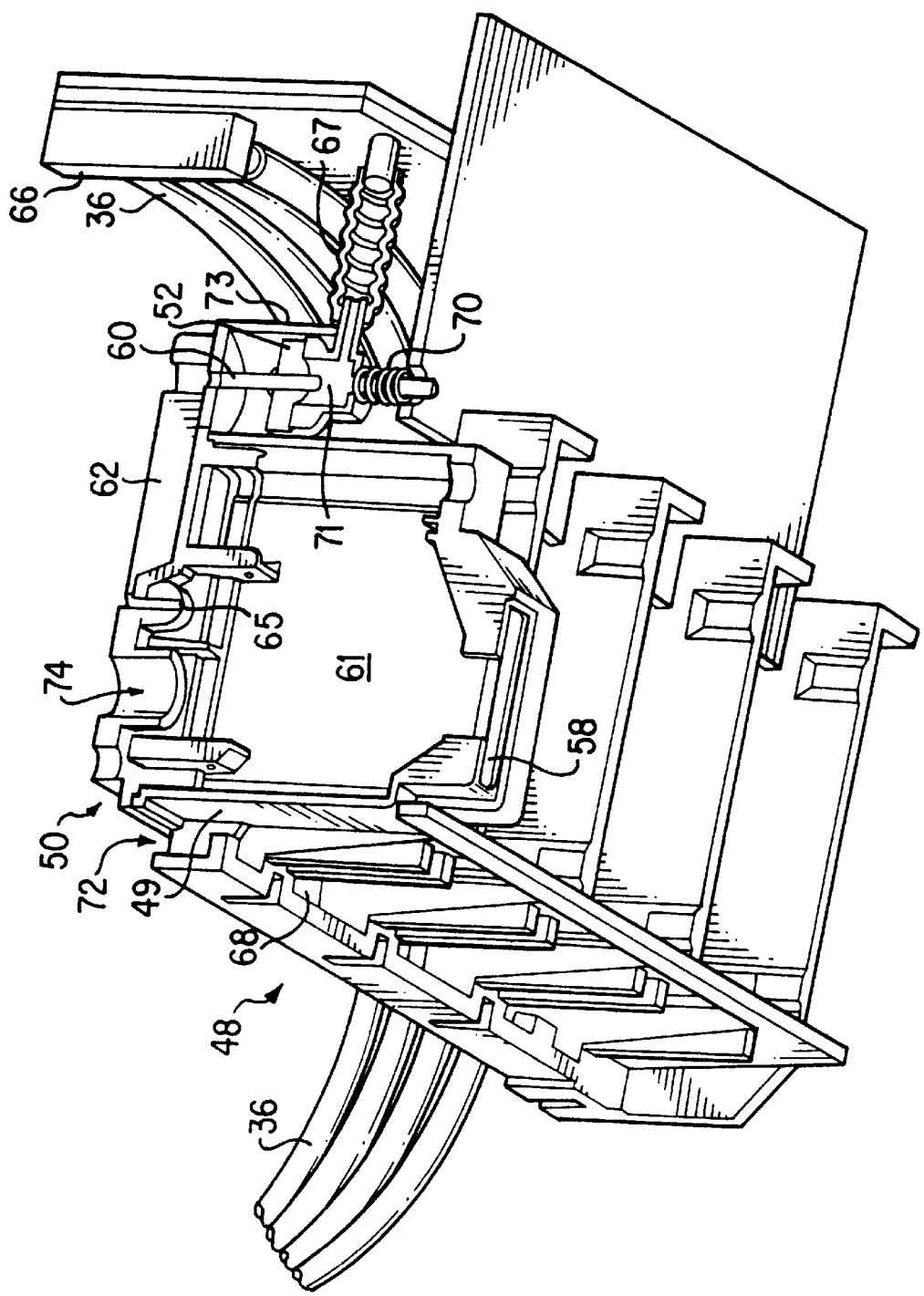
FIG. 3A illustrates the preferred carriage with one embodiment of the print cartridge in cross-section.

FIG. 3A is a perspective view looking up at carriage 48, showing print cartridge 50 and septum 52 in cross-section. This cross-section does not show a regulator valve within print cartridge 50 that regulates pressure by opening and closing hole 65. An opening in the bottom of carriage 48 exposes the printhead location 58 of each print cartridge 50. Carriage electrodes 49 oppose contact pads located on print cartridge 50.

When the aforementioned regulator valve is opened, a hollow needle 60 is in fluid communication with an ink chamber 61 internal to print cartridge 50. The hollow needle 60 extends through a self-sealing slit formed through the center of septum 52. This self-sealing slit is automatically sealed by the resiliency of the rubber septum 52 when needle 60 is removed.

A plastic ink conduit 62 leads from needle 60 to ink chamber 61 via hole 65. Conduit 62 may also be integral to the print cartridge body. Conduit 62 may be glued, heat-staked, ultrasonically welded, or otherwise secured to the print cartridge body.

Ink is provided to carriage 48 by tubes 36 which connect to a plastic manifold 66. Tubes 36 may be formed of Polyvinylidene Chloride (PVDC), such as Saran™, or other suitable plastic. Tubes 36 may also be formed of a very flexible polymer material and dipped in PVDC for reducing air diffusion through the tubes. In the preferred embodiment, non-pressurized ink tubes 36 have an internal diameter between approximately 1.5–2.5 mm, while pressurized ink tubes 36 have an internal diameter between approximately 1–1.5 mm. Manifold 66 provides several 90° redirections of ink flow. Such a manifold 66 may not be needed if tubes 36 are sufficiently slender and can be bent without buckling. A pressurized off-axis ink supply (described later) may utilize such slender tubing. An alternative to manifold 66 is a series of elbows molded or formed out of heat formed tubing.

A septum elbow 71 routes ink from manifold 66 to septum 52 and supports septum 52. Septum 52 is affixed to elbow 71 using a crimp cap 73.

A bellows 67 (shown in cross-section) is provided for each of the individual stalls 68 for allowing a degree of x, y, and z movement of septum 52 when needle 60 is inserted into septum 52 to minimize the x, y, and z load on needle 60 and ensure a fluid-tight and air-tight seal around needle 60. Bellows 67 may be formed of butyl rubber, high acn nitrile, or other flexible material with low vapor and air transmission properties. Bellow 67 can be any length and can even be a flexible diaphram.

A spring 70 urges septum 52 upward. This allows septum 52 to take up z tolerances, minimizes the load on needle 60, and ensures a tight seal around needle 60.

Slots 72 formed on each of the stalls 68 in carriage 48 align with tabs on each print cartridge 50 to restrict movement of the print cartridge 50 within the stall 68.

An air vent 74 formed in the top of print cartridge 50 is used by a pressure regulator in print cartridge 50, to be described later. In an alternative embodiment, a separate regulator may be connected between the off-axis ink supply and each print cartridge 50.

Figure 3B:
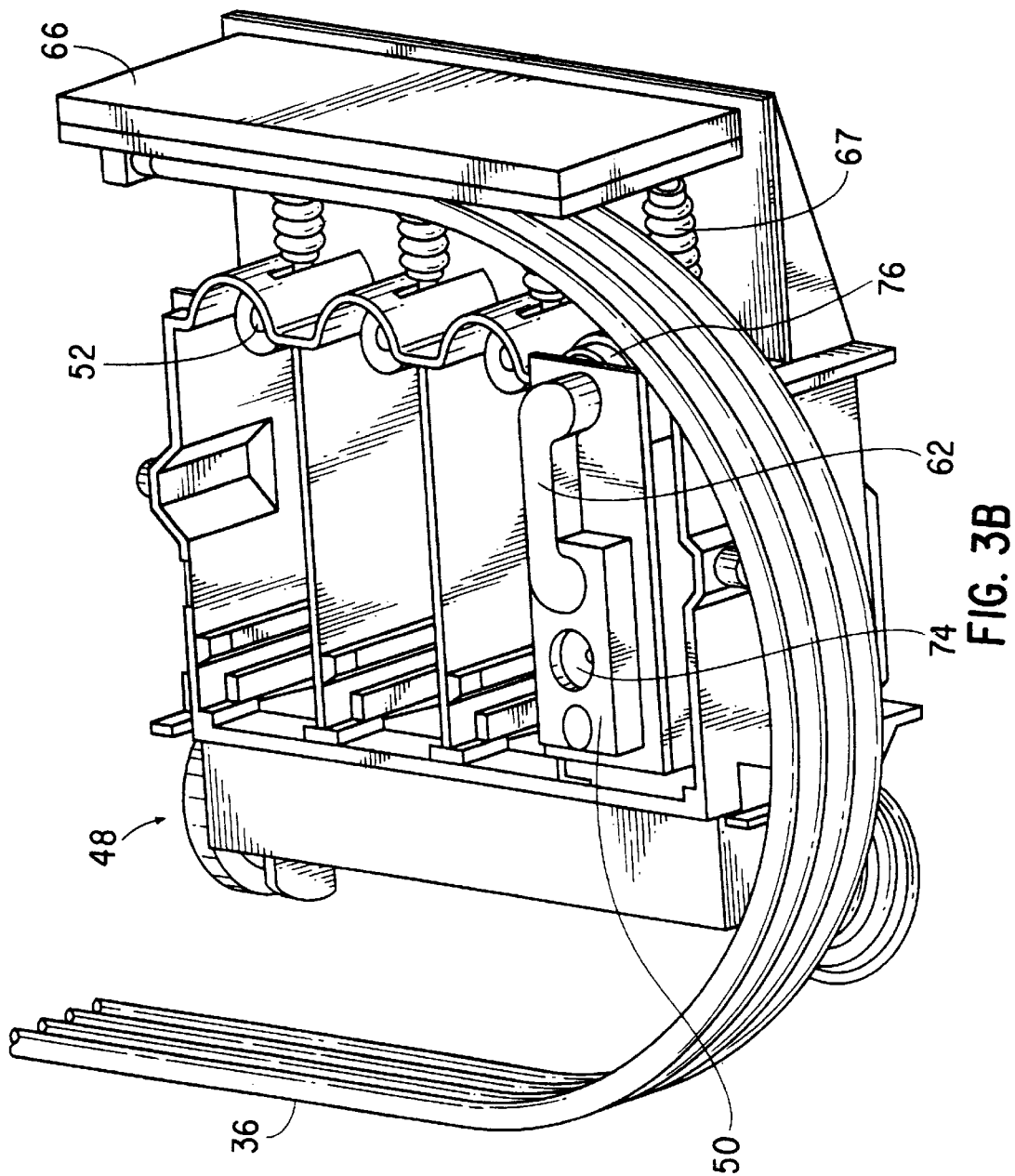
FIG. 3B is a perspective view looking down on a carriage with one print cartridge installed.

FIG. 3B is a perspective view of carriage 48 looking down on carriage 48 and showing one print cartridge 50 installed.

In other embodiments, shown in FIGS. 3C–3F, bellows 67 is replaced with a U-shaped, circular, or straight flexible tube.

Figure 3C:
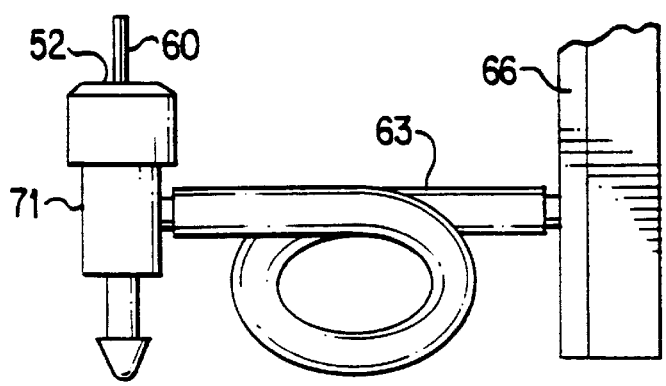
FIG. 3C illustrates the use of a flexible tube connected to a rigid elbow member and to a manifold.

FIG. 3C illustrates a circular flexible tube 63 connected between elbow 71 and manifold 66.

Figure 3D:
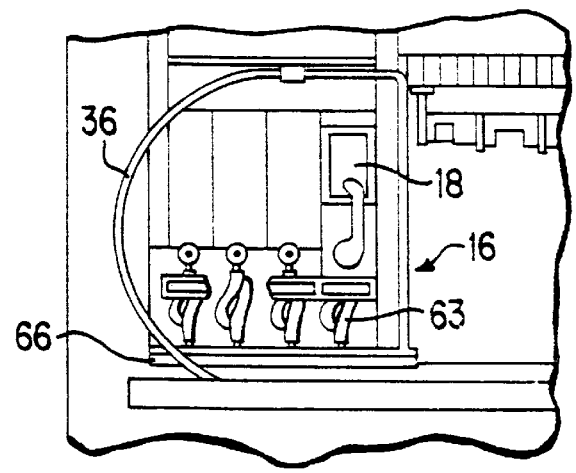
FIG. 3D is a top down view of a carriage incorporating the flexible tube of FIG. 3C.

FIG. 3D is a top down view of the carriage 16 incorporating tube 63.

Figure 3E:
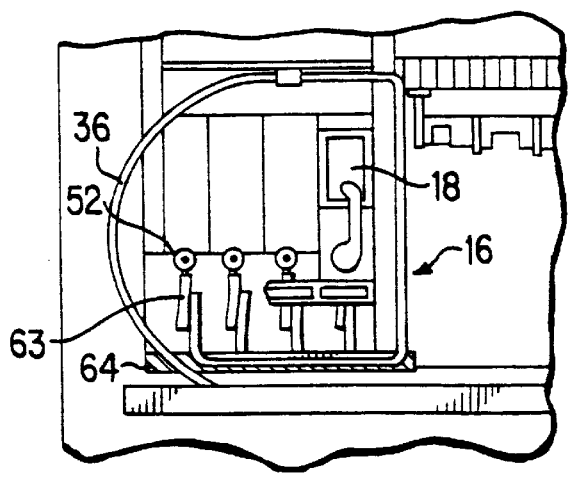
FIG. 3E is a top down view of a carriage without a manifold and incorporating a flexible tube connected to a rigid elbow member.

In another embodiment, shown in FIG. 3E, manifold 66 is deleted, and tubes 63 are connected to (or are part of) tube 36. A plastic guide 64 may be used to guide the tubes 63.

Figure 3F:
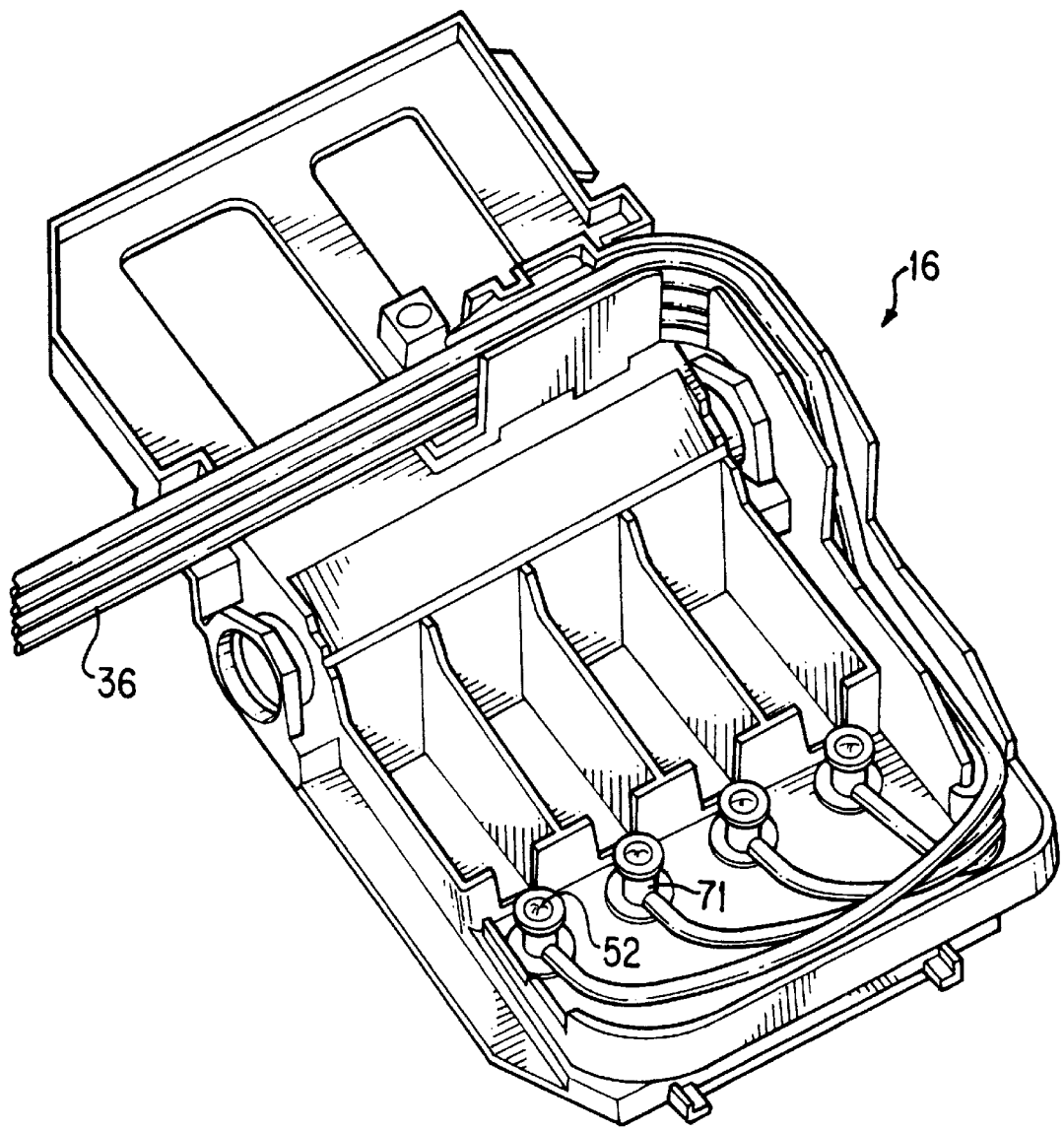
FIG. 3F is a perspective view of a carriage without a manifold and incorporating a flexible tube connected to a rigid elbow member.

In FIG. 3F, the tubes 36 are directly connected to the rigid plastic elbow 71 supporting septum 52 without being coiled.

If desired, the print cartridges can be secured within the scanning carriage by individual latches, which may be manually operated or spring loaded, where the latches press down on a tab or a corner of the print cartridge. In another embodiment, a single latch, such as a hinged bar, secures all four print cartridges in place within the carriage.

Figure 4:
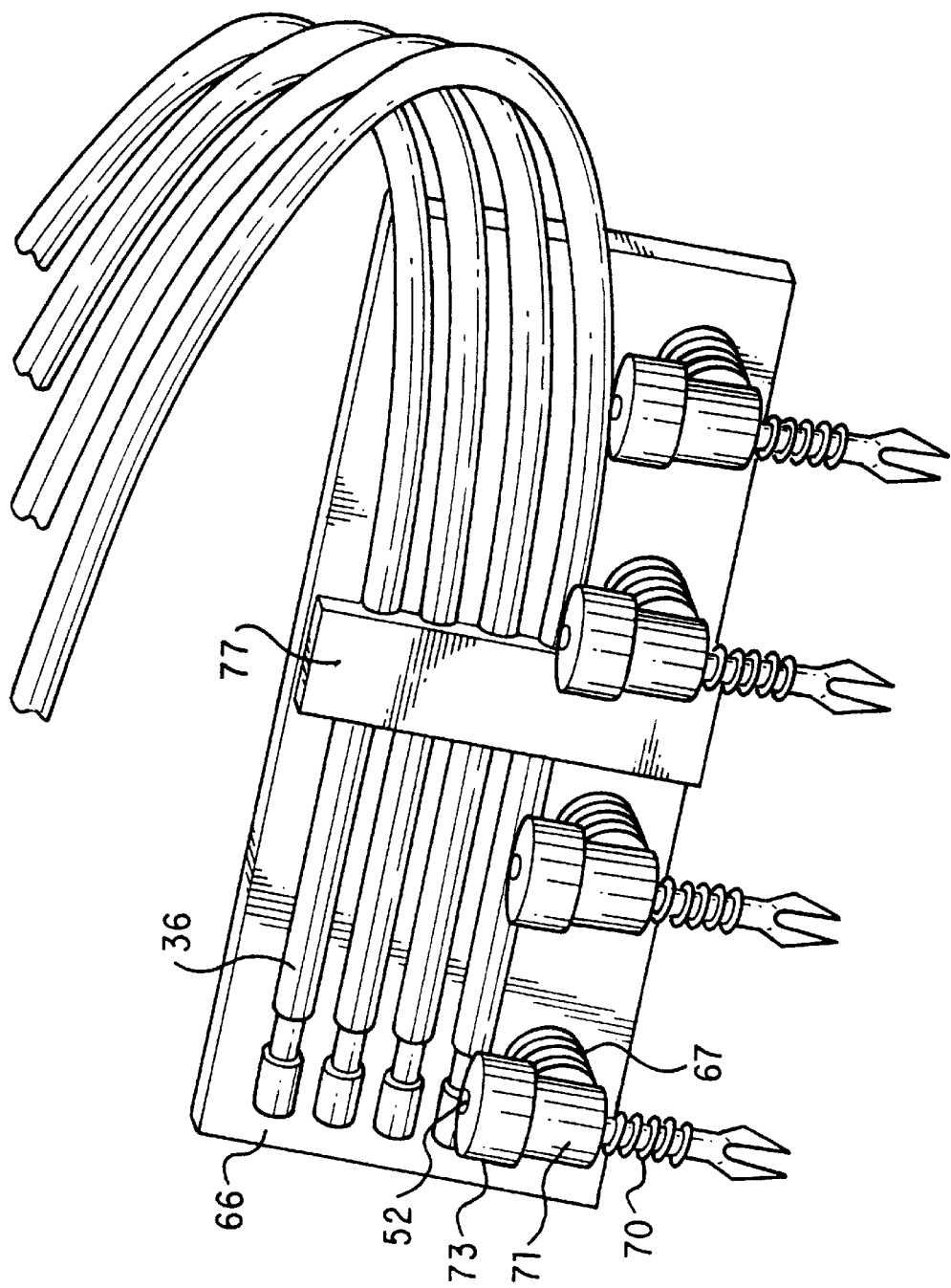
FIG. 4 is a detailed view of the interface between the flexible tubes connected to the external ink supply and the fluid interconnect located on the carriage.

FIG. 4 is a detailed view of manifold 66, tubes 36, crimp cap 73, septum 52, septum elbow 71, spring 70, and bellows 67 described with respect to FIG. 3A. A stress reliever 77 for tubes 36 is also shown.

Figure 5A:
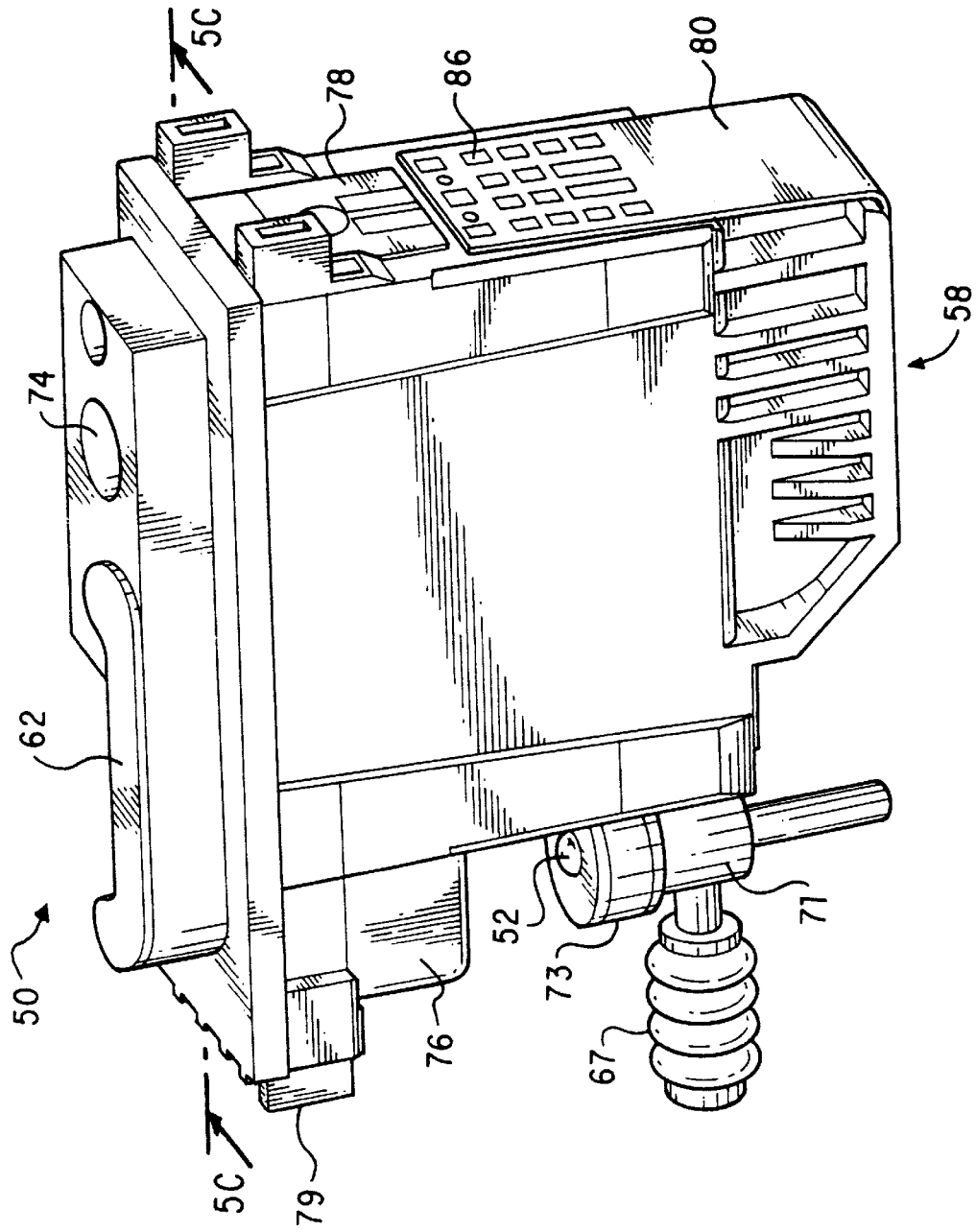
FIG. 5A is a perspective view of the preferred print cartridge and the fluid interconnect portion of the carriage.

FIG. 5A is a perspective view of one embodiment of print cartridge 50. A shroud 76 (also shown in FIG. 3B) surrounds needle 60 (obscured by shroud 76) to prevent inadvertent contact with needle 60 and also to help align septum 52 (FIG. 3A) with needle 60 when installing print cartridge 50 in carriage 48.

Coded tabs 79 align with coded slots in the carriage stalls 68 to ensure the proper color print cartridge 50 is placed in the proper stall 68. In another embodiment, coded tabs 79 are located on shroud 76.

A flexible tape 80 containing contact pads 86 leading to the printhead substrate is secured to print cartridge 50. These contact pads 86 align with and electrically contact electrodes 49 (FIG. 3A) on carriage 48. Preferably, the electrodes on carriage 48 are resiliently biased toward print cartridge 50 to ensure a reliable contact. Such carriage electrodes are found in U.S. Pat. No. 5,408,746, entitled Datum Formation for Improved Alignment of Multiple Nozzle Members in a Printer, by Jeffrey Thoman et al., assigned to the present assignee and incorporated herein by reference.

The printhead nozzle array is at location 58. An integrated circuit chip 78 provides feedback to the printer regarding certain parameters of print cartridge 50.

Figure 5B:
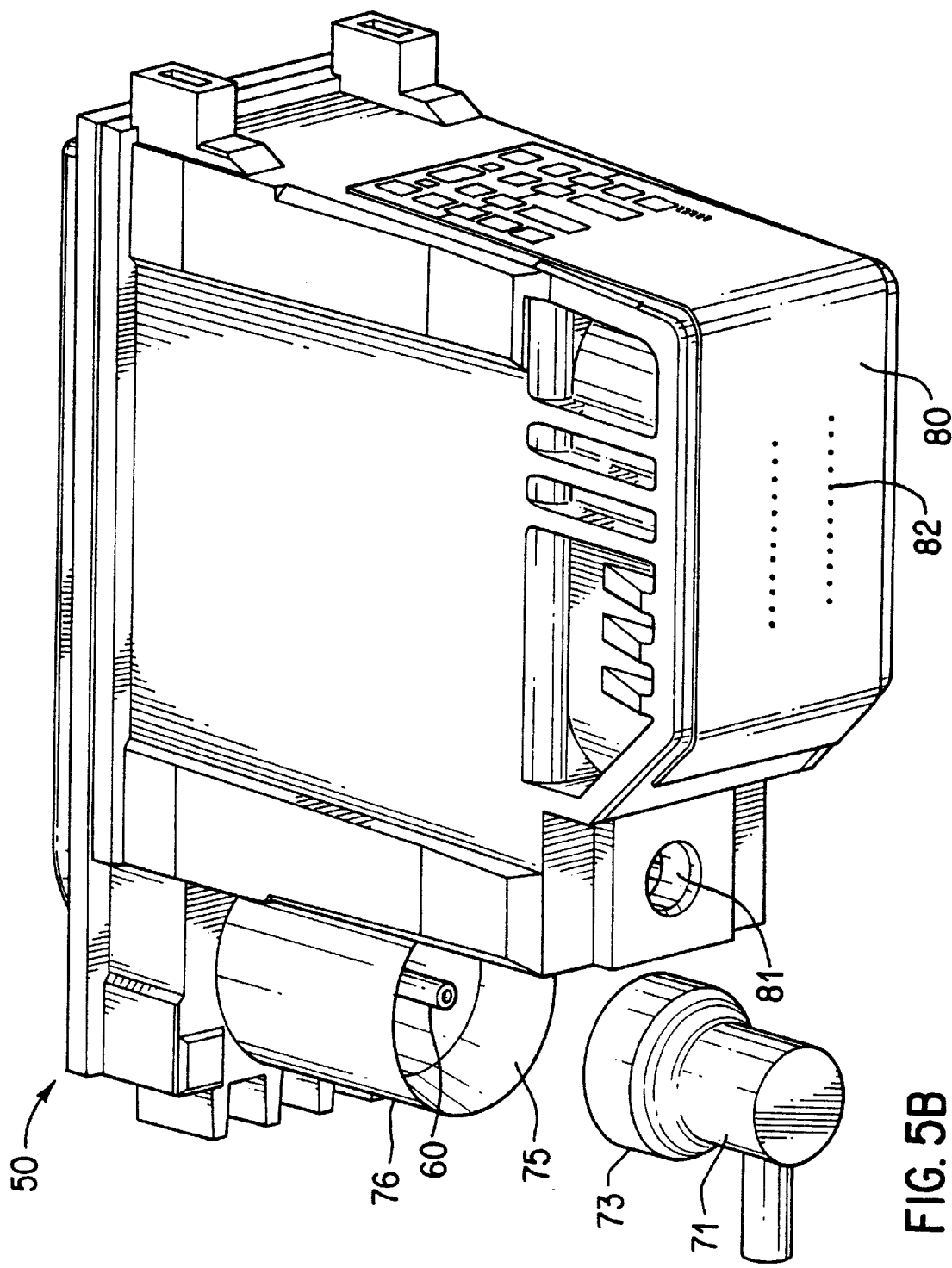
FIG. 5B is another perspective view of the preferred print cartridge and fluid interconnect of the carriage.

FIG. 5B illustrates the bottom side of print cartridge 50. Two parallel rows of offset nozzles 82 are shown laser ablated through tape 80. An ink fill hole 81 is used to initially fill print cartridge 50 with ink. A stopper (not shown) is intended to permanently seal hole 81 after the initial filling.

Figure 5C:
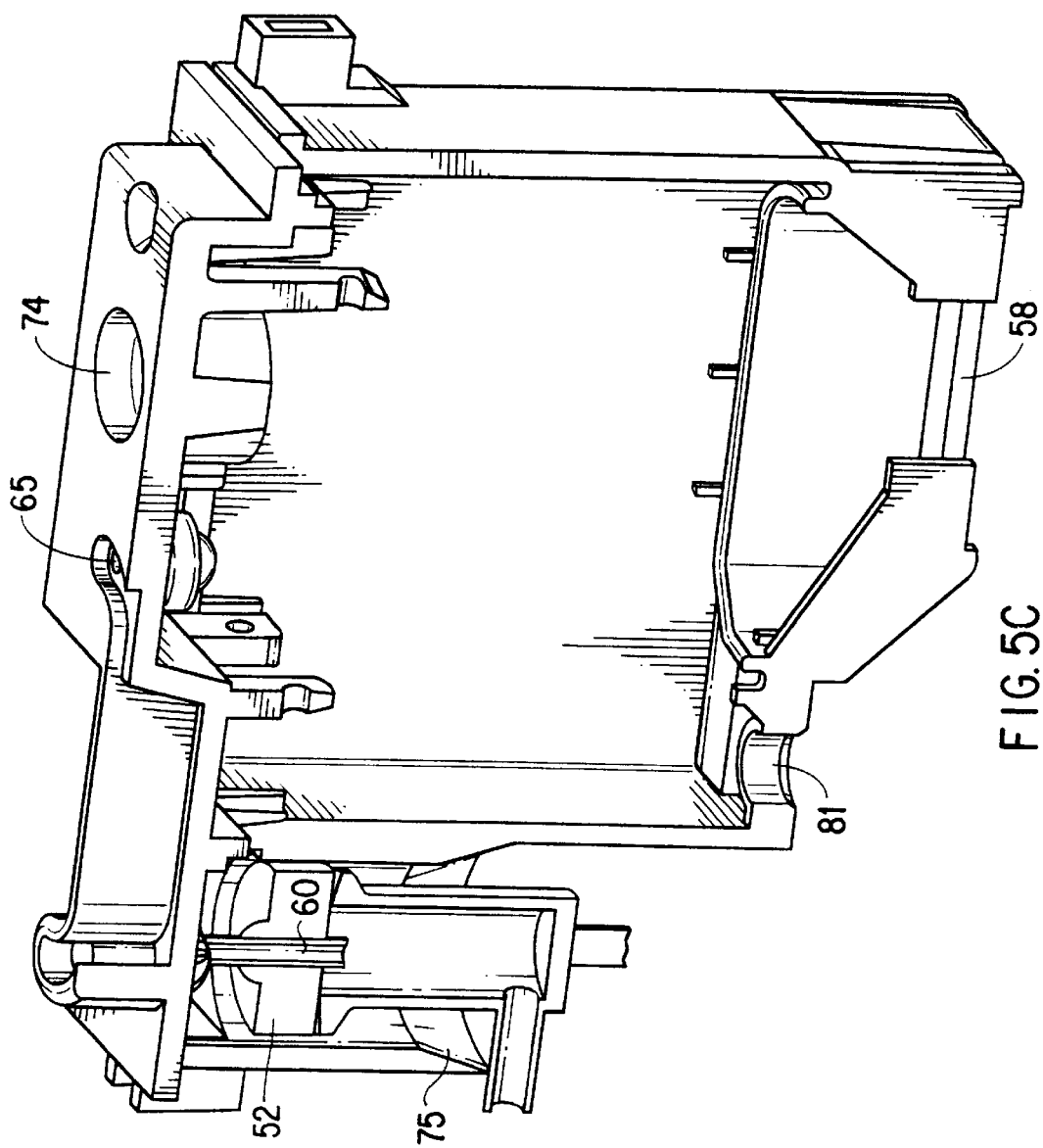
FIG. 5C is a cross-sectional view of the print cartridge of FIG. 5B now connected to the fluid interconnect on the carriage.

FIG. 5C is a cross-sectional view of print cartridge 50, without tape 80, taken along line 5C—5C in FIG. 5A. Shroud 76 is shown having an inner conical or tapered portion 75 to receive septum 52 and center septum 52 with respect to needle 60. In an alternative embodiment, needle 60 is part of a separate subassembly, and shroud 76 is a separate subassembly, for manufacturing ease and to allow color key changing by changing the shroud, assuming the color key tabs are located on the shroud.

The print cartridges and ink supply connections described above are down-connect types where the ink connection is made when pressing the print cartridge down into the carriage. This enables a resulting printer to have a very low profile since the ink path does not extend above the print cartridge. In the embodiments shown having the needle extending from the print cartridge, the needle may be replaced with a septum, and the septum on the scanning carriage replaced with a hollow needle.

Figure 6:
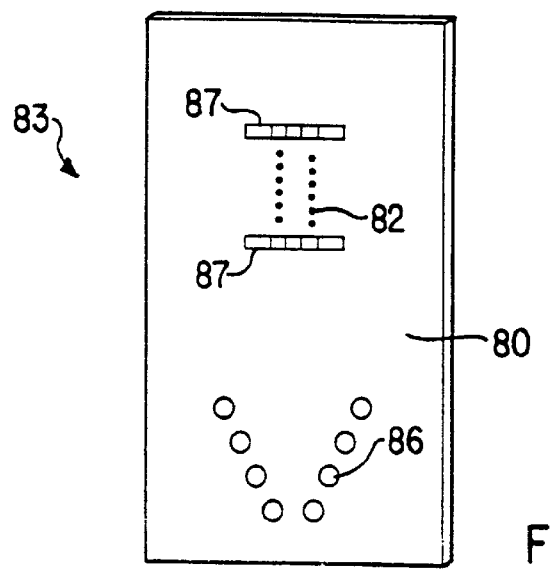
FIG. 6 is a simplified front view of the print head assembly on a preferred print cartridge.
Figure 7:
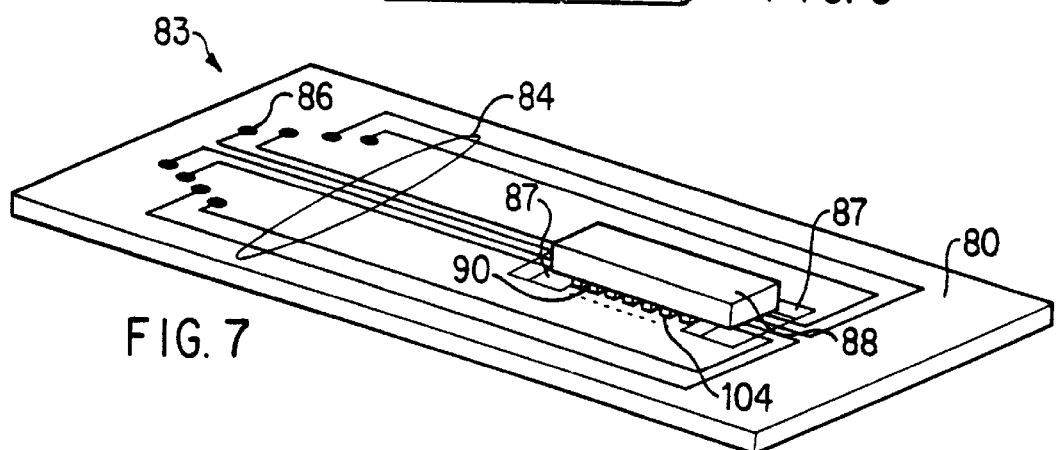
FIG. 7 is a perspective view of the back side of the printhead assembly.
Figure 8:
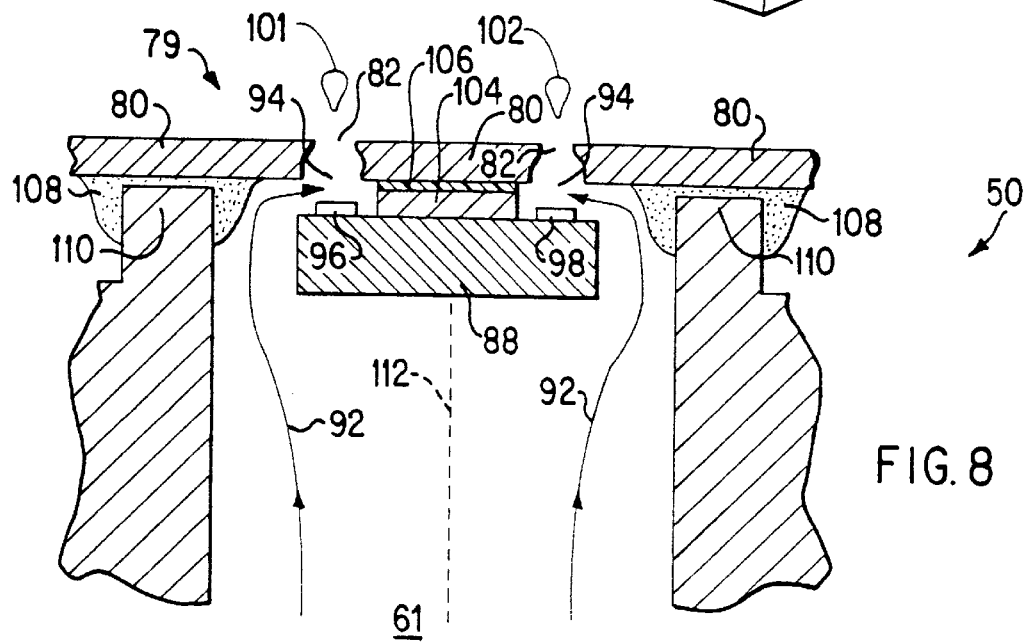
FIG. 8 is a cross-sectional view of the portion of the print cartridge containing the printhead assembly showing the flow of ink to the ink ejection chambers in the printhead.

FIGS. 6, 7, and 8 illustrate the basic principles of the printhead assembly 83. Printhead assembly 83 is preferably a flexible polymer tape 80 (FIG. 5B) having nozzles 82 formed therein by laser ablation. Conductors 84 (FIG. 7) are formed on the back of tape 80 and terminate in contact pads 86 for contacting electrodes on carriage 48. The other ends of conductors 84 are bonded through windows 87 to terminals of a substrate 88 (FIG. 7) on which are formed the various ink ejection chambers and ink ejection elements. The ink ejection elements may be heater resistors or piezoelectric elements. The printhead assembly may be similar to that described in U.S. Pat. No. 5,278,584, by Brian Keefe, et al., entitled "Ink Delivery System for an Inkjet Printhead," assigned to the present assignee and incorporated herein by reference. In such a printhead assembly, ink within print cartridge 50 flows around the edges of the rectangular substrate 88 and into ink channels 90 leading to each of the ink ejection chambers.

FIG. 8 illustrates the flow of ink 92 from the ink chamber 61 within print cartridge 50 to ink ejection chambers 94. Energization of the ink ejection elements 96 and 98 cause a droplet of ink 101, 102 to be ejected through the associated nozzles 82. A photoresist barrier layer 104 defines the ink channels and chambers, and an adhesive layer 106 affixes the flexible tape 80 to barrier layer 104. Another adhesive 108 provides a seal between tape 80 and the plastic print cartridge body 110. In one embodiment, a wall 112 separates the ink flow paths around the two edges of substrate 88, and a different color ink is supplied to each side of wall 112.

The conductor portion of the flexible tape 80 is glued or heat-staked to the print cartridge body 110.

A demultiplexer on substrate 88 demultiplexes the incoming electrical signals applied to contact pads 86 and selectively energizes the various ink ejection elements to eject droplets of ink from nozzles 82 as printhead 79 scans across the print zone. In one embodiment, the dots per inch (dpi) resolution is 300 dpi, and there are 300 nozzles 82. In another embodiment, at least the black ink cartridge prints at a resolution of 600 dpi.

Figure 9B:
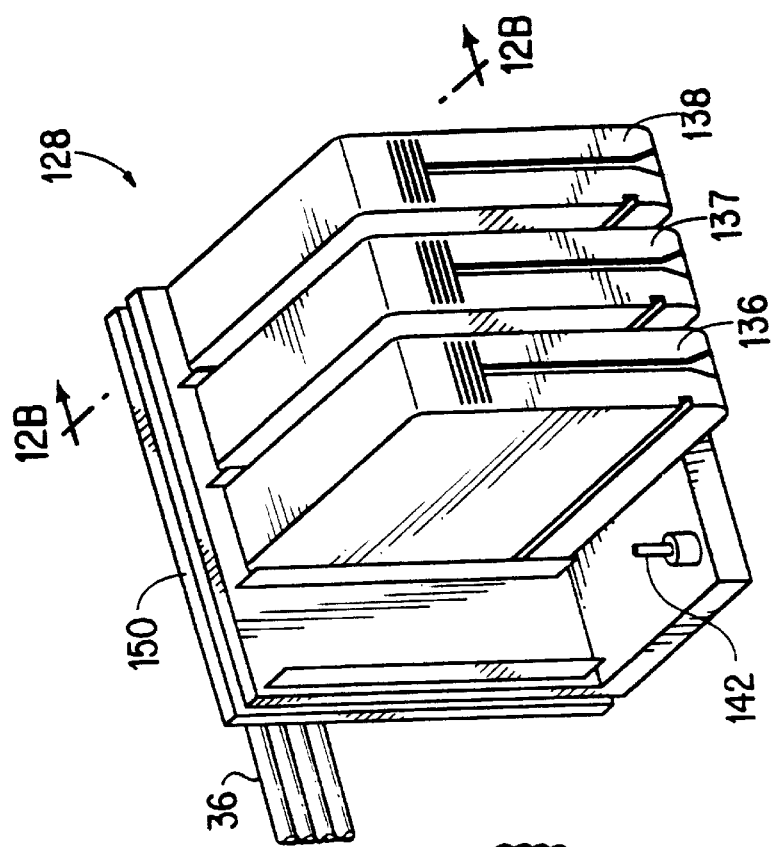
FIG. 9B is an ink supply station having ink supply cartridges installed therein in accordance with one embodiment of the invention.
Figure 9A:
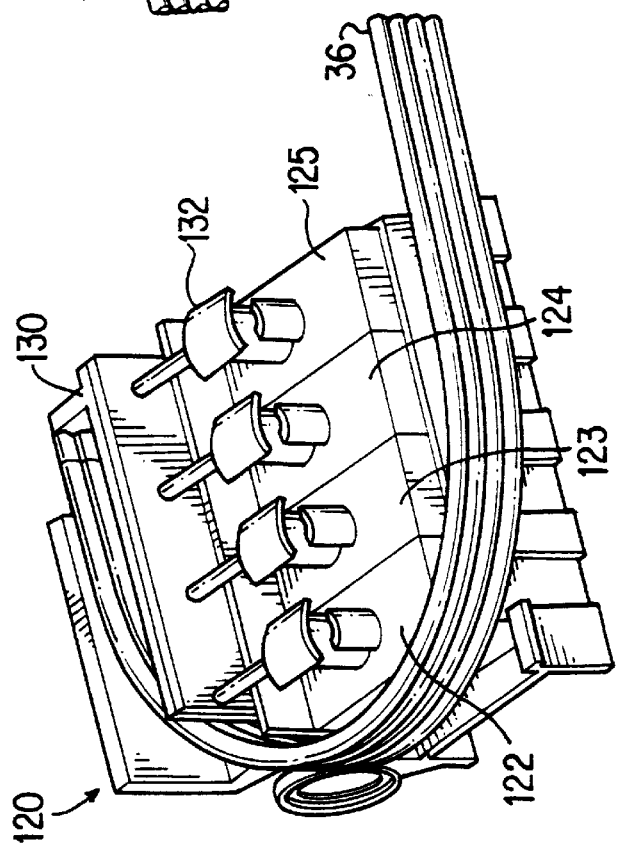
FIG. 9A is a perspective view of a scanning carriage incorporating four print cartridges in accordance with another embodiment of the invention.
Figure 10:
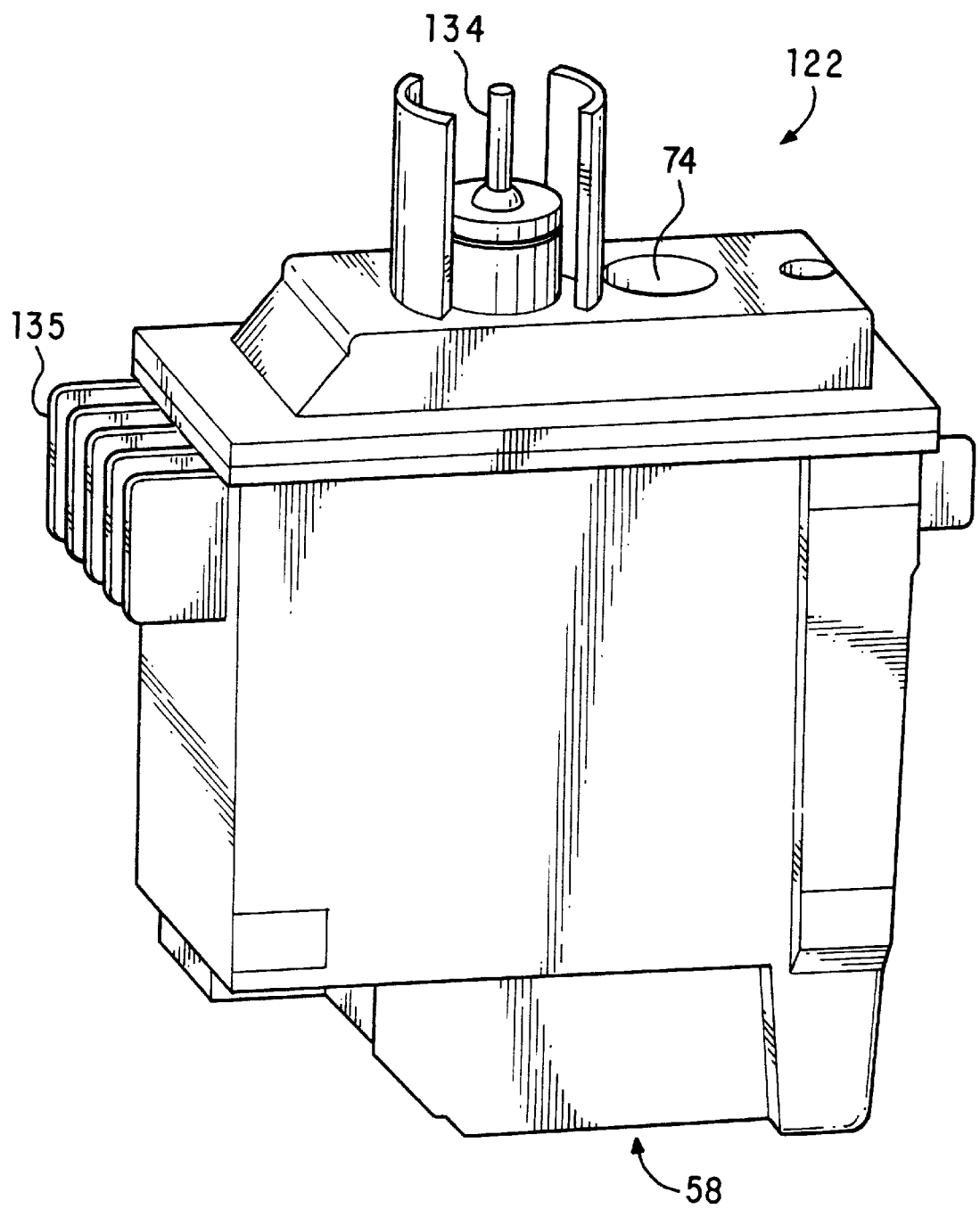
FIG. 10 is a perspective view of another embodiment print cartridge.
Figure 11A:
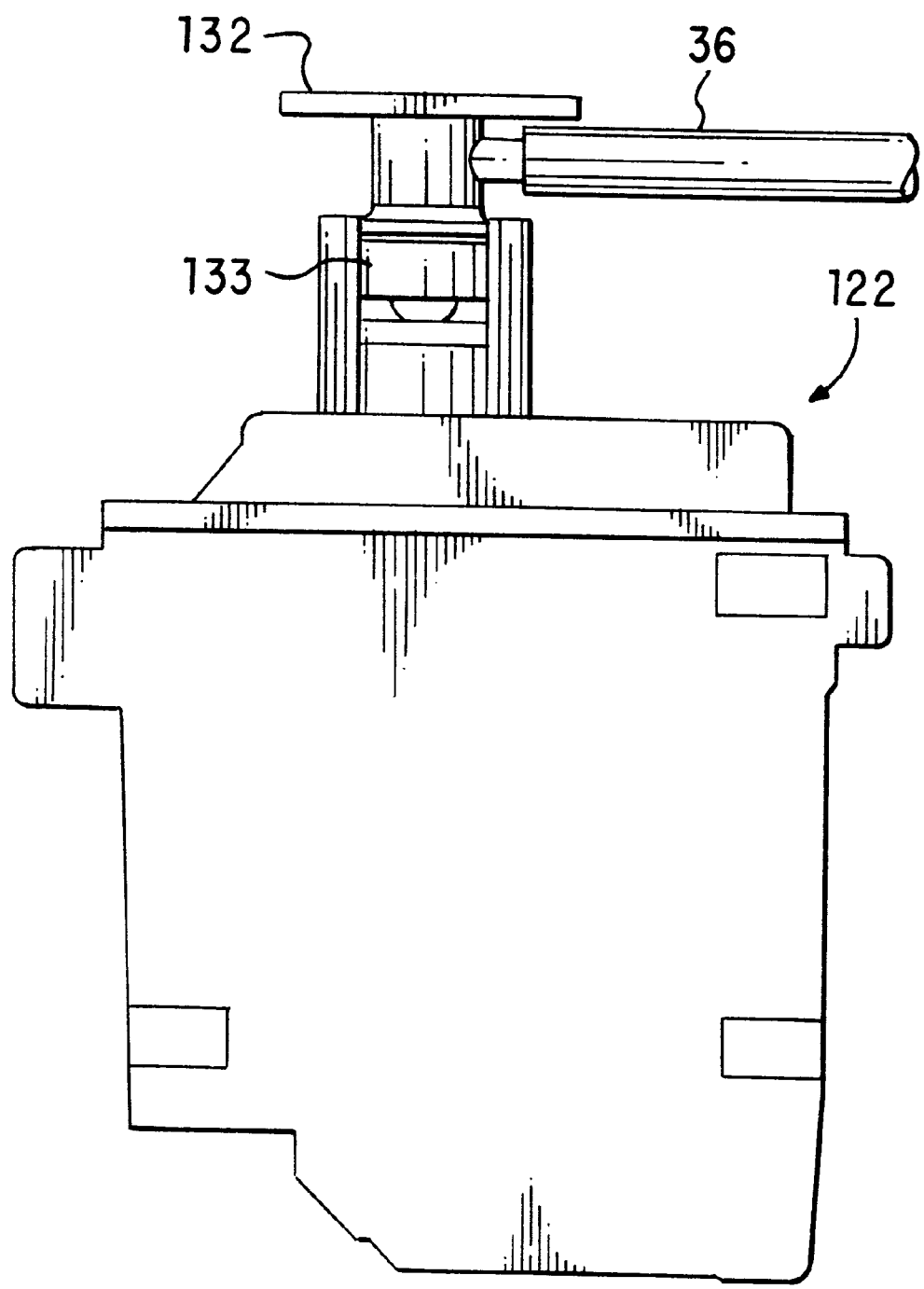
FIG. 11A is a side view of the print cartridge of FIG. 10 connected to a fluid interconnect on the scanning carriage.

FIG. 9A is a perspective view of another embodiment scanning carriage 120 having four print cartridges 122–125 installed. One of the print cartridges 122 is shown in FIG. 10. Tubes 36 from an off-axis ink supply station 128 (FIG. 9B) supply ink to a manifold 130 which redirects the ink to a 90° interface cap 132 for each of print cartridges 122–125. Preferably, each cap 132 is of a color similar to the color ink within each print cartridge 122–125. This embodiment differs from that shown in FIG. 3A in that the ink is coupled to print cartridges 122–125 by pressing a septum 133 (FIG. 11) down onto a hollow needle 134 (FIG. 10) extending from the top of the print cartridge 122, rather than pressing a needle 60 (FIG. 3A) down into the septum 52 (FIG. 3A). Also shown in FIG. 10 are air vent 74 for an internal pressure regulator, coded tabs 135 for ensuring the proper color print cartridge is installed in the proper carriage stall, and the location 58 of the printhead.

Figure 12C:
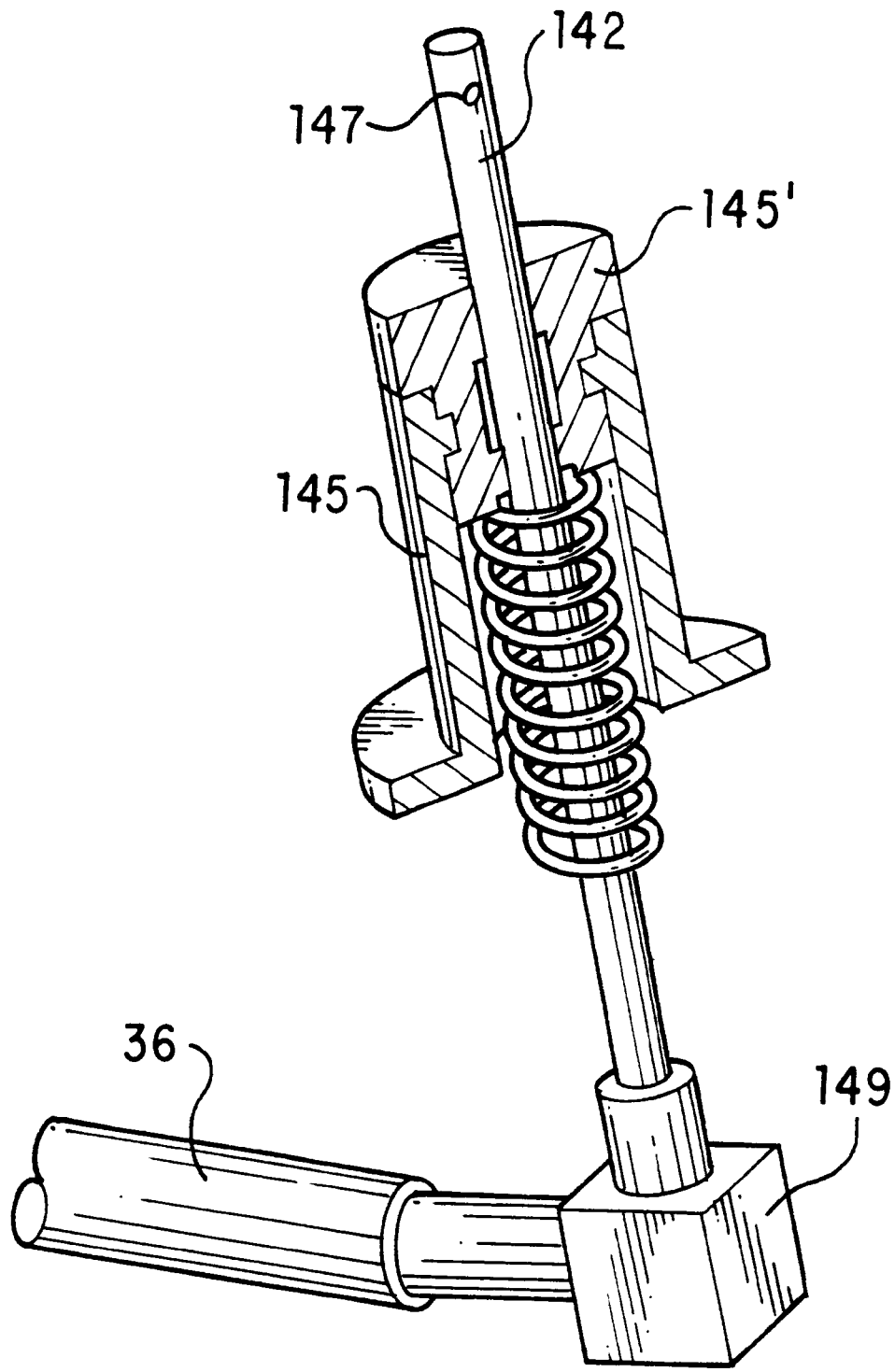
FIG. 12C is a detailed view of the fluid interconnect portion located on the ink supply station for connection to an ink supply cartridge.

In the particular embodiment shown in FIG. 9B, only three out of the four color ink supply cartridges 136–139 are installed in ink supply station 128. A hollow needle 142 extending from a stall in the ink supply station 128, to be described in greater detail with respect to FIGS. 12B and 12C, is in fluid communication with one of tubes 36. The ink within each of ink supply cartridges 136–139 is at atmospheric pressure, and ink is drawn into each of print cartridges 122–125 by a negative pressure within each print cartridge 122–125 determined by a regulator internal to each print cartridge.

In another embodiment, to be described later, the off-axis ink supply cartridges are pressurized. In both the pressurized and unpressurized ink supply embodiments, the regulator internal to each print cartridge regulates the pressure of ink supplied to the print cartridge.

Figure 11B:
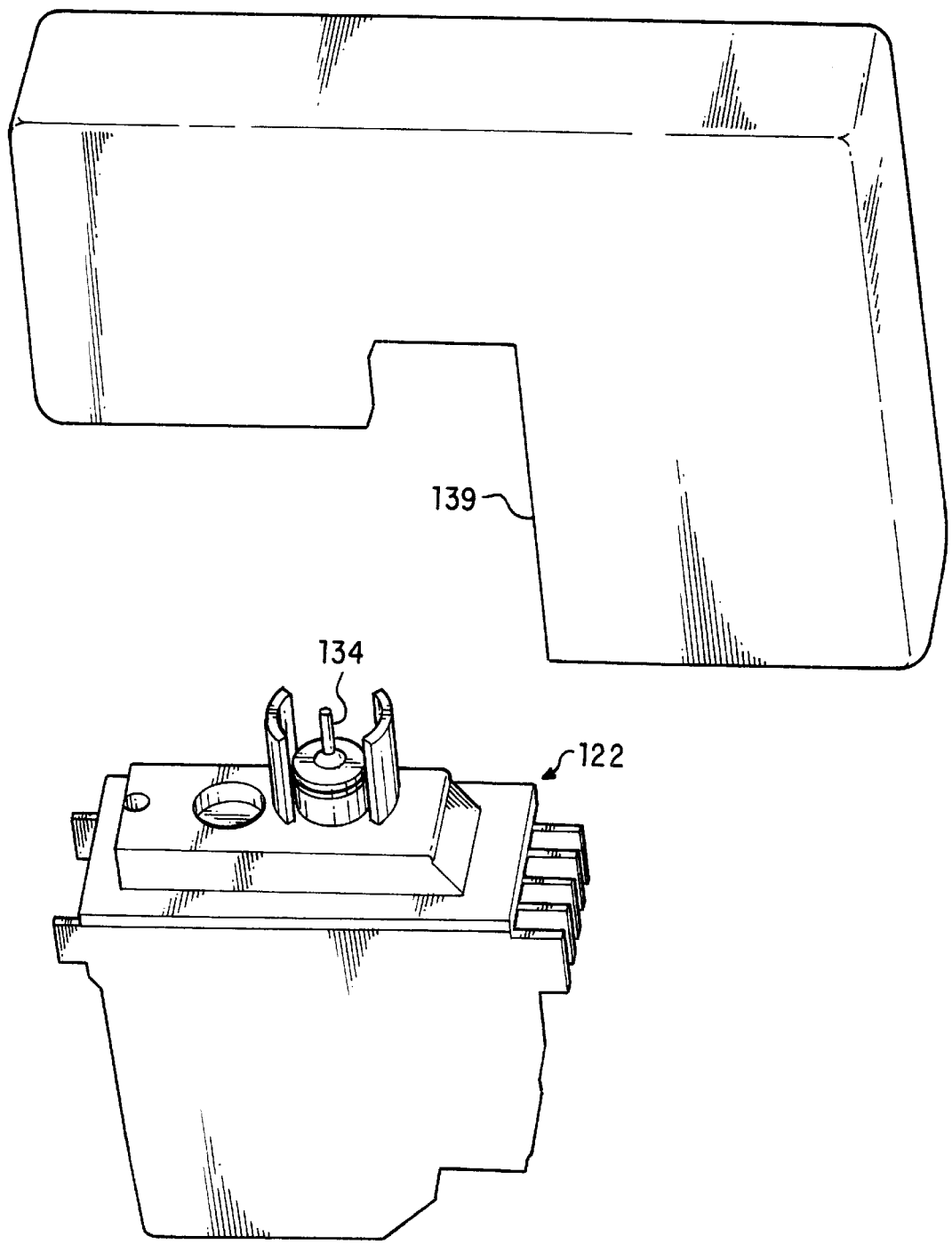
FIG. 11B illustrates a replaceable ink supply cartridge about to engage the ink refill port on the print cartridges of FIGS. 10 and 11A in another embodiment printer.

In another embodiment, shown in FIG. 11B, the print cartridges 122 installed in carriage 120 have ink supply cartridges 139 connected directly to needle 134, so that carriage 120 supports the print cartridges 122 and the ink supply cartridges 139. A septum on the ink supply cartridges 139 connect to needle 134 in a manner similar to that shown in FIG. 11A. The ink supply cartridges 139 are preferably made to have a low profile to achieve a low profile printer.

FIG. 12A is a side view of the carriage 120 and print cartridge assembly of FIG. 9A connected to the off-axis ink supply station 128 via tubes 36.

FIG. 12B is a cross-sectional view of ink supply cartridge 138 in the off-axis ink supply station 128 taken along line 12B—12B in FIG. 9B. As seen, a hollow needle 142 extending in an upward direction from the ink supply support 144 is inserted through a rubber septum 146 on ink supply cartridge 138 to create a fluid communication path between the ink reservoir 148 within ink supply cartridge 138 and one ink conduit within manifold 150. In one embodiment, ink reservoir 148 comprises a collapsible ink bag, to be described later. The ink conduits within manifold 150 are coupled to tubes 36 which connect to the various print cartridges within scanning carriage 120.

FIG. 12C is a detailed view of needle 142 extending from the ink supply station 128. Also shown are a spring-loaded humidor 145, having a rubber portion 145' which covers needle hole 147 when the ink supply cartridge 138 is removed, and a plastic elbow 149 connected to tube 36. Elbows 149 replace manifold 150 (FIG. 12B) in the embodiment of FIG. 12C.

Figure 13:
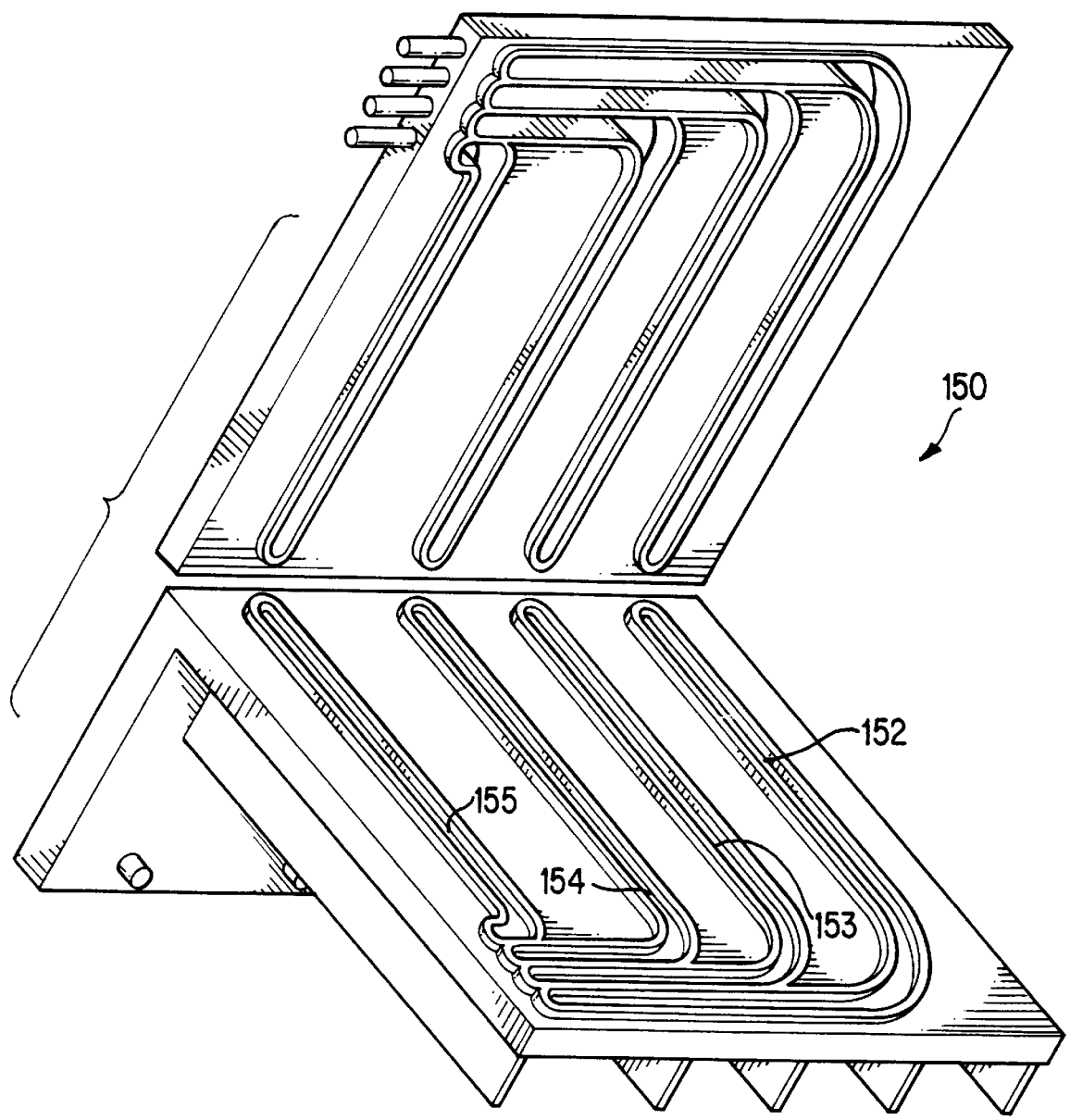
FIG. 13 is a perspective view of the two parts making up the manifold in the ink supply station.

FIG. 13 is a perspective view of manifold 150 in the off-axis ink supply station 128 of FIG. 12B. Manifold 150 is opened to reveal the internal ink conduits 152–155.

Figure 14:
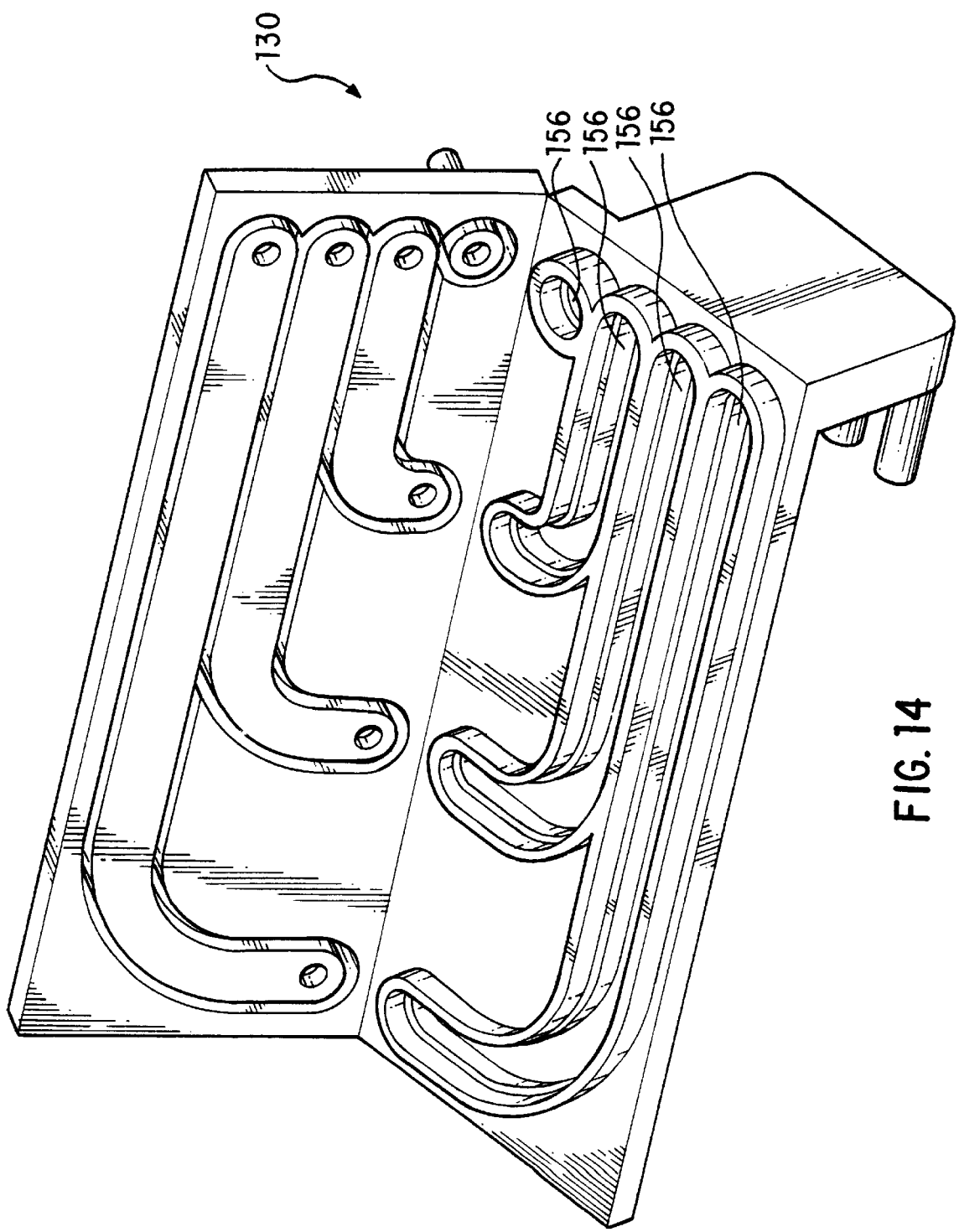
FIG. 14 is a perspective view of the two parts making up the manifold in the scanning carriage.

FIG. 14 is a perspective view of the four ink conduits 156 in manifold 130 on the scanning carriage 120 of FIG. 9A for redirecting the flow of ink from tubes 36 to print cartridges 122–125 in FIG. 9A.

Figure 15:
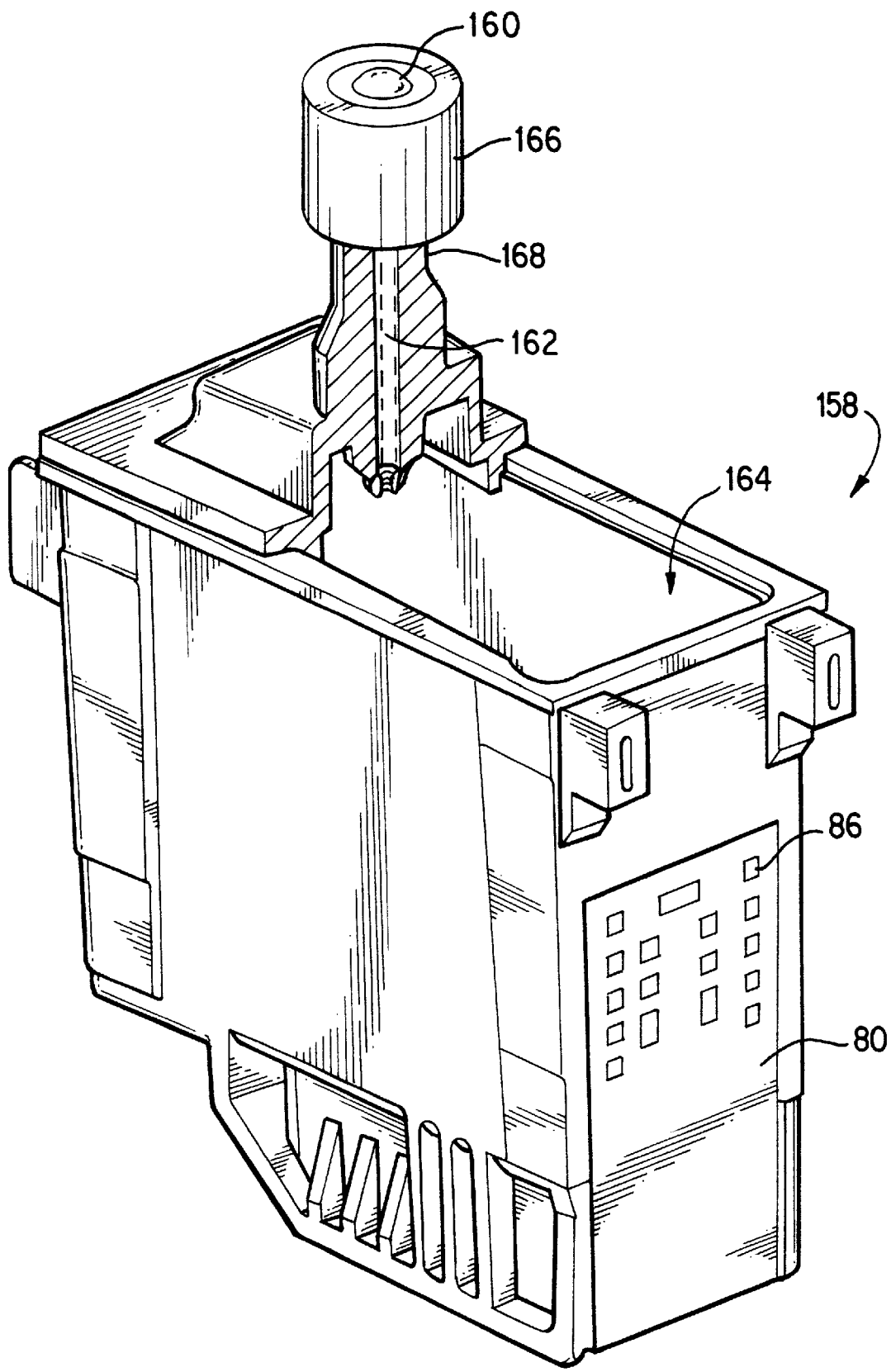
FIG. 15 is a partial cutaway view of a print cartridge in accordance with another embodiment of the invention.

FIG. 15 is perspective view of another embodiment print cartridge 158 in partial cross-section.

Print cartridge 158 of FIG. 15 may be similar to any one of print cartridges 122–125 shown in FIG. 9A except that, instead of having a needle protruding from a top surface of the print cartridge, print cartridge 158 has a rubber septum 160 for receiving a hollow needle. Print cartridge 158 is to be installed in a carriage similar to carriage 120 in FIG. 9A. An axial passage 162 communicates between a central slit formed in septum 160 and an ink chamber 164 within print cartridge 158. A cap 166 is crimped onto neck 168 and onto septum 160 to form a seal between septum 160 and the remainder of the print cartridge 158. The crimping of cap 166 also serves to compress septum 160 so as to ensure the central slit is sealed.

The flexible tape 80 forming a part of the printhead assembly is shown revealed on a side of print cartridge 158. Contact pads 86 for connection to electrodes on a carriage are also shown.

FIG. 16 illustrates the fluid interconnect between an ink supply tube 36 and septum 160 of print cartridge 158. Tube 36, connected to an off-axis ink supply, is fitted over a hollow needle 170. Needle 170 is preferably 18-gage stainless steel having a diameter of about 1.2 mm. A housing 172 on the scanning carriage houses a spring 174 and a sliding humidor consisting of a rigid plastic collar 176 and a compliant inner portion 178. A pocket 180 in the compliant inner portion 178 reduces the friction between the compliant inner portion 178 and needle 170. In FIG. 16, print cartridge 158 is installed in the carriage prior to the fluid interconnect being made.

FIG. 17 shows the completed fluid interconnect between the off-axis ink supply and print cartridge 158 after the fluid interconnect system on the carriage has been brought down onto print cartridge 158. The downward force of the fluid interconnect system compresses spring 174 while causing needle 170 to be inserted through a central slit in septum 160. The compliant inner portion.178 and rubber septum 160 are in contact with one another. Ink now flows from the off-axis ink supply station, through tube 36, through hollow needle 170, through hole 182 formed in hollow needle 170, through axial passage 162, and into the print cartridge's ink chamber 164 (FIG. 15).

In another embodiment, needle 170 directly extends from a replaceable ink supply cartridge, such as from ink supply cartridge 139 in FIG. 11B, and the ink supply cartridge and print cartridges 158 are supported by the scanning carriage.

The central slit formed in septum 160 creates an air-tight seal around needle 170. The slit becomes sealed when needle 170 is withdrawn from septum 160.

Print cartridge 158 is thus supplied with ink from the off-axis ink supply station.

Thus, a number of print cartridge embodiments and ink interconnections between an off-axis ink supply and the print cartridge have been shown.

FIGS. 18–35 describe a pressure regulator which may be used within any of the print cartridge embodiments described herein for regulating the pressure of the ink chamber within the print cartridge. Hence, the pressure in the off-axis ink supply system may be unregulated. The regulator causes the ink chamber within the print cartridge to have a slight, but substantially constant, negative pressure (e.g., −2 to −7 inches of water column) to prevent ink drool from the nozzles of the printhead. If the off-axis ink supply system is at atmospheric pressure, this slight negative pressure in the print cartridge also acts to draw ink from the off-axis ink supply system even if the location of the ink supply system is slightly below the print cartridge. The regulator also enables the use of pressurized off-axis ink supplies while maintaining the desired negative pressure within the ink chamber in the print cartridge. The regulator can be designed to provide a wide range of negative pressures (or back pressures) from 0 to −50 inches of water column, depending on the design of the printhead.

In the embodiments shown in FIGS. 18–35, the regulator is described with reference to the type of print cartridge similar to print cartridge 158 in FIG. 15 having a septum 235 (FIG. 18); however, it is to be understood that a regulator using similar concepts may also be used with any of the other print cartridge embodiments.

Figure 18:
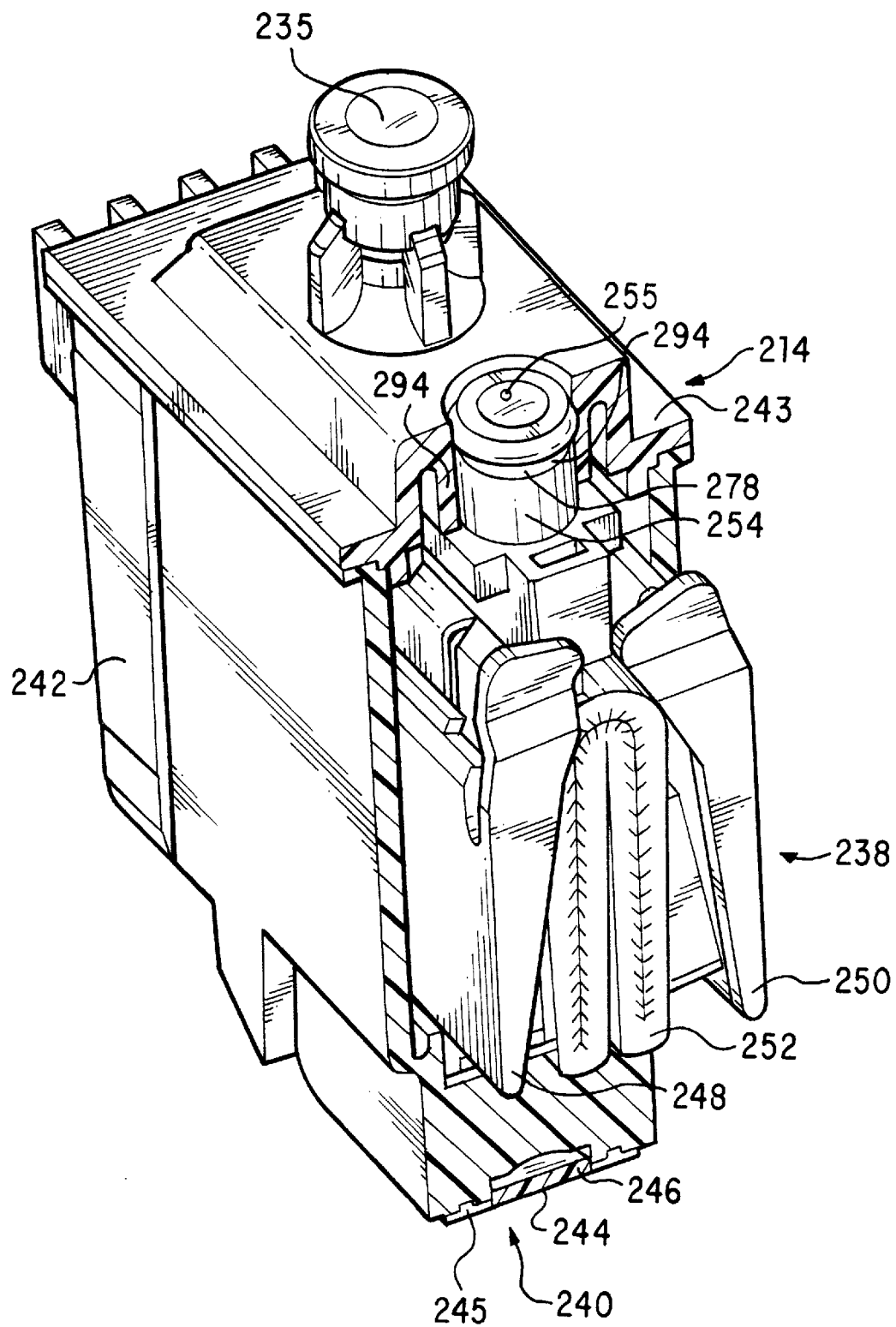
FIG. 18 is a perspective view in partial cross-section of the print cartridge of FIG. 15 illustrating an ink pressure regulator which may be internal to any of the print cartridges described herein.

Referring to FIG. 18, reference numeral 214 generally indicates the print cartridge that includes a pen body 242 that is the housing for the cartridge and a crown 243 that forms a cap to the housing. Located at a remote end of the pen body is the tab head assembly 244 or THA. The THA includes a flex circuit 245 and a silicon die 246 that forms the print head 240. The THA is of conventional construction. Also located within the pen body 242 is a pressure regulator lever 248, an accumulator lever 250, and a flexible bag 252. In FIG. 18, the bag is illustrated fully inflated and for clarity is not shown in FIG. 19. The pressure regulator lever 248 and the accumulator lever 250 are urged together by a spring 253, 253' illustrated in FIG. 19. In opposition to the spring, the bag spreads the two levers apart as it inflates outward. The bag is staked to a fitment 254 that is press-fit into the crown 243. The fitment contains a vent 255 to ambient pressure in the shape of a helical, labyrinth path. The vent connects and is in fluid communication with the inside of the bag so that the bag is maintained at a reference pressure. The helical path limits the diffusion of water out of the bag.

Figure 19:
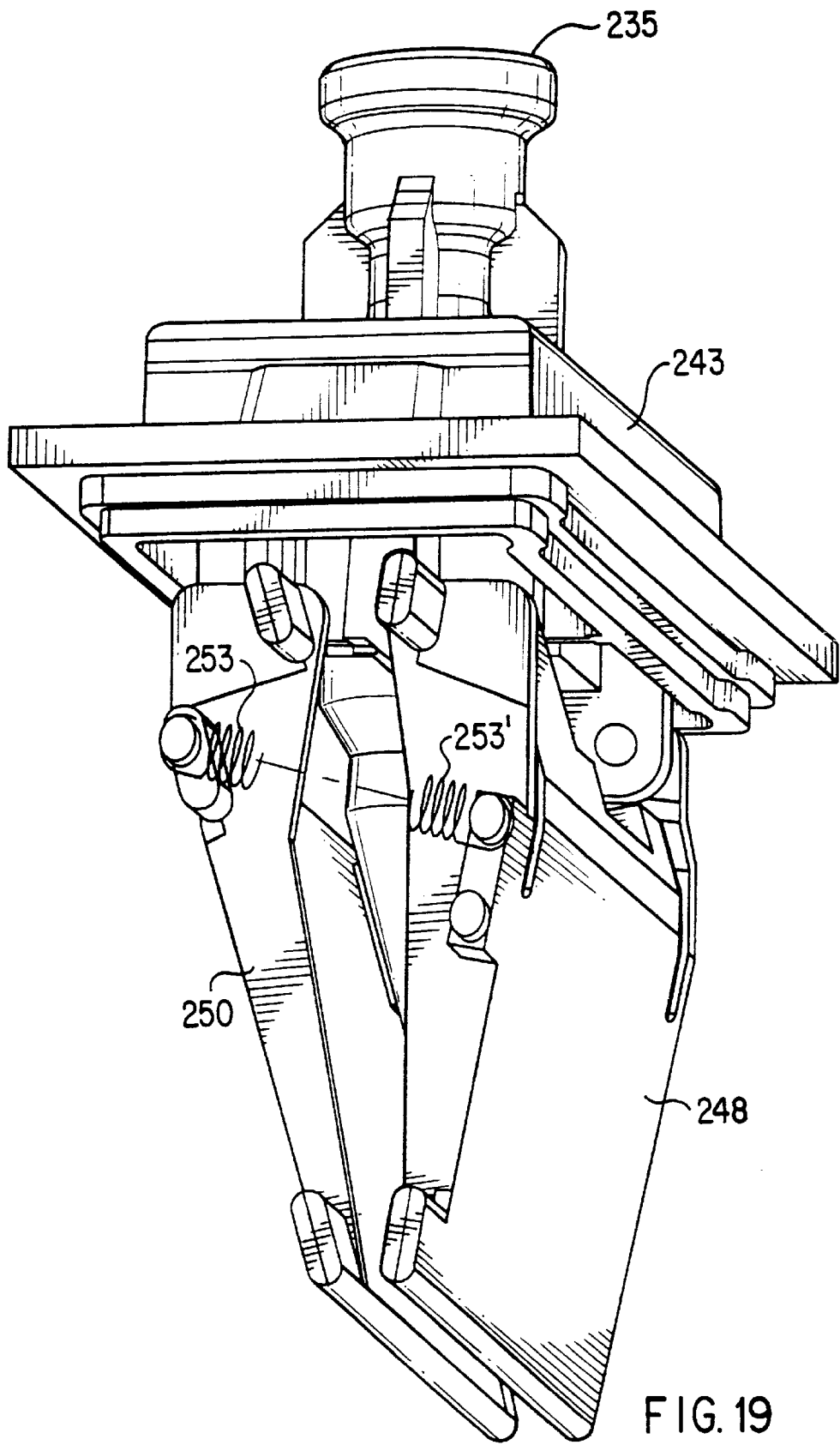
FIG. 19 is a perspective view of the pressure regulator sub-assembly of the print cartridge of FIG. 18 without the flexible air bag.
Figure 20:
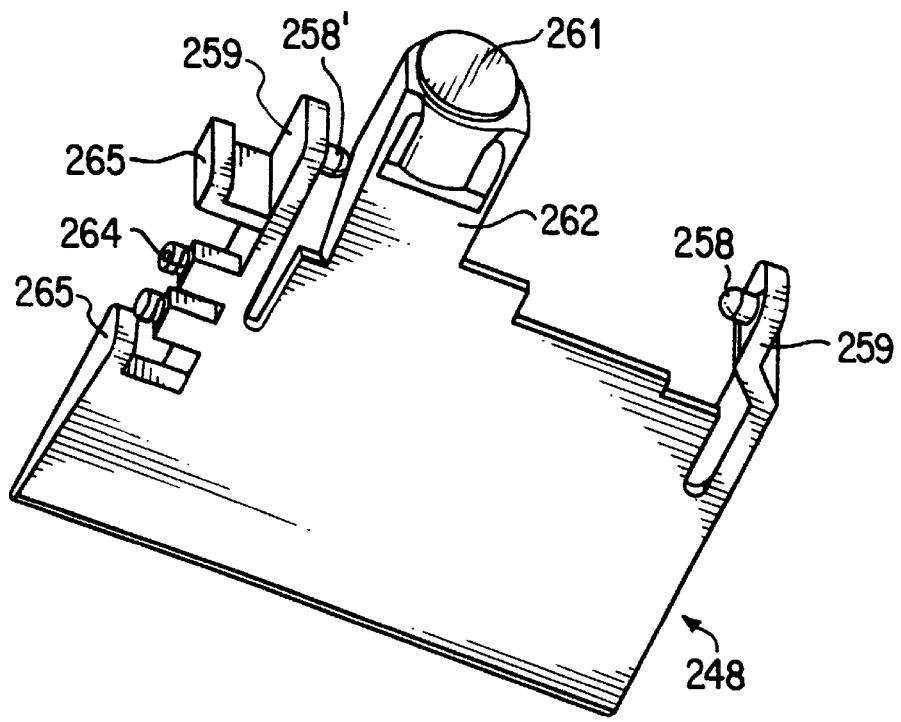
FIG. 20 is a perspective view of a pressure regulator lever in the pressure regulator sub-assembly of FIG. 19.
Figure 21:
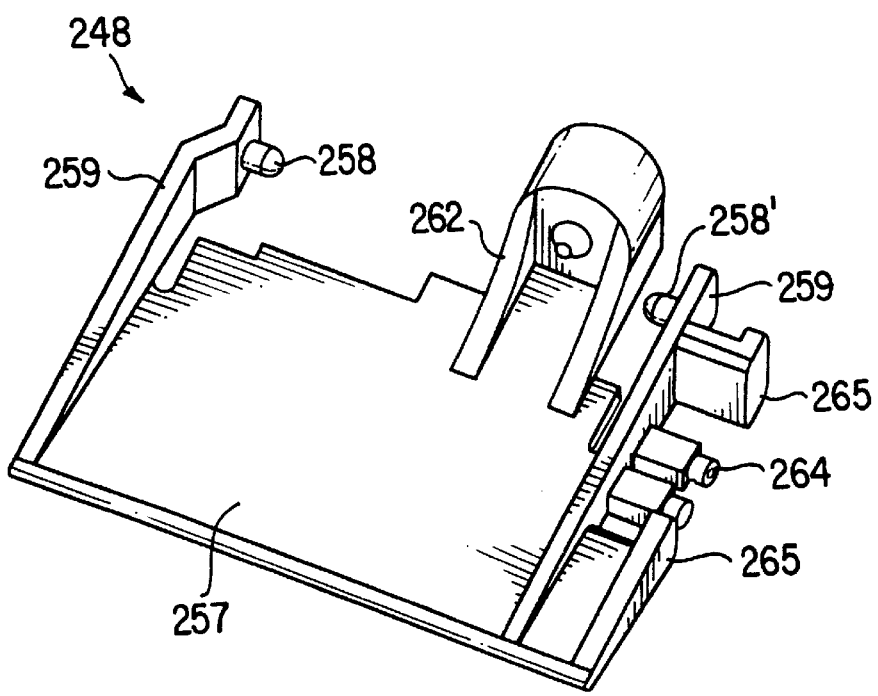
FIG. 21 is a perspective view of the opposite side of the pressure regulator lever of FIG. 20.
Figure 32:
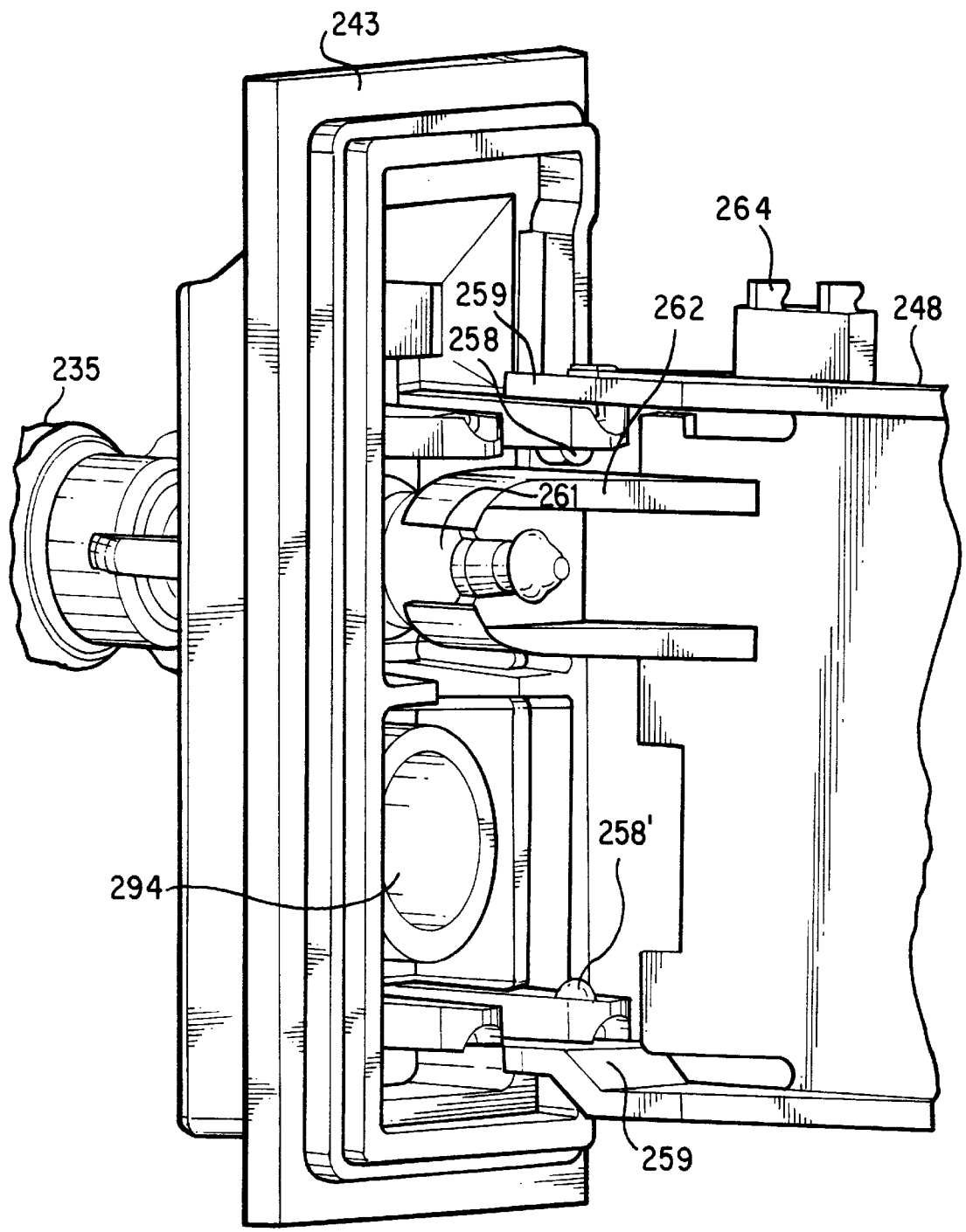
FIG. 32 is a perspective view, partially cut away, of the crown and pressure regulator of FIG. 19 with the accumulator removed.
Figure 34:
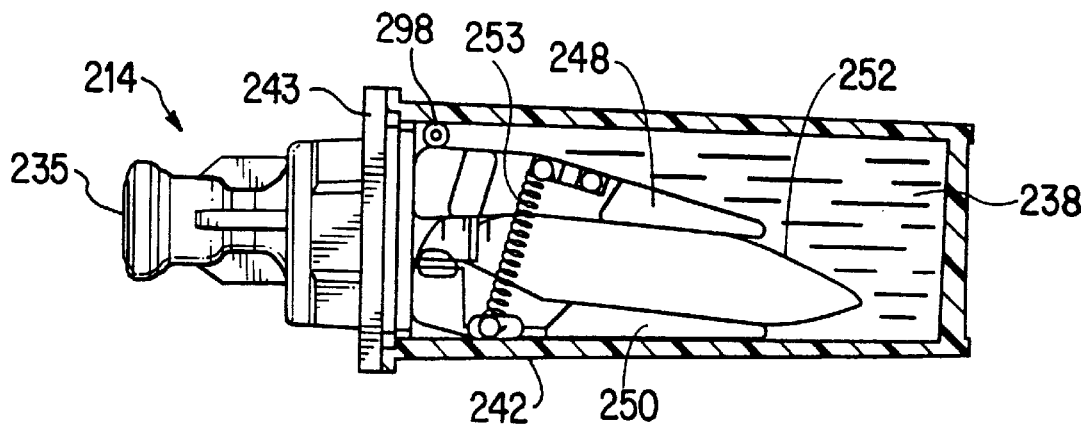
Figure 35:
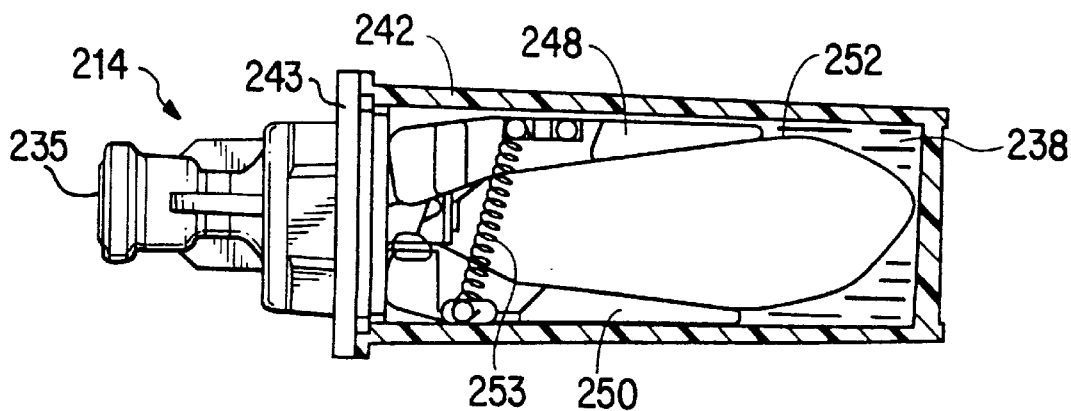

The pressure regulator lever 248 is illustrated in detail in FIGS. 20 and 21. Reference numeral 257 generally indicates the location of the area where the bag 252 directly bears against the lever. The lever 248 rotates about two opposed axles 258 that form the axis of rotation of the lever. The rotation of the lever is stopped when the lever engages the pen body 242 as illustrated in FIG. 35. The axles are located at the ends of cantilevers 259 formed by deep slots so that the cantilevers and the axles can be spread apart during manufacture and snapped onto place on the crown 243 as illustrated in FIG. 32. Perpendicular to the plane of the regulator lever 248 is a valve seat 261 and a valve seat holder 262. The valve seat is pressed into place on the holder and is fabricated from a resilient material. In response to expansion and contraction of the bag 252, the regulator lever 248 rotates about the axles 258, 258' and causes the valve seat to open and shut against a mating surface on the crown 243 as described below. This rotational motion controls the flow of ink into the ink plenum 238, FIG. 34. There is an optimization between maximizing the force on the valve seat and obtaining sufficient motion of the lever. In the embodiment actually constructed, the lever ratio between the distance between the centroid of the lever, generally at point 257, and the axles 258 and the distance between the center of the valve seat and the axles 258 is between two to one and five to one with four to one being preferred. The pressure regulator also includes a spring boss 264 and engages the spring 253, FIG. 19. The spring boss is protected during manufacture by two shoulders 265 which are not illustrated in FIG. 19.

Figure 22:
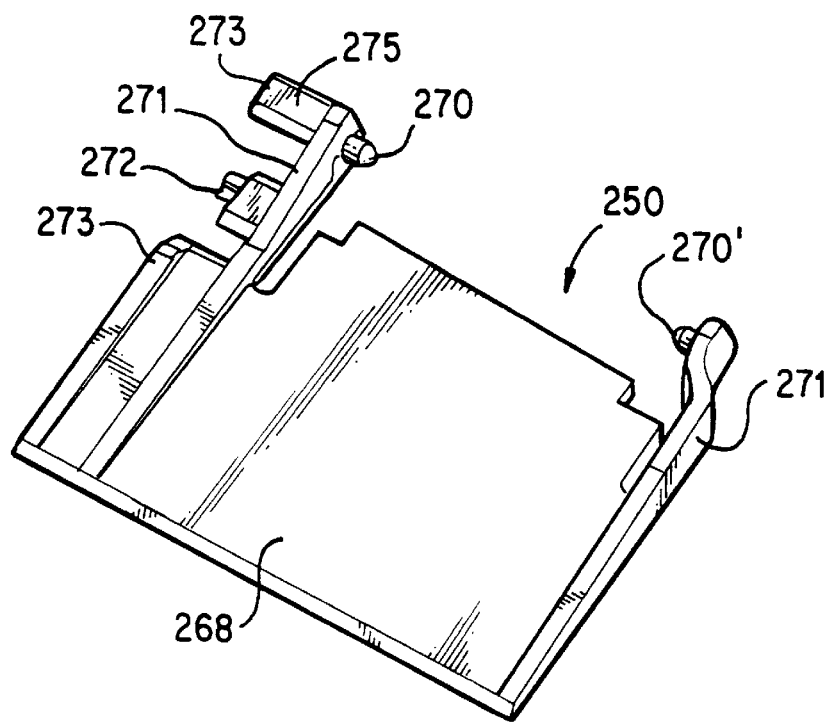
FIG. 22 is a perspective view of an accumulator lever of the pressure regulator sub-assembly of FIG. 19.

The accumulator lever 250 is illustrated in FIG. 22 and includes an actuation area 268 where the bag 252 directly bears against the lever. The lever rotates about two opposed axles 270, 270' that form an axis of rotation of the accumulator lever. The axles are remotely located on cantilevers 271 so that the axles and the cantilevers can be spread apart during manufacture and snapped into place on the crown 243 as described below. The accumulator lever also includes a spring boss 272 that engages the other end of the spring 253, FIG. 19. Like the spring boss 64 on the pressure regulator, the boss 272 on the accumulator is protected during manufacture by the shoulders 273. These shoulders are not illustrated in FIG. 19.

The accumulator lever 250 and the bag 252 operate together to accommodate changes in volume due to any air that may be entrapped in the print cartridge 214, as well as due to any other pressure changes. The accumulator acts to modulate any fluctuations in the back pressure. The accumulator lever squeezes the bag the inside of which is at ambient pressure, forces air out of the bag and allows air trapped in the print cartridge to expand.

Although most of the accumulation is provided by the movement of the accumulator lever 250 and the bag 252, there is additional accumulation provided by the pressure regulator lever 248 in cooperation with the resilient valve seat 261, FIG. 20. The valve seat acts as a spring and allows some movement of the regulator lever 248 while the valve is shut. In other words, as the back pressure in the plenum 238 (FIG. 34) decreases, the bag 252 exerts less force on the levers, and the spring 253 urges the levers together. The motion of the regulator lever compresses the valve seat and the regulator lever shuts a little further. This movement of the regulator lever 248 with the bag 252 results in some additional air accommodation.

It should be appreciated that the boss 272 on the accumulator lever 250 is closer to the axis of rotation of the accumulator lever than the boss 264, FIGS. 20 and 21, on the pressure regulator lever is to its axis of rotation. This difference in distance causes the accumulator lever to actuate before the pressure regulator lever moves.

Figure 31:
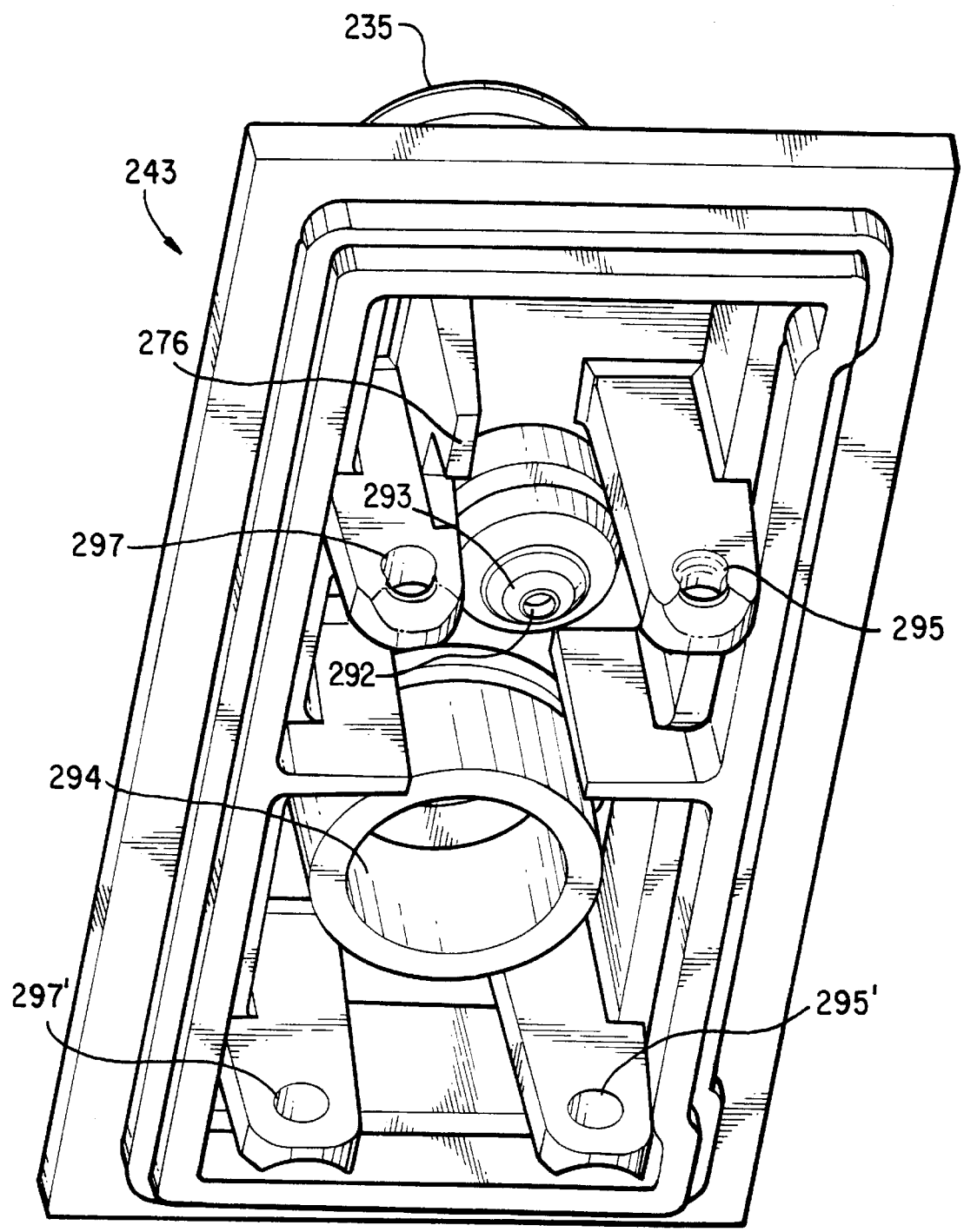
FIG. 31 is a perspective view of the crown for the print cartridge of FIG. 18.

The accumulator lever 250 rotates about the axles 270 until a stop 275 on the lever engages a surface 276 within the crown 243, as illustrated in FIG. 31. The stop prevents the lever from moving too close and interfering with the pressure regulator lever 248 when the back pressure in the ink plenum drops. The accumulator lever rotates in the other direction until coming into contact with the pen body 242 as illustrated in FIGS. 34 and 35.

Referring to FIG. 19, reference numeral 253 generally indicates a helical extension spring that urges the two levers 248, 250 together. The spring is preloaded and engages the bosses 264, 272 with a coil loop at each distal end. Each loop is a parallel, cross-over, fully closed, centered loop. This spring is designed to have the least amount of variation in its force constant over its full range of travel so that the back pressure can be regulated as closely as possible.

Figure 23:
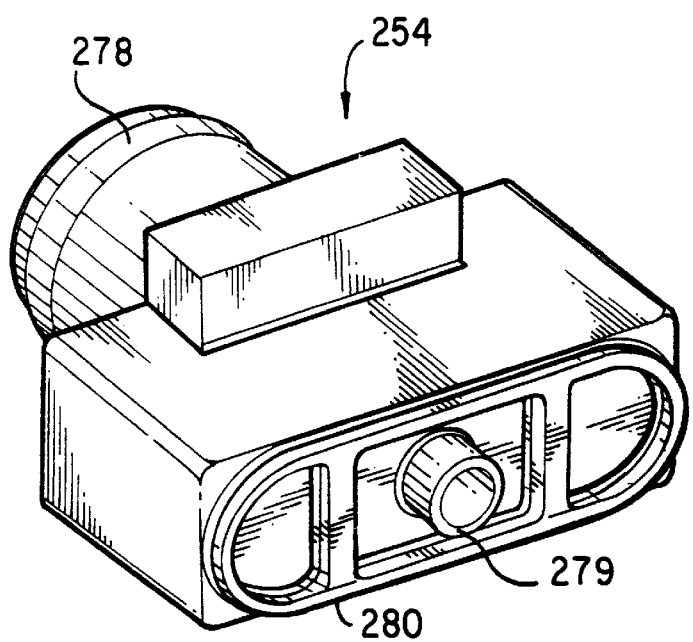
FIG. 23 is a perspective view of a fitment for the print cartridge of FIG. 18.

The fitment 254, illustrated in FIGS. 18 and 23, supports the bag 252 and attaches the bag to the crown 243. The fitment has a lip 278 that engages the crown and forms a hermetic seal with it. Within the fitment is a vent 255 that provides communication between the interior of the bag and ambient pressure. At the distal end of the fitment is a raised, circular boss 279 and a race-track shaped outer boss 280. The bag 252 is staked to both bosses. The circular boss provides the main seal between the bag and the fitment. The race-track shaped boss provides a secondary, redundant sealing surface as well as provides additional support and positioning for the bag.

Figure 24:
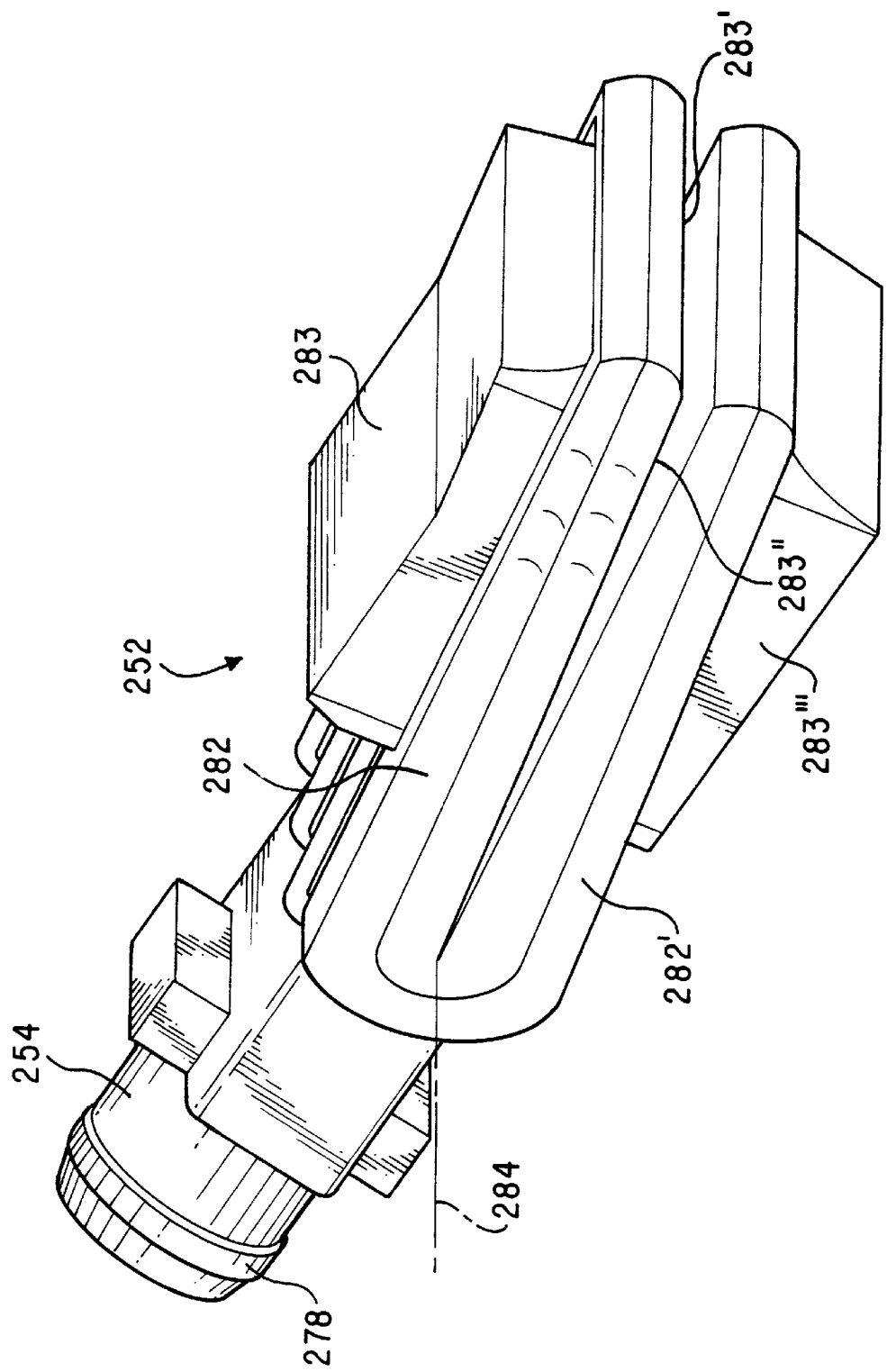
FIG. 24 is a perspective view of the flexible bag and fitment for the print cartridge of FIG. 18.

The flexible bag 252, illustrated in FIGS. 18 and 24, expands and contracts as a function of the differential pressure between the back pressure in the ink plenum 238 (FIG. 34) and ambient pressure communicated through the vent 255 in the fitment 254. The bag is shown fully inflated in FIG. 24. The bag is designed to push against the two levers 248, 250 with maximum contact area through the entire range of travel of the levers. The bag is formed from a single sheet of multilayer film and includes two lungs 282 that expand and contract about an axis 284. The lungs communicate with each other and are maintained at the same reference pressure. Each lung has two raised areas 283 on either side so that there are four raised areas in all. The two inner raised areas that bear against each other are not shown in FIG. 24 but are indicated by reference numerals 283' and 283". The side opposite the fitment contains a raised communication channel 285, FIGS. 26, 28, between the raised areas which allows a path for air to flow when the bag is completely deflated. The raised areas are thinner that the rest of the bag and provide greater compliance to the travel of the levers and the motion of the lungs about the axis 284. The raised areas are designed to eliminate relative motion or sliding of the bag with respect to the levers. In systems that actuate on very slight pressures, this undesirable affect is called hysteresis. The combination of the lungs and raised areas provides extra material into which the bag can expand as well as maximizes the change in ink volume displaced by the bag with any change in differential pressure.

Figure 30:
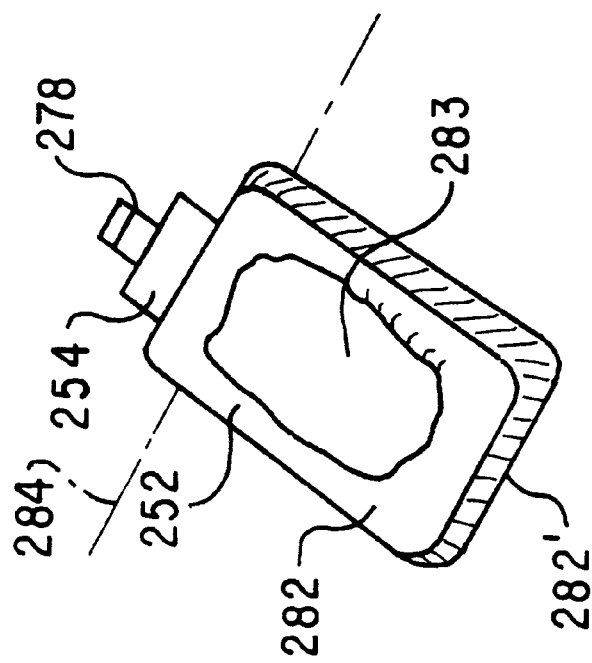
Figure 29:
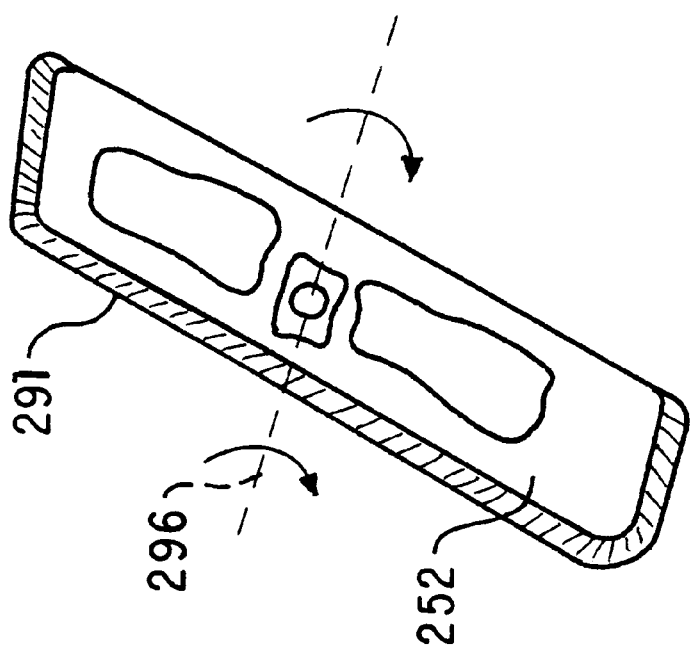

The process for making the bag 252 is illustrated in FIGS. 25–30. First, a sheet 287 of flat film is cut to size, FIG. 25. The film is a multilayer structure between one and three mils (one rail is 25.4 microns) thick, 1.5 mils being the preferred thickness. In the preferred embodiment, three materials show acceptable performance: (1) PE/tie/PVDC/tie/PE, (2) PE/tie/PVDF/tie/PE, and (3) PE/tie/EVOH/tie/PE. PVDC is polyvinylidene chloride; DOW version is known as SARAN. EVOH is ethylene-vinyl alcohol copolymer. PE is polyethylene. Tie is a layer used to bond the dissimilar materials together. PVDF is polyvinylidenefluoride and is sold under the trade name of Kynar™. Next, the sheet is placed over a die plate, and heat and vacuum are applied to form the four raised areas 288, 288', FIG. 26. Note that two of the four raised areas or pockets 288' are in communication. Thereafter, the sheet 287 is heat staked to the two bosses 279, 280 on the fitment 254, FIG. 23, as shown in FIG. 27. Next, a hole 289 is made in the film in the center of the circular boss 279 to establish communication to the vent 255 in the fitment. The sheet is then folded along axis 290 and the perimeter of the bag where the margins came together is staked. This staking occurs along the three open seams and is indicated by reference numeral 291 in FIG. 29. The perimeter of the bag is then trimmed. Thereafter, the bag is folded along the longitudinal axis 296 of the fitment as illustrated in FIG. 29. This forms the two lungs 282, 282' in the bag. Referring to FIGS. 29, 30, and 24, the longitudinal axis 296 of the fitment and the line of folding in FIG. 29 is parallel to the axis 284 of rotation of the two lungs including expansion/contraction of the bag.

FIG. 31 illustrates the bottom-side of the crown 243 which includes a valve face 293 and the tapered nozzle or orifice 292 through which ink enters the plenum 238. The valve face mates with the valve seat 261, FIG. 20, on the pressure regulator lever 248. This mating is also shown in FIG. 32. Ink flows through the fluid interconnect, the septum 235, and the orifice 292. The tapered orifice 292 reduces the area of contact between the valve seat 261 and the valve face 293 to thereby increase the valve sealing pressure.

At orifice 292, the back pressure within the plenum 238 (FIG. 34) is controlled by the lever 248. Next to the valve face 293 on the crown 243 is a circular boss 294 that receives the lip 278 on the fitment 254, FIG. 24. The boss 294 and the lip form a hermetic seal. The axles 258, 258', FIG. 21, on the pressure regulator lever 248 are snapped into the journals 295, 295' as permitted by the cantilevered construction described above. In like manner the axles 270, 270' on the accumulator lever 250 are received in the journals 297, 297', FIG. 31. Also located on the bottom side of the crown is the surface 276 that engages the stop 275, FIG. 22, on the accumulator lever 250. The stop 275 and the surface 276 prevent the accumulator lever from interfering with the pressure regulator lever 248.

Figure 33:
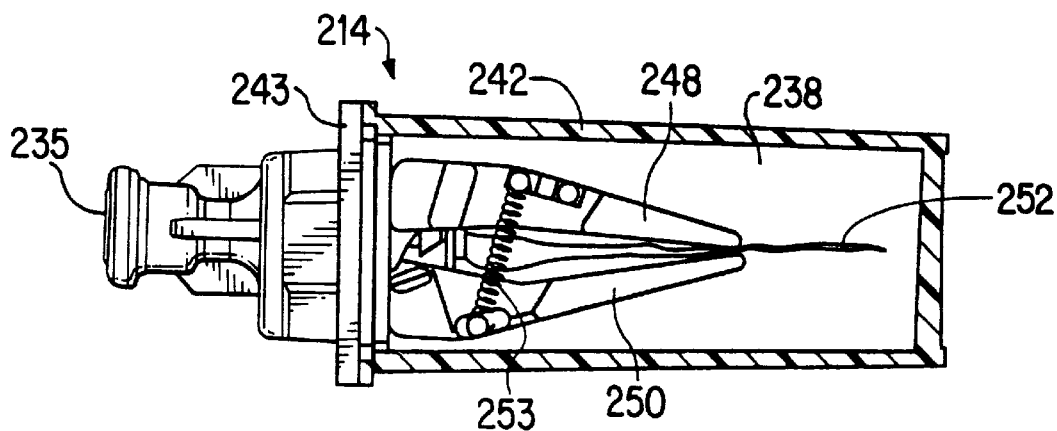
FIGS. 33 through 35 are side elevation views in partial cross-section illustrating the operation of the print cartridge of FIG. 18.

The operation of the print cartridge 214 is illustrated in FIGS. 33, 34, and 35. In the initial condition of the cartridge, there is no ink within the ink plenum 238, and the bag 252 is limp. The back pressure in the plenum equals ambient pressure. The spring 253 urges the two levers 248, 250 fully together.

Next, a hollow needle is inserted into the septum 235 and a vacuum is drawn on the nozzles in the print head 240 (FIG.

18) to draw ink into the print cartridge. In response to this vacuum, the accumulator lever 250 moves first, and the bag begins to expand as shown in FIG. 24. The accumulator lever continues to rotate about its axis of rotation until it engages the side wall of the pen body 242 as shown in FIG. 24. At this point the pressure regulator lever 248 begins to move, and ink begins to enter the plenum 238 through orifice 292, FIG. 31.

The regulator lever 248 can rotate about its axis of rotation until it engages the side wall of the pen body 242 as shown in FIG. 35. This is the full-open position of the valve. The regulator lever moves between the states illustrated in FIGS. 34 and 35 depending on the speed of printing and how fast ink is required by the print head.

Once the plenum 238 is filled with ink or printing has stopped, the pressure regulator lever 248 will slowly rotate and close the orifice at the urging of the spring 253. The levers 248 and 250 return to the state illustrated in FIG. 34 which is the normal or steady state condition of the print cartridge. This state occurs just prior to or subsequent to printing.

Referring to FIG. 34, reference numeral 298 indicates an air bubble that has entered the ink plenum 238. If the print cartridge is subjected to an elevation in temperature or increased altitude, the air bubble will expand in the plenum. The expansion of the air bubble will be compensated for by the contraction of the bag 252 due to a pressure change caused by a volume change of the bubble which in turn causes the accumulator lever to move from the state illustrated in FIG. 34 toward that illustrated in FIG. 33. In addition, there will be some accompanying motion of the regulator lever 248 because of the resilience of the valve seat 261. On the other hand, if the air bubble contracts, the bag will expand in response and the pressure regulator lever 248 will open the orifice and admit ink onto the plenum. In other words, any expansion or contraction of an air bubble will cause the bag to compensate in reverse, that is by contracting to expansion and expanding to contraction. Each of the levers tracks the motion of the bag and the accumulator lever 250 rotates before the regulator lever 248 because of the difference in lever arm distances.

When the off-axis ink supply (e.g., supply 30 in FIG. 1) is depleted of ink, the levers 248, 250 rotate to the full-open position in FIG. 35 and the print head stops ejecting ink.

Figure 36:
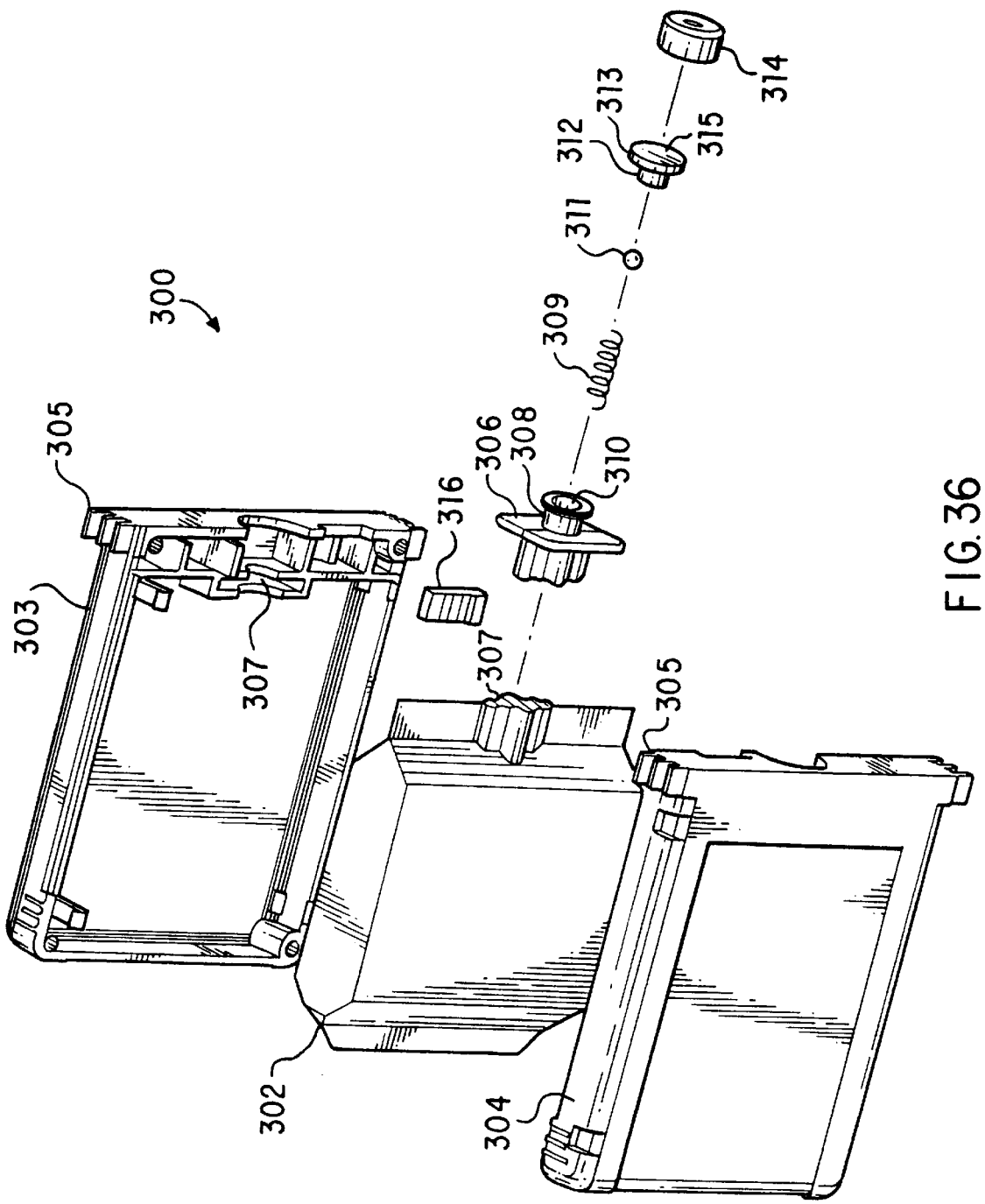
FIG. 36 is an exploded view of a non-pressurized ink supply cartridge.

FIG. 36 is an exploded view of a non-pressurized ink supply cartridge 300 such as shown in FIGS. 2, 9B, and 12B. Such an ink supply cartridge 300 is simply removed from the ink supply support (e.g., support 144 in FIG. 12B) and disposed of once its supply of ink has been depleted. The connection of such an ink supply cartridge 300 to the fluid interconnect has been described with respect to FIG. 12B.

The non-pressurized ink supply cartridge 300 consists of a collapsible ink bag 302 and two rigid plastic housing members 303 and 304. Ink bag 302 may be formed of a flexible film such as Mylar or EVA, a multi-layer film having layers of low density polyethylene, adhesive, and metallized polyethylene terephthalate, or the nine-layer film described in U.S. Pat. No. 5,450,112, assigned to the present assignee and incorporated herein by reference. The ends of ink bag 302 may be heat-staked or ultrasonically welded to housing member 303 or 304 to limit movement of bag 302.

Coded tabs 305 align with slots formed in the ink supply support to ensure the proper color ink supply cartridge is inserted into the correct stall of the ink supply support. In one embodiment, the ink supply support also latches onto tab 305, using a spring-loaded latch, to secure cartridge 300 and to provide tactile feedback to the user that cartridge 300 is properly installed.

A plastic ink bag fitment 306 is partially inserted through an opening 307 in ink bag 302 and sealed with respect to opening 307 by glue or heat fusing. A poppet 308 extends from fitment 306. Bag fitment 306 is held firmly in place by a slot 307 formed in the plastic housing members 303 and 304.

A poppet spring 309 is inserted through a hole 310 in poppet 308 followed by a poppet ball 311. Ball 311 may be stainless steel or plastic.

An end 312 of a rubber septum 313 is then inserted into hole 310 in poppet 308. Septum 313 is then crimped and secured to poppet 308 using a crimped cap 314.

Septum 313 has a slit 315 formed through its center through which a hollow needle 142 (FIG. 12B), in fluid connection with a print cartridge, is inserted as shown in FIG. 17. Slit 315 in septum 313 is automatically urged closed by the resiliency of septum 313 when the needle is removed.

Poppet spring 309 and poppet ball 311 serve to provide added assurance that no ink will leak through slit 315 in septum 313. When there is no needle inserted through slit 315, poppet spring 309 urges poppet ball 311 against the closed slit 315 so that ball 311 in conjunction with the closing of slit 315 provides a seal against ink leakage.

It is possible to design the fluid interconnect using a septum without the poppet, or a poppet without the septum. A septum without the poppet will reliably seal around a needle with a radial seal. However, when the ink supply with a septum has been installed in the printer for a long time, the septum will tend to take on a compression set. Upon removal, the septum may not completely reseal itself. If the supply is tipped or dropped, ink may leak out. A poppet valve (by itself) has the advantage (relative to a septum) of self-sealing without a compression set issue. However, it is less reliable in that it does not seal around the needle. Thus, to ensure a leak-tight fluid interconnection with the cartridge, some kind of face seal must be established. In addition, poppet valves vary in reliability when the surface they seal against is hard plastic—small imperfections in the sealing surface tend to lead to leaks. The combination of the septum/poppet valve overcomes these limitations by utilizing the advantages of both: the septum's very good sealing around the needle while eliminating the compression set issue. Additionally, the inside surface of the septum provides a compliant sealing surface for the poppet valve that is less sensitive to imperfections.

In the preferred embodiment, an integrated circuit sensor/memory 316 is permanently mounted to ink supply cartridge 300. This circuit provides a number of functions, including verifying insertion of the ink supply, providing indication of remaining ink in the supply, and providing a code to assure compatibility of the ink supply with the rest of the system.

In an alternate embodiment, ink bag 302 is provided with a positive pressure. This enables the tubes connecting the ink supply to the print cartridges to be thinner and also allows the ink supply station to be located well below the print cartridges. By providing ink bag 302 with rigid side panels 318 to distribute the spring force, a spring can be used to urge the sides of ink bag 302 together to create a positive internal pressure. Bow springs, spiral springs, foam, a gas, or other resilient devices may supply the spring force. In another embodiment, ink bag 302 may be pressurized by an intermittent pressure source, such as a gas. Alternatively, a pump within the ink supply may be used as described in described in U.S. patent application Ser. No. 08/706,121, filed Aug. 30, 1996, now U.S. Pat. No. 5,966,155, entitled "Inkjet Printing System with Off-Axis Ink Supply Having Ink Path Which Does Not Extend above Print Cartridge," which is herein incorporated by reference.

Upon depletion of the ink from the reservoir 324, or for any other reason, the ink supply 320 can be easily removed from the docking bay 338. Upon removal, the fluid outlet 328 and the fluid inlet 342 are closed to help prevent any residual ink from leaking into the printer or onto the user. The ink supply may then be discarded or stored for reinstallation at a later time. In this manner, the present ink supply 320 provides a user of an ink-jet printer a simple, economical way to provide a reliable and easily replaceable supply of ink to an inkjet printer.

The illustrated plastic sheet is flexible to allow the volume of the reservoir to vary as ink is depleted from the reservoir. This helps to allow withdrawal and use of all of the ink within the reservoir by reducing the amount of back pressure created as ink is depleted from the reservoir.

The print cartridge, carriages, and off-axis ink delivery systems described herein may be used in various combinations to provide ink to the nozzles of the printheads in the print cartridges. As one example, any of the print cartridges described may be used with either the pressurized or unpressurized ink supply cartridges. The ink supply cartridges may be arranged in a printer for convenient access, ease of use, maximum utilization of space, and allowing for the required delivered ink volume. The pressure regulator, being integral with the print cartridge in the preferred embodiment, allows printhead performance to be independent of the relative heights of the ink supply and printhead.

The lowest cost system will typically be one with unpressurized supplies. However, pressurization may be required for some situations. This is best understood by considering causes of dynamic and static pressure changes. The static pressure in the printhead is defined as that which exists when the printhead is parked and not operating and is typically optimally set to −2 to −6 inches of water column by the spring in the regulator. However, if the ink supplies are located more than 6 inches below the printhead, then the regulator will always be open (assuming the above set point range), and the static pressure will always be the difference in height. To make matters worse, the pressure of concern is dynamic, defined as the pressure experienced in the printhead during operation. Thus, the actual dynamic pressure will be an even larger negative number and will be outside the regulator range.

Pressurizing the ink supply will solve this problem. This can be done by the aforementioned method or by using springs to provide constant ink supply pressure. This can be done to counteract the relative heights, and other factors that affect the dynamic pressure drop. Factors that increase the dynamic pressure drop include rate of ink usage by the printhead, decreasing tubing diameter, increasing tubing length, and increasing ink viscosity. The pressurization must be increased until the pressure is entirely controlled by the regulator to within the print quality driven pressure specification.

When in use in the printer 10, the print cartridges shown in FIGS. 5A–5C, 10 and 15 are in fluid communication with an off-carriage ink supply 31–34 that is releasably mounted in an ink supply station 30. Without this fluid communication, the new off-axis design print cartridges have very little internal ink capacity in their reservoirs and these print cartridges 50 can expel only approximately 1 cc of ink. However, when a new cartridge 50 is manufactured, it needs to be run through an automated print quality tester. This allows the manufacturer to screen out cartridges failing to meet minimum quality standards. Additional production line processes that use ink may include a nozzle down flush, wetfiring, and reprinting. This testing requires the use of ink. With the new off-axis cartridge designs, the amount of ink available internally may not be enough to make it through the automated print quality tester and the other uses of ink described above.

Moreover, prior to printer installation by the user, the cartridge is in transit and in storage. Therefore, there is also a need to provide a means of lubricating and protecting the hollow needle 60 and the inlet port on the print cartridge 50. In particular, the hollow needle 60 and inlet port should be protected from drying, leaking ink and air ingestion.

Figure 37:
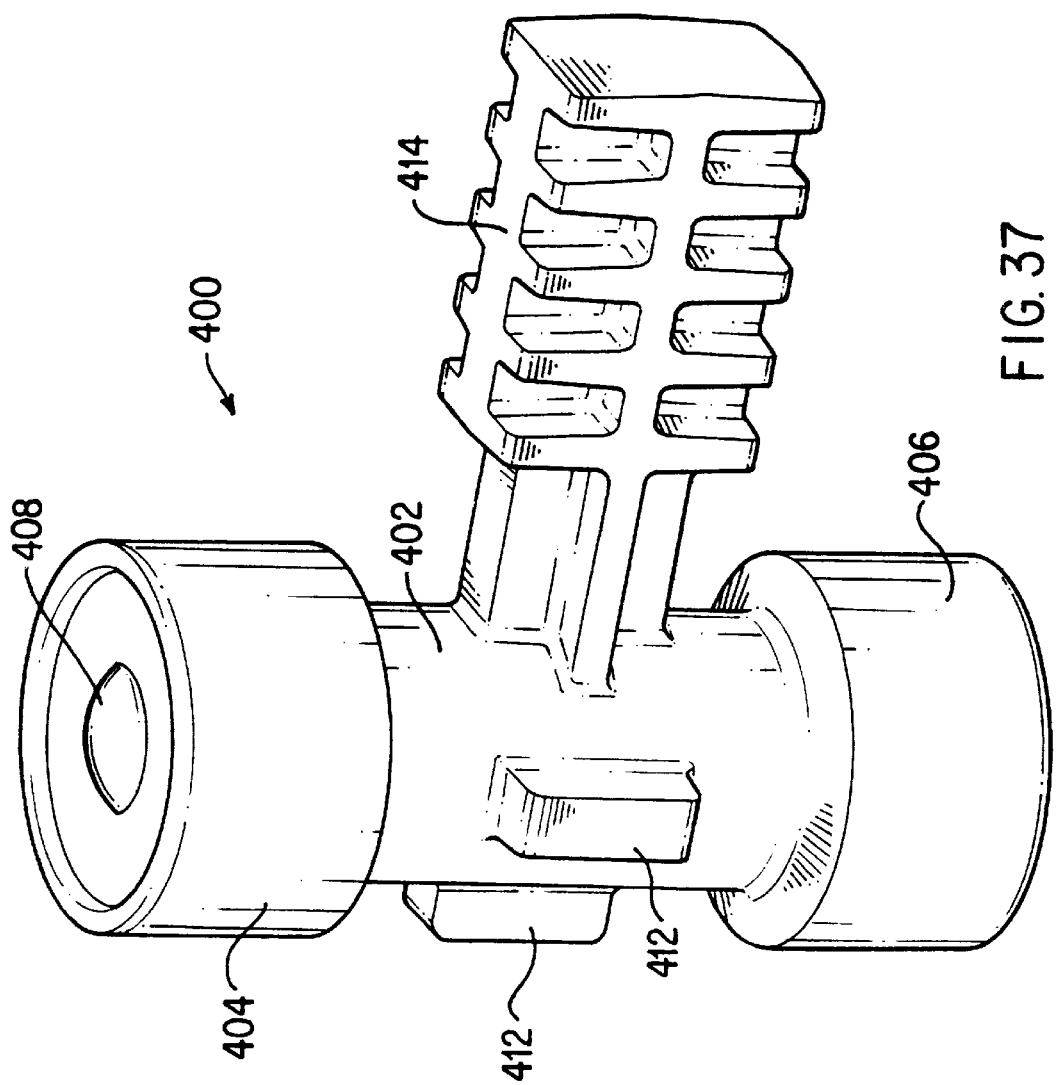
FIG. 37 is a perspective view of one embodiment of the fluidic coupling of the present invention.

Shown in FIG. 37 is an embodiment of a fluidic coupling or adapter 400 of the present invention. Fluidic coupling or adapter 400 has a central or body portion 402 and first and second shoulder portions 404, 406, respectively. First shoulder 404 includes a septum 408 on its end for interfacing with the hollow needle 60 and inlet port on the print cartridge. A second septum (not shown) is included at the end of second shoulder 406 for connecting to a needle on the production line ink supply. The fluidic coupling or adapter 400 has guides 412 for guiding and aligning the fluidic coupling 400 when inserting the coupling into the print cartridge. Also shown is a handle 414 attached to the body 402 of the fluidic coupling 400.

Figure 38:
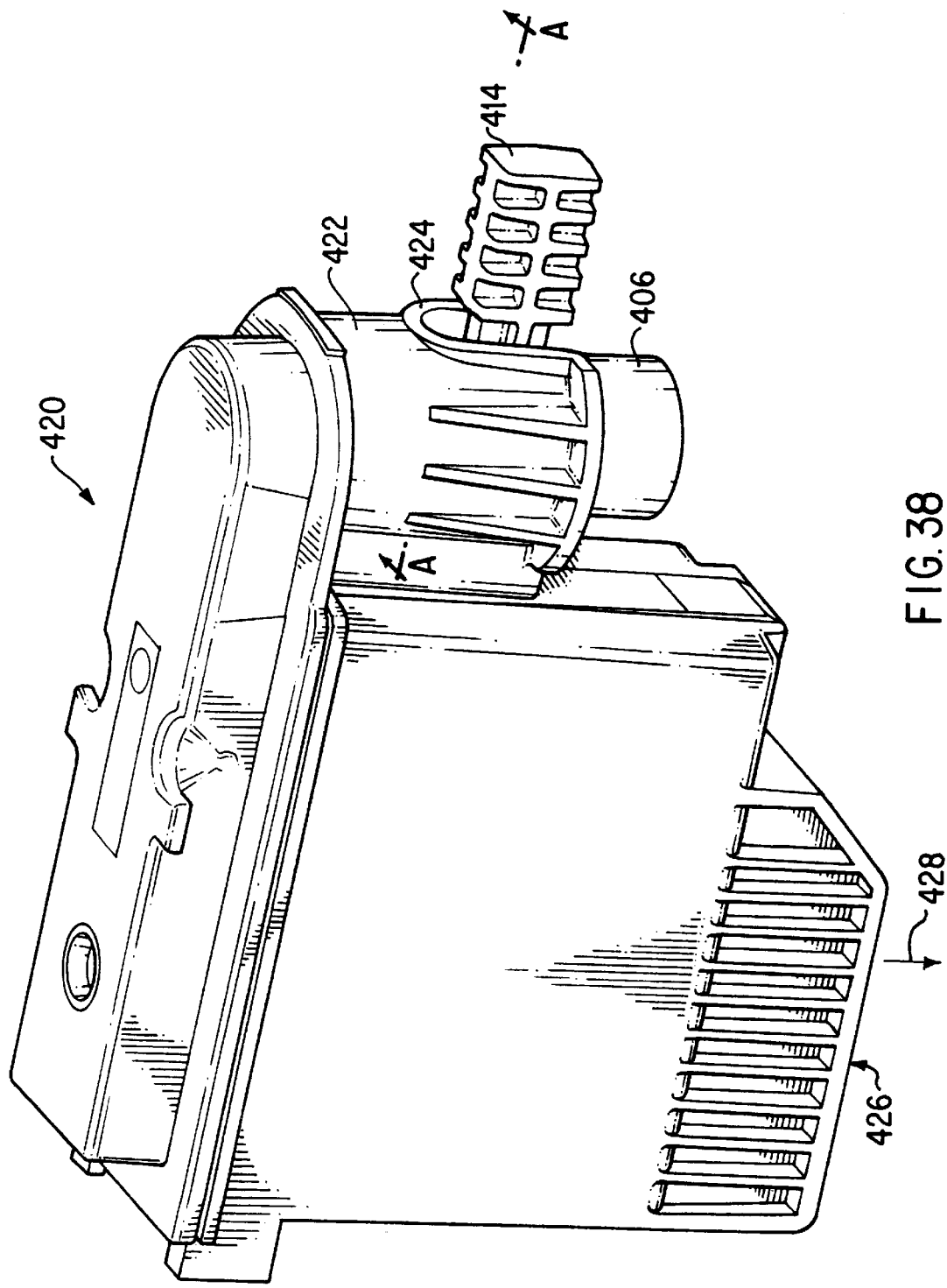
FIG. 38 is a perspective view of the fluidic coupling of FIG. 37 installed in a print cartridge.

FIG. 38 shows fluidic coupling or adapter 400 installed in a print cartridge 420. Print cartridge 420 has a shroud 422 which surrounds and protects the hollow needle (not shown). Print cartridge 420 has an opening 424 in the shroud 422 for receiving the handle 414 of the fluidic coupling or adapter 400. Shroud 422 has an inner taper which mates with a corresponding taper on the shoulder 404 and guides 412 to receive and center fluidic coupling or adapter 400 with respect to needle 60 and hold fluidic coupling or adapter 400 by friction when it is inserted upwardly into shroud 422. It will be appreciated that any type of latching method could be used to secure the coupling 400 to the printhead. The printhead nozzle array 416 located at the bottom of print cartridge 420 ejects ink downward in direction 418.

Figure 39:
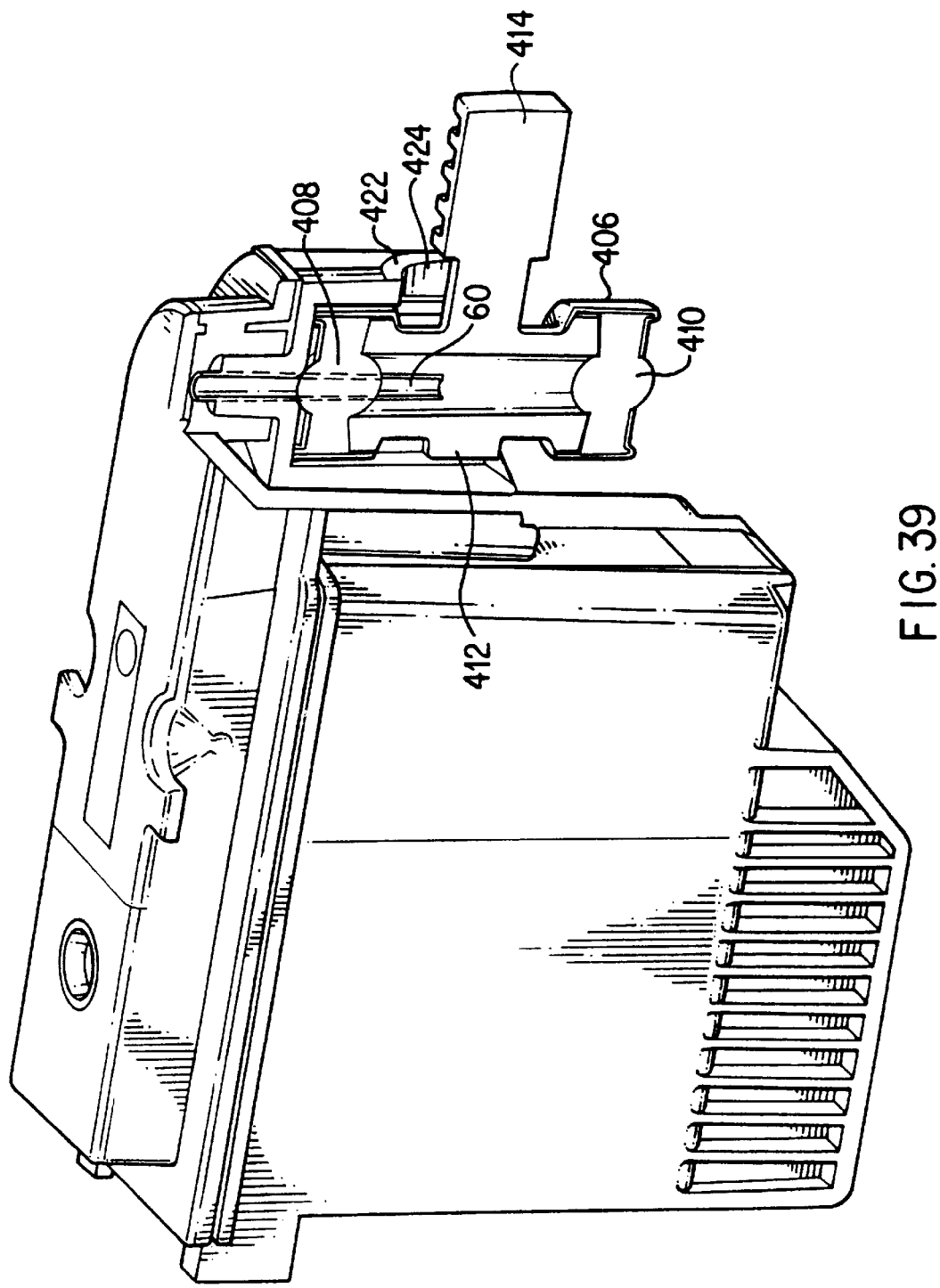
FIG. 39 is a partial cross-sectional view of the print cartridge of FIG. 38 with the fluidic coupling of FIG. 37 connected to the fluid interconnect on the print cartridge.
Figure 40:
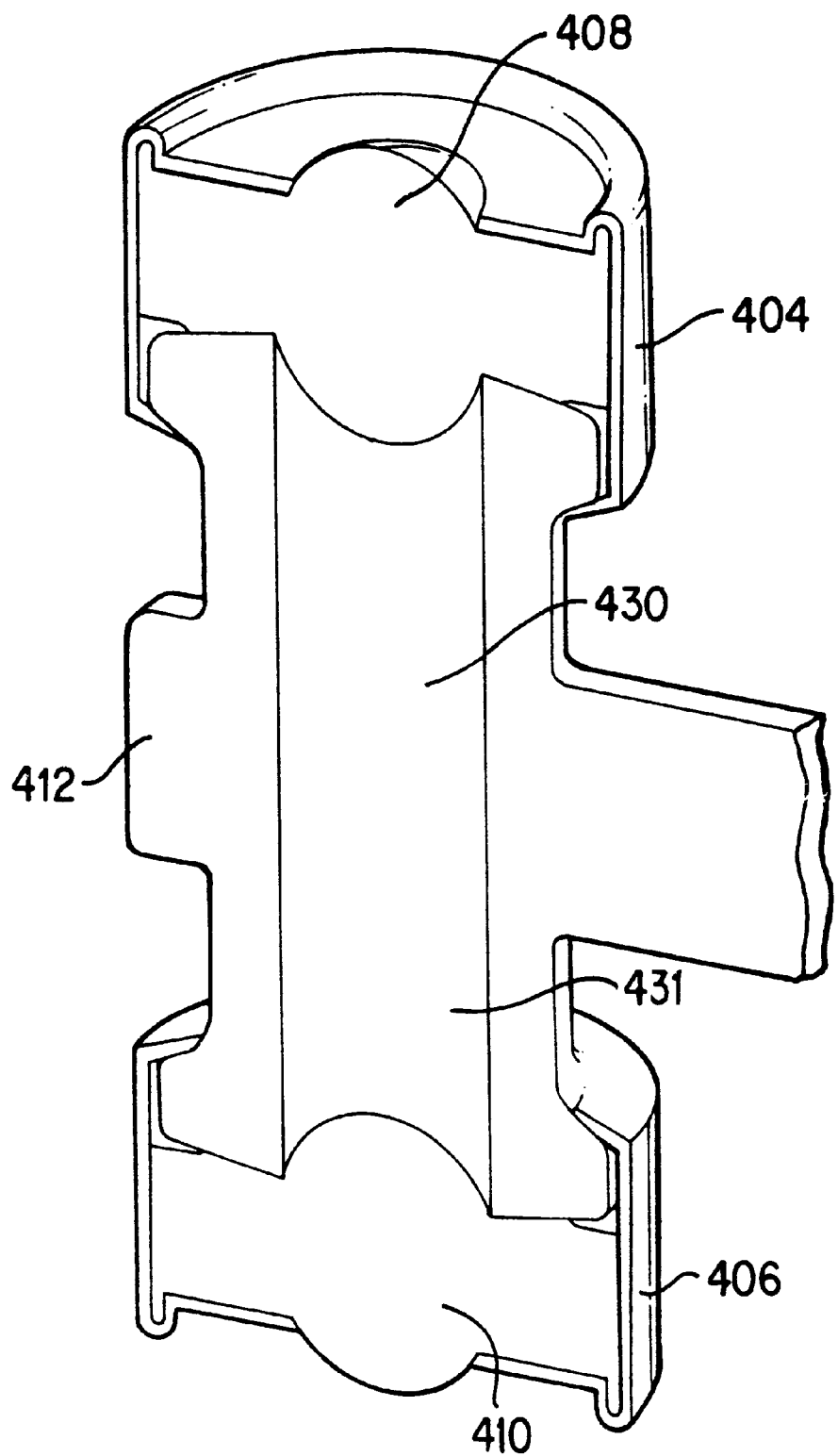
FIG. 40 is a cross-sectional view of the fluidic coupling of FIG. 37 with a foam filled internal chamber.

Another embodiment of the fluidic coupling or adapter 400 is shown in FIG. 40. In this embodiment, the internal chamber 430 contains is fined with foam 431 which is saturated with Ink. In the embodiment shown in FIG. 41 the internal chamber contains a bladder 432. The walls 434 of the bladder 432 are made of an elastic material. In FIG. 42 is shown an embodiment wherein there is a spring bag 436 located in the internal chamber 430. The spring bag walls 438 are made of a material such a flexible film such as Mylar or EVA, a multi-layer film having layers of low density polyethylene, adhesive, and metallized polyethylene terephthalate, or the nine-layer film described in U.S. Pat. No. 5,450,112, assigned to the present assignee and incorporated herein by reference. The ends of Ink bladder or the Ink bag may be heat-staked or ultrasonically welded to fluidic coupling 400 to limit movement. The spring bag 436 is biased open by a spring 442 which presses on side plates 440 located on the inner surface of the bag walls 438. FIG. 39 is a cross-sectional view of print cartridge 420 taken along line A—A in FIG. 38. FIG. 39 shows the hollow needle 60 passing through septum 408 into the internal chamber 430 located within the body 402 of fluidic coupling or adapter 400. In the embodiment shown in FIG. 39, internal chamber 430 is hollow and acts as fluid conduit for ink supplied from a needle (not shown) inserted through septum 410.

Figure 41:
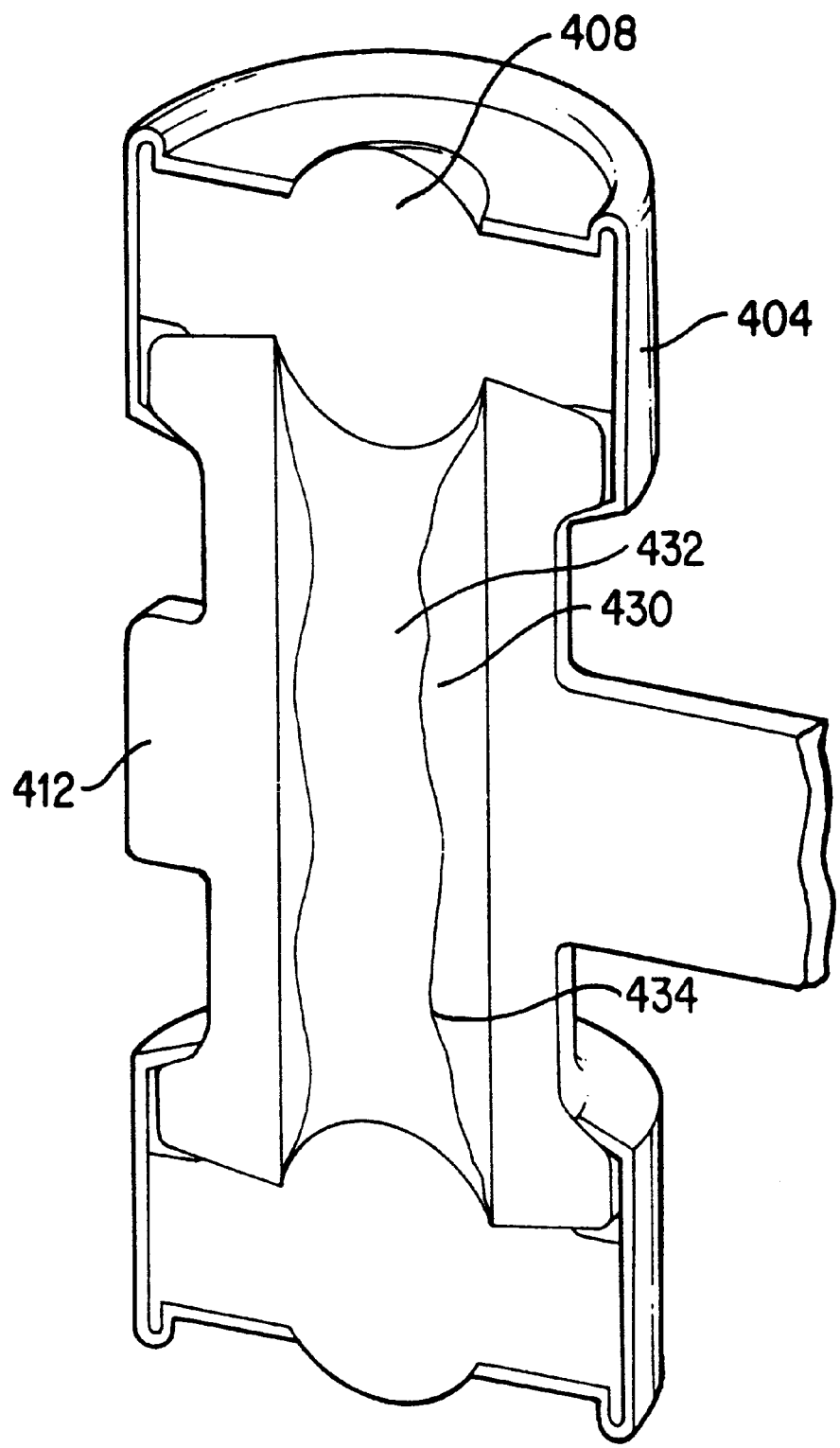
FIG. 41 is a cross-sectional view of the fluidic coupling of FIG. 37 with a bladder in the internal chamber.
Figure 42:
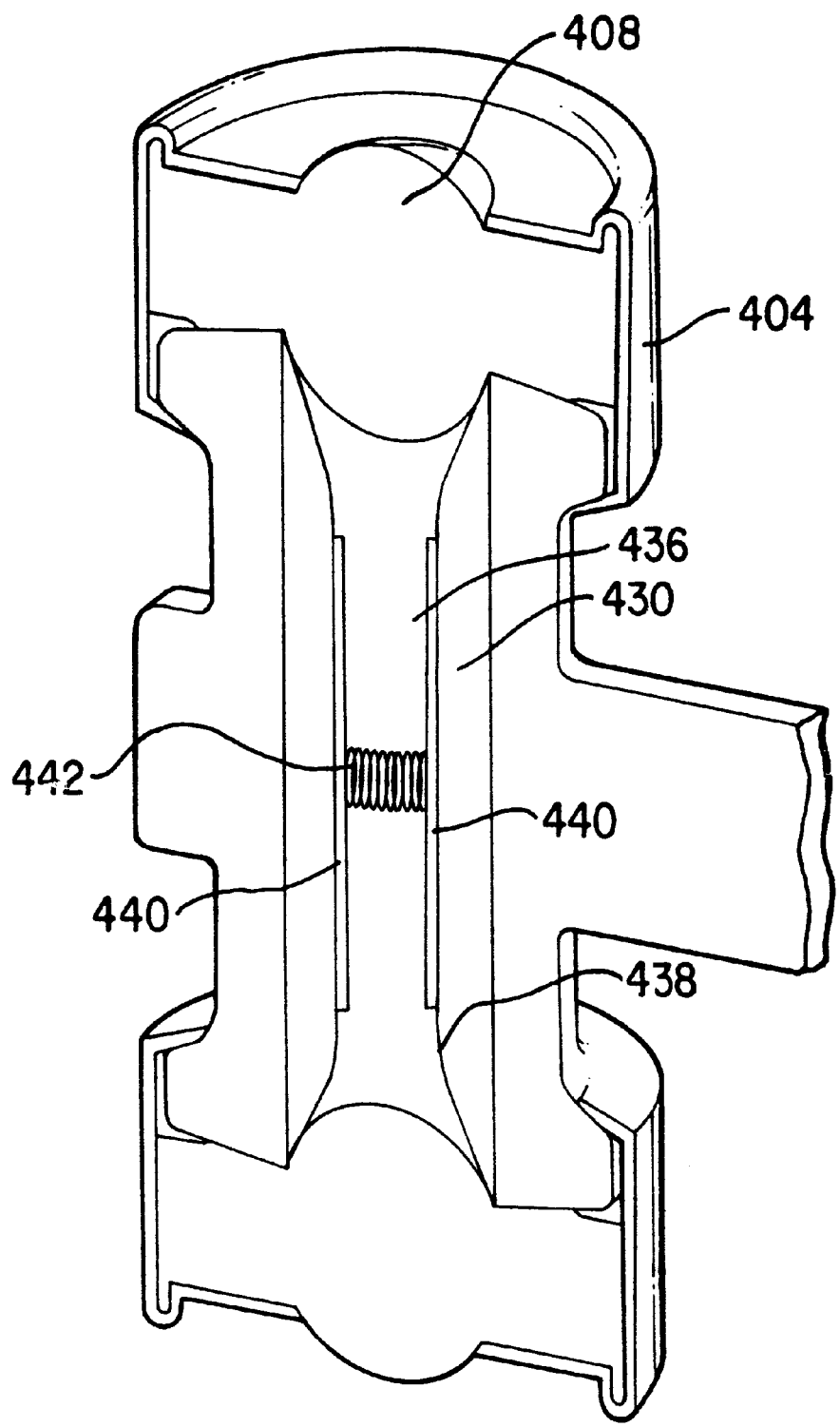
FIG. 42 is a cross-sectional view of the fluidic coupling of FIG. 37 with a spring bag in the internal chamber.

In the embodiments shown in FIGS. 41 and 42, the bladder 432 and spring bag 436 act as a compliant member. As ink is withdrawn from the bladder or spring bag, they collapse in the chamber 430. This compliance produces back pressure in the bladder or spring bag, which increases as the bladder or spring bag collapses. See, for example, U.S. Pat. No. 4,500,895 (ink bladder type reservoir) and U.S. Pat. No. 5,359,353 (spring-bag type reservoir) all assigned to the assignee of the present invention and incorporated herein by reference.

The embodiments shown in FIGS. 40, 41 and 42, in addition to providing the functions indicated above, provides an ink reservoir that can travel with the cartridge during production, eliminating the need to refill the print cartridge. As can be appreciated, this reservoir can be sized to hold anywhere from 0.5 to 50 cc of ink. Thus, it could even provide an on-carriage auxiliary reservoir, eliminating the need for an off-axis ink supply.

Figure 43A:
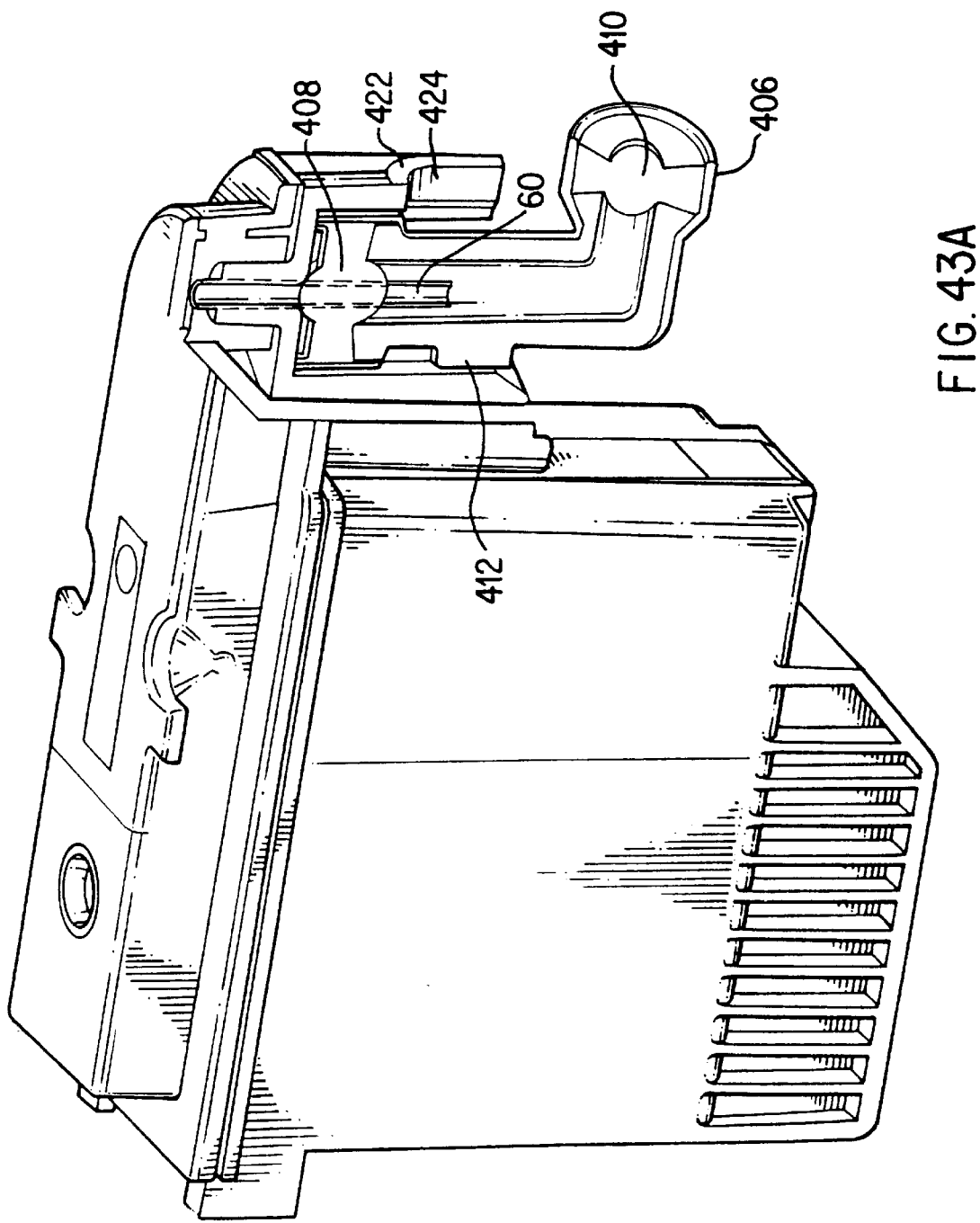
FIGS. 43A and 43B are partial cross-sectional views of the print cartridge of FIG. 8 with an alternative embodiments of the fluidic coupling connected to the fluid interconnect on the print cartridge.
Figure 43B:
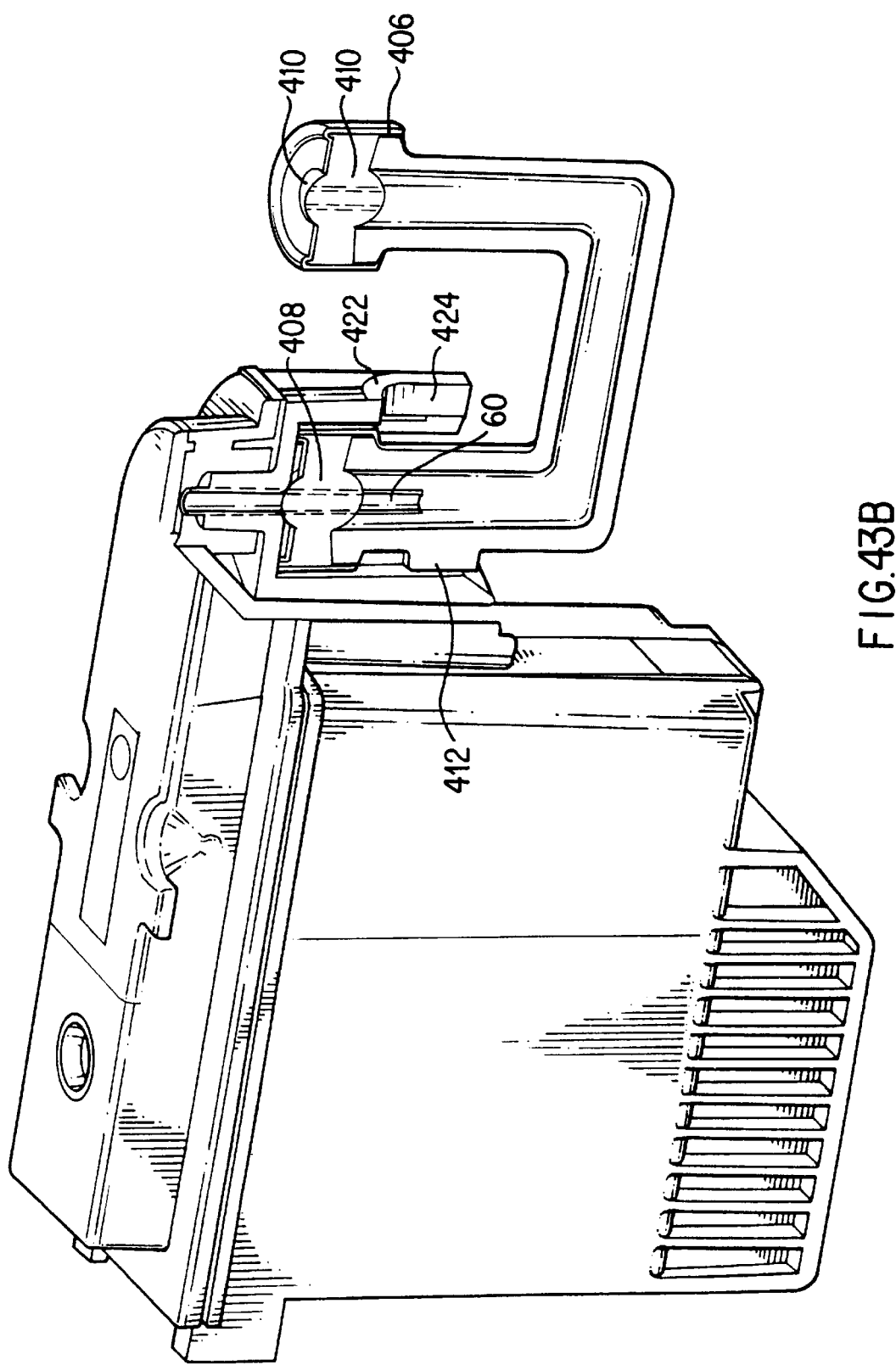

Shown in FIGS. 43A and 43B are different shapes for the fluidic coupling of the present invention. It will be appreciated that other shape variations are possible and within the scope of the present invention.

The embodiments of the fluidic coupling or adapter 400 shown in FIGS. 37–42 have the following functions: (1) prevention of ink leakage from the needle and inlet port on the print cartridge, (2) prevention of air from being ingested into the print cartridge, (3) provides an auxiliary on-board ink reservoir, and (4) provides an inlet and fluidic coupling from another ink supply source such as, for example, on the print cartridge production line.

Figure 44:
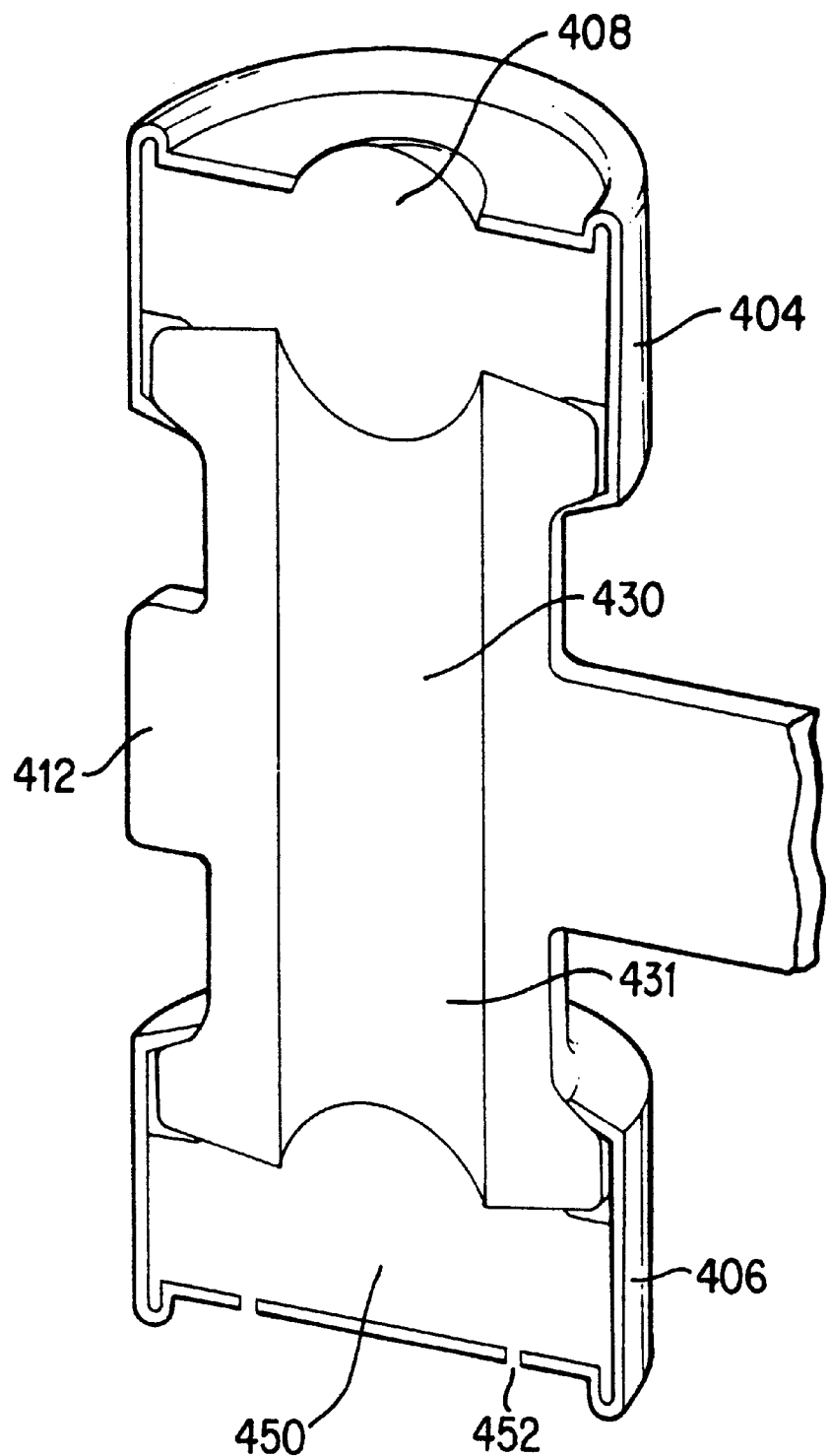
FIG. 44 is a cross-sectional view of the fluidic adapter of the present invention.
Figure 45:
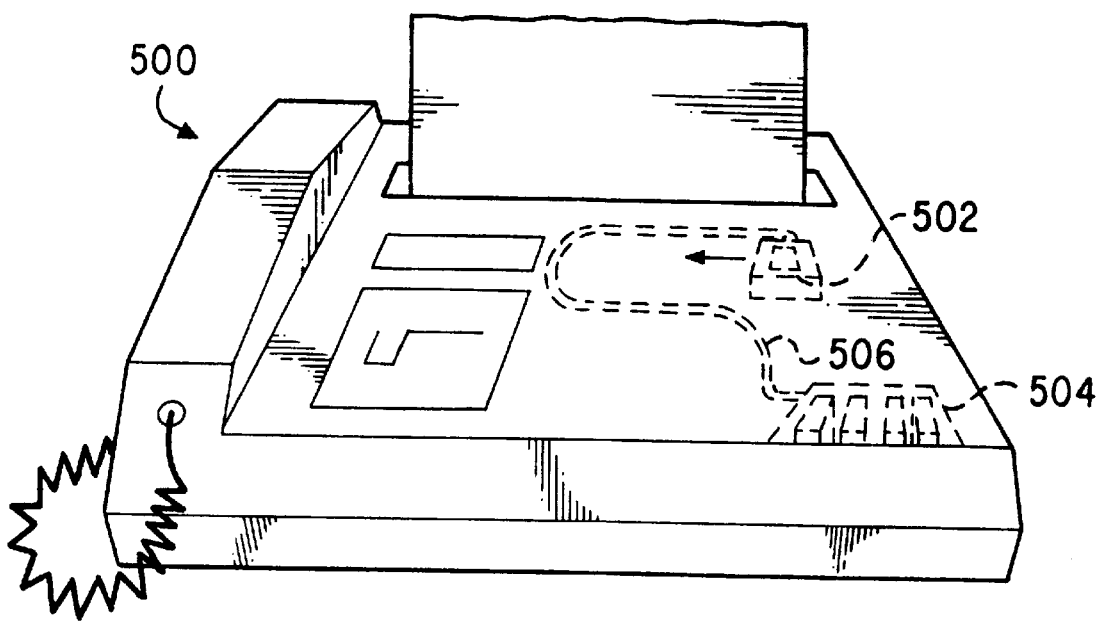
FIG. 45 is a perspective view of a facsimile machine showing one embodiment of the ink delivery system in phantom outline.
Figure 46:
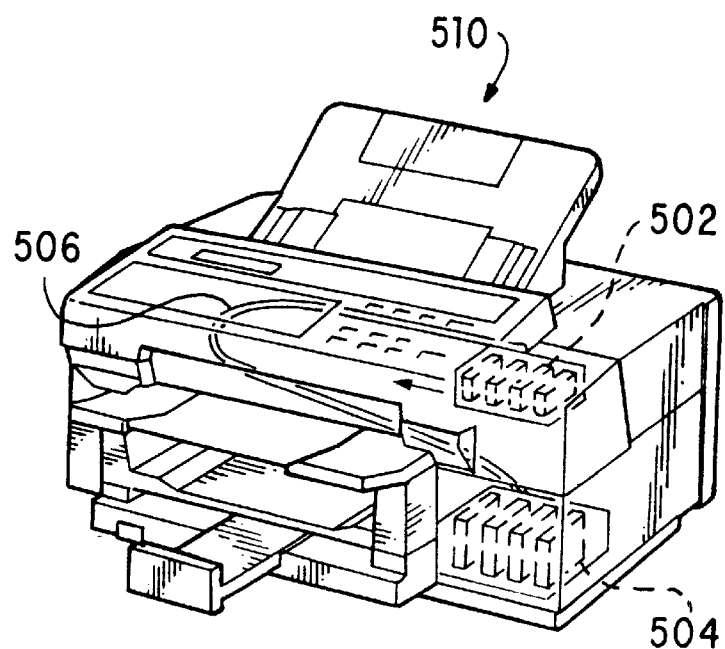
FIG. 46 is a perspective view of a copier, which may be a combined facsimile machine and printer, illustrating one embodiment of the ink delivery system in phantom outline.

Shown in FIG. 44 is an embodiment of the present invention which provides functions 1–3 described above but does not provide a fluidic coupling to another ink supply. In this embodiment there is only one septum 408 for interfacing with the needle 60 on the print cartridge 50. Below the ink saturated foam 431 is unsaturated foam. Vent holes 452 are provide to allow entry of air as ink is withdrawn. Optionally a material such as Gortex which allows the passage of air but not liquid may be used at the interface of the saturated foam. While the embodiment shown in FIG. 44 has a foam filled internal chamber, the bladder and spring bag embodiments described above could also be utilized.

In the embodiments shown above, the shape of the body 402 and the shoulders 404, 406 of the fluidic coupling 400 are cylindrical any other shape could be utilized. Moreover the shape of the body 402 and the shoulders 404, 406 need not be the same. The only restriction being the ability to mate the shoulder 404 of the fluidic coupling 400 to the needle 60 and shroud 422 to effectuate a seal between the fluidic coupling 400 and the inlet port of the print cartridge 420.

In the embodiments shown above having the hollow needle extending from the print cartridge, the needle may be replaced with a septum, and the septum on the fluidic coupler replaced with a hollow needle. This is also the case for the septum which connects to an auxiliary ink supply.

As a result of these design options, the integral pressure regulator offers a wide range of product implementations other than those illustrated in FIGS. 1A and 1B. For example, such ink delivery systems may be incorporated into an inkjet printer used in a facsimile machine 500 as shown in FIG. 19, where a scanning cartridge 502 and an off-axis ink delivery system 504, connected via tube 506, are shown in phantom outline.

FIG. 20 illustrates a copying machine 510, which may also be a combined facsimile/copying machine, incorporating an ink delivery system described herein. Scanning print cartridges 502 and an off-axis ink supply 504, connected via tube 506, are shown in phantom outline.

FIG. 21 illustrates a large-format printer 516 which prints on a wide, continuous paper roll supported by tray 518. Scanning print cartridges 502 are shown connected to the off-axis ink supply 504 via tube 506.

Facsimile machines, copy machines, and large format machines tend to be shared with heavy use. They are often used unattended and for large numbers of copies. Thus, large capacity (50–500 cc) ink supplies will tend to be preferred for these machines. In contrast, a home printer or portable printer would be best with low capacity supplies in order to minimize product size and cost. Thus, the product layouts shown in FIGS. 1A and 1B are most appropriate for such smaller form factor or lower cost applications.

While particular embodiments of the present invention have been shown and described, it will be obvious to those skilled in the art that changes and modifications may be made within departing from this invention in its broader aspects and, therefore, the appended claims are to encompass within their scope all such changes and modifications as fall within the true spirit and scope of this invention.

What is claimed is:

1. An ink delivery system for an inkjet printing system comprising:
   a housing having a fluid inlet;
   a printhead fixed to the housing for ejecting droplets of ink in an ejection direction;
   a source of ink for replenishing the printhead;
   an ink conduit in fluid communication with the source of ink; and
   an adapter having an internal chamber for providing an ink fluid path, the adapter having an inlet fluid coupler for receiving ink from the ink conduit and an outlet fluid coupler that releasably and fluidically connects to the fluid inlet of the housing, wherein the adapter is installable in a direction opposite the ink ejection and has a first portion that allows ink flow from the inlet fluid coupler to the outlet fluid coupler in a direction substantially opposite to the ink ejection direction.

2. The ink delivery system of claim 1, wherein the inlet fluid coupler includes a septum and the outlet fluid coupler includes a septum.

3. The ink delivery system of claim 1, wherein the outlet fluidic coupler is affixed to the housing.

4. The ink delivery system of claim 1, further comprising a regulator with a flexible member, wherein the flexible member comprises a flexible bag, the inside of the bag providing a reference surface, the outside of the bag providing an ink surface.

5. The ink delivery system of claim 4, wherein the flexible bag comprises two flexible bags having a direction of expansion and contraction of the bags substantially perpendicular to the ink surface of the bags and wherein the actuator comprises a regulator lever connected to the valve which directly bears against at least one of the bags, the regulator lever having an axis of rotation perpendicular with the direction of expansion and contraction of the bags so that the lever rotates in the direction of expansion and contraction of the bags and thereby actuates the valve.

6. The ink delivery system of claim 5, further comprising an accumulator lever that applies a substantially constant force against at least one of the bags.

7. The ink delivery system of claim 1, wherein the inlet is coupled to a valve comprising a resilient member tapered nozzle.

8. The ink delivery system of claim 1, wherein the housing is mounted on a scanning carriage.

9. The ink delivery system of claim 8, wherein the ink source is mounted on the scanning carriage.

10. The ink delivery system of claim 8, wherein the ink source is located in a fixed position off the scanning carriage.

11. An ink delivery system for an inkjet printing system comprising:
- a printhead fixed to housing having a fluid inlet, the printhead being capable of ejecting droplets of ink in an ejection direction;
- a source of ink for replenishing the printhead;
- an ink conduit in fluid communication with the source of ink; and
- a removable an adapter having an internal chamber for providing an ink fluid path, the removable adapter having an inlet fluid coupler for receiving ink from the ink conduit and an outlet fluid coupler that releasably and fluidically connects to the fluid inlet of the housing, wherein the adapter has a first portion that allows ink flow from the inlet fluid coupler to the outlet fluid coupler in a direction substantially opposite to the ink ejection direction; and
- wherein the first portion is connected to a second portion that receives ink from the first portion such that the ink flows through the second portion to the outlet fluid coupler in a direction substantially perpendicular to the ejection direction.

12. The ink delivery system of claim 11, wherein the second portion is connected to a third portion that receives ink from the second portion such that the ink flows through the third portion to the outlet coupler in a direction substantially parallel to and in the same direction as the ejection direction.

13. A printing system, comprising:
- a scanning carriage;
- a housing having an internal chamber and a fluid inlet in fluid communication with the internal chamber, the housing mounted to the scanning carriage;
- a printhead mounted to the housing for ejecting ink in an ejection direction;
- an ink source;
- an ink conduit in fluid communication with the ink source; and
- an adapter having an internal chamber for providing an ink fluid path, the adapter having an inlet fluid coupler for receiving ink from the ink conduit and an outlet fluid coupler that releasably and fluidically connects to the fluid inlet of the housing, wherein the adapter is installable in a direction opposite the ink ejection and has a first portion that allows ink flow from the inlet fluid coupler to the outlet fluid coupler in a direction substantially opposite to the ink ejection direction.

14. The printing system of claim 13, wherein the first portion includes a second portion that receives ink from the first portion such that the ink flows through the second portion to the outlet fluid coupler substantially perpendicular to the ejection direction.

15. The printing system of claim 13, wherein the second portion includes a third portion that receives ink from the second portion such that the ink flows through the third portion to the outlet coupler in a direction substantially parallel to and in the same direction as the ejection direction.

* * * * *